(12) United States Patent
Kobashi

(10) Patent No.: US 7,805,672 B2
(45) Date of Patent: Sep. 28, 2010

(54) LAYOUT PROCESSING METHOD, LAYOUT PROCESSING APPARATUS, AND LAYOUT PROCESSING PROGRAM THAT CHANGES THE PRIORITY OF AN AREA FOR AUTOMATIC LAYOUT

(75) Inventor: Kazufumi Kobashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1154 days.

(21) Appl. No.: 11/418,230

(22) Filed: May 4, 2006

(65) Prior Publication Data

US 2006/0259860 A1  Nov. 16, 2006

(30) Foreign Application Priority Data

May 11, 2005  (JP) .............................. 2005-138413

(51) Int. Cl.
*G06F 17/00* (2006.01)
(52) U.S. Cl. .................... 715/252; 715/243; 715/246
(58) Field of Classification Search ............. 715/243, 715/246, 252, 271
See application file for complete search history.

(56) References Cited

U.S. PATENT DOCUMENTS 5,060,170 A * 10/1991 Bourgeois et al. ........... 715/788
5,855,009 A * 12/1998 Garcia et al. .................. 706/45

FOREIGN PATENT DOCUMENTS

| JP | 7-129658 A | 5/1995 |
|---|---|---|
| JP | 11-066101 A | 3/1999 |
| JP | 2000-090281 A | 3/2000 |
| JP | 2004-303197 A | 10/2004 |
| JP | 2005-079976 A | 3/2005 |
| JP | 2005-117492 A | 4/2005 |

* cited by examiner

*Primary Examiner*—Adam M Queler
(74) *Attorney, Agent, or Firm*—Canon U.S.A., Inc. I.P. Division

(57) ABSTRACT

A layout processing method is provided which is for dynamically changing a layout of a template having a plurality of data areas according to content data inserted into each off the plurality of data areas. The method includes a setting a priority on each of the plurality of data areas; changing, in a case where a difference in size between content data and a data area associated with the content data meets a predetermined condition, a priority set on the associated data area; determining an area size of each of the data areas according to weighting based on a changed priority; laying out the content data according the determined area sizes of the plurality of data areas; and outputting the laid-out content data.

15 Claims, 34 Drawing Sheets

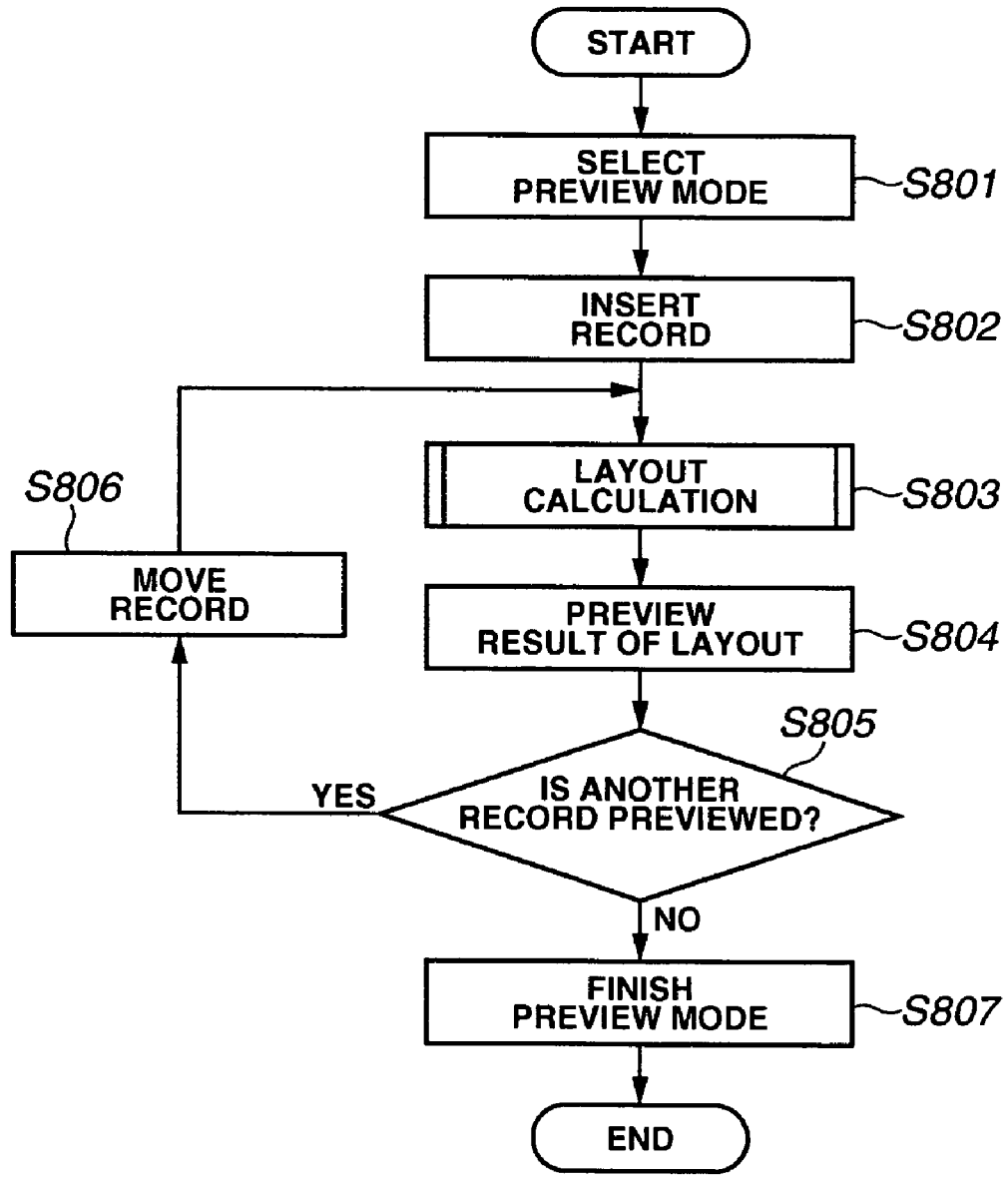

FIG.20
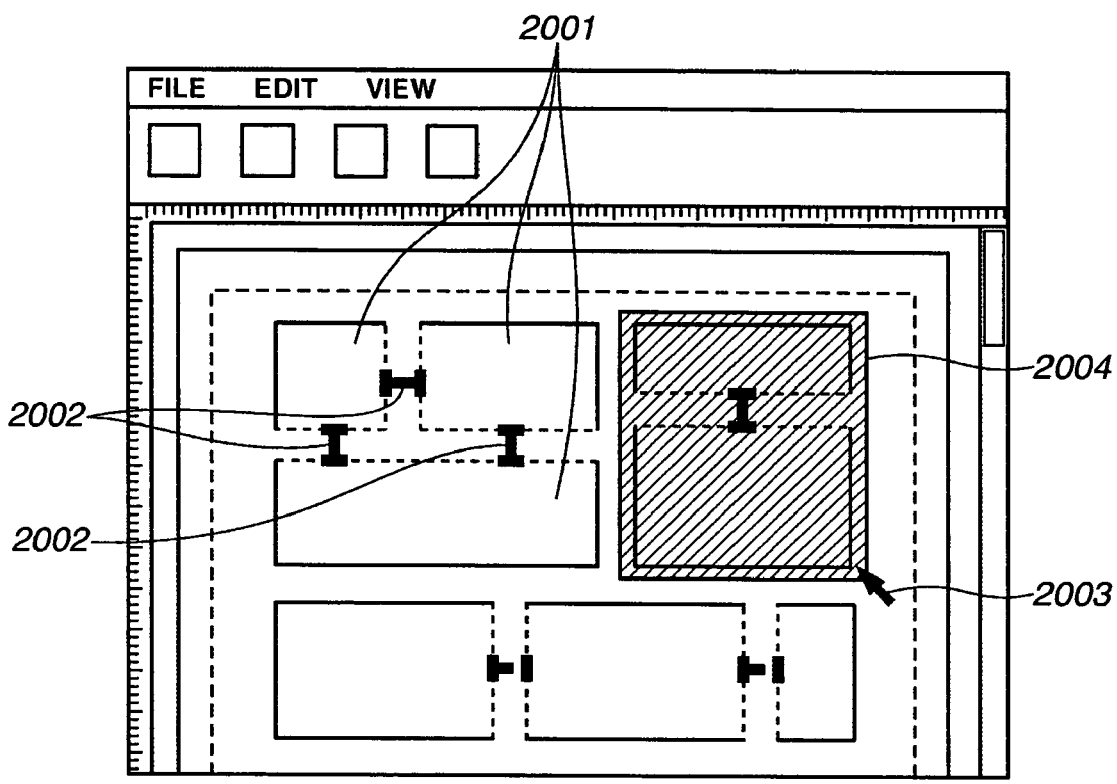
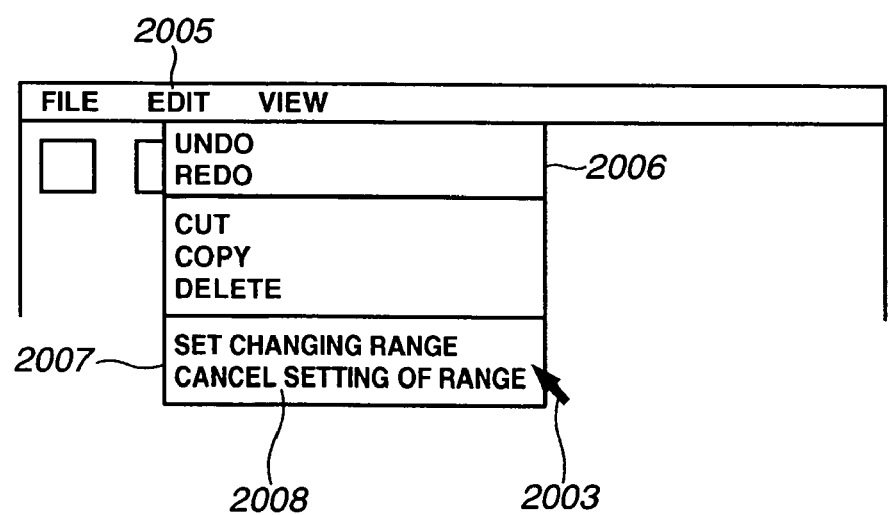

LAYOUT PROCESSING METHOD, LAYOUT PROCESSING APPARATUS, AND LAYOUT PROCESSING PROGRAM THAT CHANGES THE PRIORITY OF AN AREA FOR AUTOMATIC LAYOUT

BACKGROUND OF THE INVENTION

1. Field of the Invention

The present invention relates to an apparatus and program for use in an automatic layout system, and to a layout processing method.

2. Description of the Related Art

One-to-One Marketing is a kind of a database marketing technique to make a database of individual attribute information, such as age, gender, hobby, preference, and purchase history, to analyze the information, and to make proposals that meet the needs of customers. A variable printing technique is a typical marketing technique of this type. Along with recent progress in DTP (Desktop Publishing) technology and recent wide use of digital printers, variable print systems have been developed, which customize documents for each customer and output the customized documents. The variable print systems are required to optimally lay out and display contents that vary in amount of information with customers.

A variable print system has been achieved by disposing containers on a document to thereby create a layout, and also associating the containers with a database. Incidentally, the container is defined to be a partial region (or a data area) on which contents (to be drawn) are drawn. That is, a customized document (a document) is created by performing operations of laying out such containers on a document and associating a layout with a database (that is, associating each of the contents of the database with each container). In the present specification, such a document is referred to as a variable data document.

However, the size of each container serving as a partial region, to which texts and images are pasted, is fixed. Thus, in a case where an amount of data contained in the database is larger than the size of a container when this data is inserted into the container, text overlap or image clipping occurs. Conversely, in a case where the amount of the data is smaller than the size of the container, a blank space is formed in the container.

If the contents are image data, it is possible to reduce an image, which is represented by the image data, in size and to draw the reduced-size image in a container. However, this may have a harmful effect in that the reduced-size image is extremely small. Also, a technique of reducing, in a case where text data having a size larger than a fixed size of a container is inserted thereinto, the font size of a text to display the entire text in the container has been proposed. However, in a case where the font size is adjusted in this manner, the font size becomes too small to thereby cause problems that the balance of the whole document is disrupted, and that the document is difficult to read.

Japanese Patent Application Laid-Open No. 7-129658 discloses a technique of reducing, as the size of a text region increases, the size of an adjacent region to maintain the distance between the text region and the adjacent region as an automatic layout technique to solve these problems.

Japanese Patent Application Laid-Open No. 7-129658 describes that as the text is input, the text region is enlarged. However, in a case where the size of the text region increases, the size of the adjacent region is reduced to maintain the distance therebetween. Thus, the technique described in Japanese Patent Application Laid-Open No. 7-129658 has a problem in that as an amount of texts to be input increases, the adjacent region is kept reduced. Additionally, the technique described in Japanese Patent Application Laid-Open No. 7-129658 takes no consideration about a variable print system adapted to create a document customized for each customer by associating each layout frame with a database and then inserting content data into a container.

An example of a related layout method of giving consideration about variable-data printing is a method of creating a container having a fixed size and then inserting content data thereinto. However, in the case of using a container having a fixed size, this layout method has a problem that when content data, whose size is larger than that of the container, is inserted thereinto, an overflow occurs, and that when such content data is forcibly inserted thereinto by reducing a font size, the font size becomes extremely small. Also, it is contrived to increase or decrease the size of the container according to the size of the content data. However, in a state in which a plurality of containers is associated with one another, when the size of one of the plurality of containers is increased, the sizes of the associated containers have to decrease with an increase in the size of the one of the plurality of containers. Thus, layout processing cannot be performed in consideration of the balance among the sizes of the containers.

Consequently, a related layout processing method of performing, in a case where the size of each container is changed according to the size of content data inserted thereinto, layout processing by controlling an amount in change of the size of each container is employed as a related layout method taking into consideration the balance among the sizes of a plurality of containers associated with one another. Thus, layout processing can be performed in consideration of the balance among the sizes of the associated containers.

An object of the aforementioned one-to-one marketing is to create a catalog or a pamphlet according to customers' needs. In such a case, it is assumed to create different pamphlets or catalogs respectively corresponding to customers. Thus, it is highly likely that an optimum layout for a user cannot be created by using only a layout adjustment algorithm adapted to adjust an amount of change in the container size according to the size of the aforementioned content data.

It is now assumed that there are, for example, two flexible containers $\underline{A}$ and $\underline{B}$, and that content data are inserted from a database into both of the containers $\underline{A}$ and $\underline{B}$. In a case where both of the data respectively inserted into the containers $\underline{A}$ and $\underline{B}$ are large, and where the containers are enlarged according to the size of the content data, the containers are not fitted into a page. Thus, it is considered to adjust the sizes of the data, which are to be respectively inserted into the containers A and B, by equally reducing the sizes of such data so that the containers are fitted into a page.

When this technique is used, the following problems occur. First, it is assumed that a document to be created includes a container set by a creator to appeal more to users than other containers. In a case where the aforementioned layout processing adapted to adjust an amount of change in each container size is performed, the layout processing taking the balance between the containers $\underline{A}$ and $\underline{B}$ into consideration can be performed. However, no layout reflecting a creator's intention can be created. Consequently, the creator should edit a container, which is to be set by the creator to appeal to users, again after checking a result of the aforementioned layout processing.

To solve this problem, a technique of setting a layout priority on a container has been considered. This technique can raise or lower the priority of the container by setting a weight (or priority) on a change in the size of the container. For example, a high weight is set on a container to be laid out to have a size that is close as much as possible to the size of the content data to be inserted into the container. Conversely, a low weight is set on a container whose size doesn't need to be much close to the size of such content data. This enables layout calculation to reflect a user's intention. However, according to this technique, a priority should preliminarily be set on a container. Therefore, it is necessary to preliminarily know what is represented by the content data included in each record. Also, the priority cannot be changed by using information on content data to be actually inserted into a container.

SUMMARY OF THE INVENTION

Accordingly, an aspect of the present invention is to perform automatically balanced layout edition processing while dynamically changing a priority by using information on content data actually inserted into a container.

According to a first exemplary embodiment of the present invention, a layout processing method is provided for dynamically changing a layout of a template having a plurality of data areas according to content data inserted into each of the plurality of data areas. The method includes setting a priority on each of the plurality of data areas; changing, in a case where a difference in size between content data and a data area associated with the content data meets a predetermined condition, a priority set on the associated data area; determining an area size of each of the data areas according to weighting based on a changed priority; and laying out the content data according the determined area sizes of the plurality of data areas, and outputting laid-out content data.

According to another exemplary embodiment of the present invention, a layout processing apparatus is provided which is configured to dynamically change a layout of a template having a plurality of data areas according to content data inserted into each of the plurality of data areas. The apparatus includes a setting unit configured to set a priority on each of the plurality of data areas; a changing unit configured to change, in a case where a difference in size between content data and a data area associated with the content data meets a predetermined condition, a priority set on the associated data area; a determining unit configured to determine an area size of each of the data areas according to weighting based on the priority changed by the changing unit; and an output unit configured to lay out the content data according the area sizes of the plurality of data areas, which are determined by the determining unit, and to output the laid-out content data.

According to another embodiment of the present invention, a layout processing program is provided which is executable by a layout processing apparatus configured to dynamically change a layout of a template having a plurality of data areas according to content data inserted into each of the plurality of data areas. The program includes a setting step of setting a priority on each of the plurality of data areas; a changing step of changing, in a case where a difference in size between content data and a data area associated with the content data meets a predetermined condition, a priority set on the associated data area; a determining step of determining an area size of each of the data areas according to weighting based on the priority changed in the changing step; and an output step of laying out the content data according the area sizes of the plurality of data areas, which are determined in the determining step, and outputting the laid-out content data.

According to yet another embodiment of the present invention, a layout processing method is provided for determining a layout of a template having a plurality of data areas according to content data inserted into each of the plurality of data areas. The method includes setting a condition on which layout recalculation is performed; determining an area size of each of the data areas according to a content size required by the content data, which is inserted into each of the data areas, and to a constraint condition set on each of the data areas; judging whether the determined area size meets a set condition on which layout recalculation is performed; performing, in a case where the determined area size is judged to meet the condition, an area size redetermining process to change the determined area size; and outputting the content data according the determined area size of each of the plurality of data areas.

Moreover, according to still another exemplary embodiment of the present invention, a layout processing method is provide for generating a template having a plurality of data areas, and to perform calculation processing to determine an area size of each of the plurality of data areas according to content data to be inserted into each of the plurality of data areas. The method includes setting a condition on which the calculation processing is changed; obtaining a content size required by the content data to be inserted into each of the data areas; judging whether the obtained content size meets a set condition; determining, in a case where the content size is judged to meet the condition, an area size of each of the data area by using the content size required by the content data to be inserted into each of the data areas and by applying the changed calculation processing; and outputting the content data according to the determined area size of each of the data area.

Additionally, according to another exemplary embodiment of the present invention, a layout processing apparatus is provided which is configured to determine a layout of a template having a plurality of data areas according to content data inserted into each of the plurality of data areas. The apparatus includes a setting unit configured to set a condition on which layout recalculation is performed; a determining unit configured to determine an area size of each of the data areas according to a content size required by the content data, which is inserted into each of the data areas, and to a constraint condition set on each of the data areas; a judging unit configured to judge whether the area size determined by the determining unit meets the condition set by the setting unit, on which layout recalculation is performed; a redetermining unit configured to perform, in a case where the area size determined by the judging unit is judged to meet the condition, an area size redetermining process to change the area size determined by the determining unit; and an output unit configured to output the content data according the area size of each of the plurality of data areas, which is determined by the determining unit.

Furthermore, according to yet another exemplary embodiment of the present invention, a layout processing apparatus is provided which is configured to generate a template having a plurality of data areas, and to perform calculation processing to determine an area size of each of the plurality of data areas according to content data to be inserted into each of the plurality of data areas. The apparatus includes a setting unit configured to set a condition on which the calculation processing is changed; an obtaining unit configured to obtain a content size required by the content data to be inserted into each of the data areas; a judging unit configured to judge whether the content size obtained by the obtaining unit meets the condition set by the setting unit; a determining unit configured to determine, in a case where the content size is judged by the judging unit to meet the condition, an area size of each of the data areas by using the content size required by the content data to be inserted into each of the data areas and by applying the changed calculation processing; and an output unit configured to output the content data according to the area size of each of the data areas, which is determined by the determining unit.

Also, according to still one more exemplary embodiment of the present invention, a layout processing program is provided which is configured to determine a layout of a template having a plurality of data areas according to content data inserted into each of the plurality of data areas. The program includes a setting step of setting a condition on which layout recalculation is performed; a determining step of determining an area size of each of the data areas according to a content size required by the content data, which is inserted into each of the data areas, and to a constraint condition set on each of the data areas; a judging step of judging whether the area size determined by the determining step meets the condition set by the setting step, on which layout recalculation is performed; a redetermining step of performing, in a case where the area size determined by the judging step is judged to meet the condition, an area size redetermining process to change the area size determined by the determining step; and an output step of outputting the content data according the area size of each of the plurality of data areas, which is determined by the determining step.

And finally, according to still one more exemplary embodiment of the present invention, a layout processing program is provided for generating a template having a plurality of data areas, and to perform calculation processing to determine an area size of each of the plurality of data areas according to content data to be inserted into each of the plurality of data areas. The program includes a setting step of setting a condition on which the calculation processing is changed; an obtaining step of obtaining a content size required by the content data to be inserted into each of the data areas; a judging step of judging whether the content size obtained in the obtaining step meets the condition set in the setting step; a determining step of determining, in a case where the content size is judged in the judging step to meet the condition, an area size of each of the data area by using the content size required by the content data to be inserted into each of the data areas and by applying the changed calculation processing; and an output step of outputting the content data according to the area size of each of the data areas, which is determined in the determining step.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a general flowchart illustrating an exemplary layout calculation.

FIG. 20 is a diagram illustrating an example of a UI window for showing a priority changing range setting method in the embodiment of the present invention.

DETAILED DESCRIPTION OF THE EMBODIMENTS

Exemplary embodiments, features and aspects of the present invention will be described in detail below with reference to the accompanying drawings.

First Exemplary Embodiment

[Exemplary System Configuration]

Figure 1A:
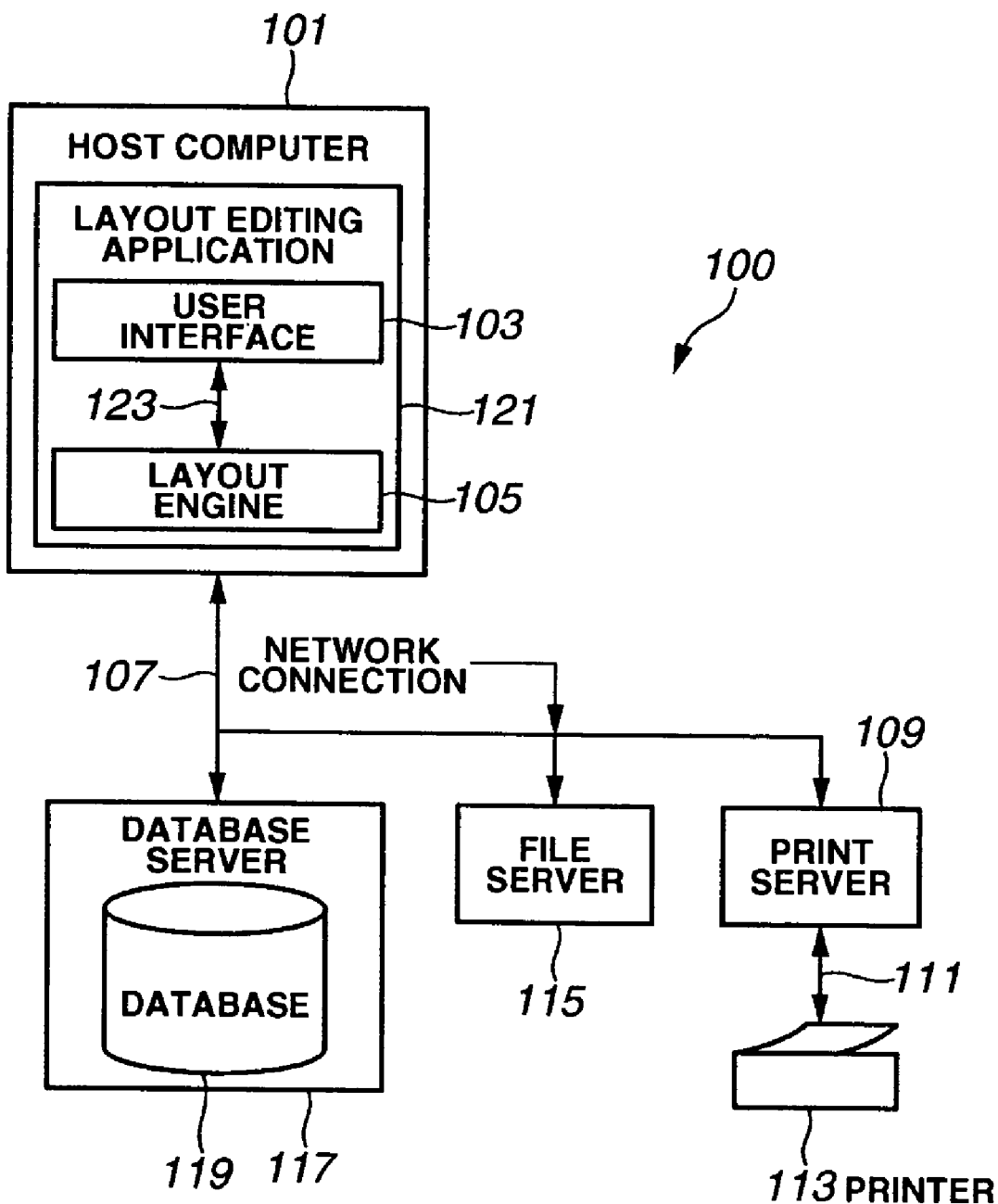
FIG. 1A is a diagram illustrating an exemplary configuration of a computer system according to an embodiment of the present invention.
Figure 1B:
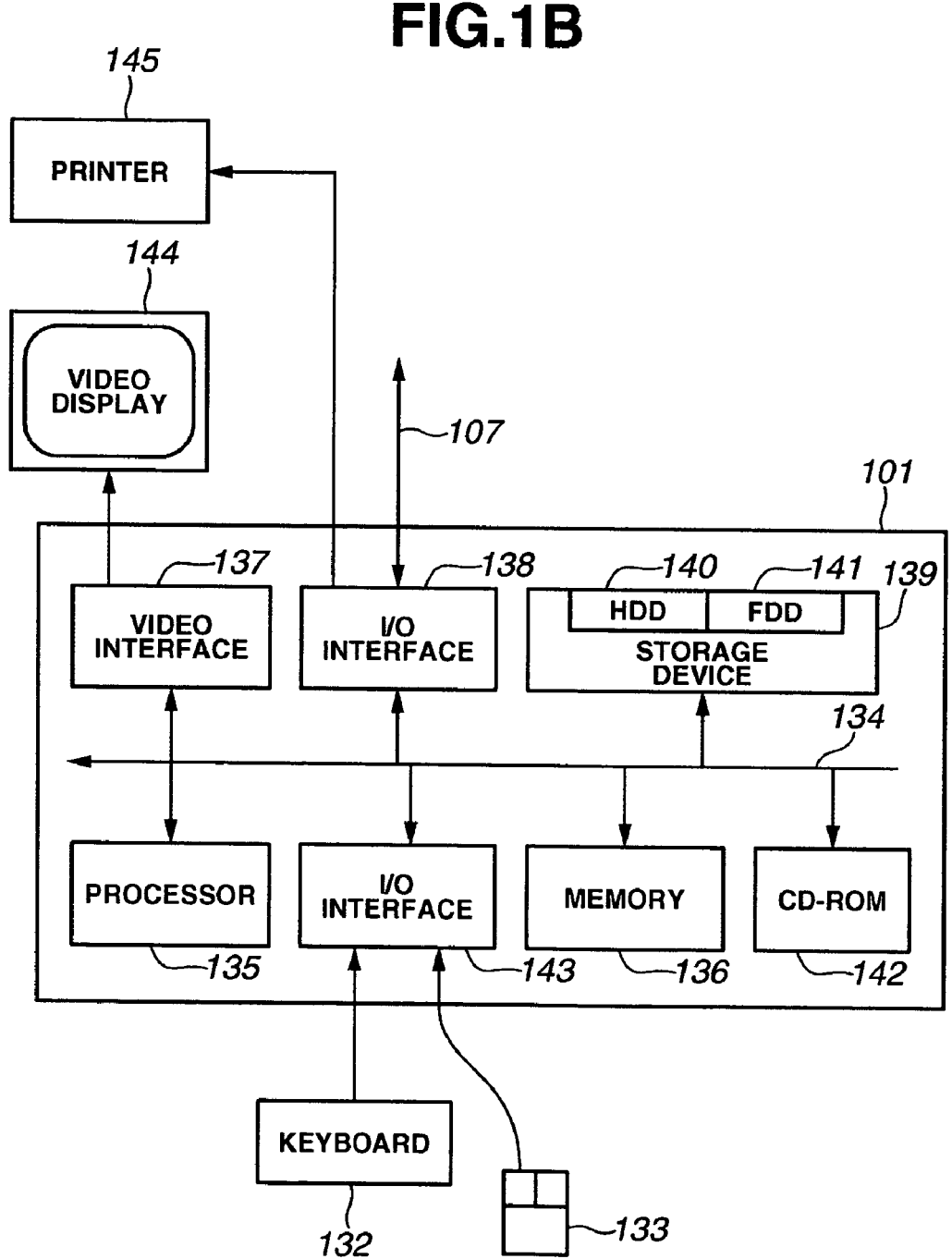
FIG. 1B is a schematic diagram illustrating an exemplary computer module shown in FIG. 1A.

FIG. 1A shows a system 100 adapted to print a variable data document. A method illustrated in this figure is implemented in a general-purpose computer module 101 that will be described in detail in FIG. 1B. A process described in FIG. 1B is performed in the computer module 101. A process illustrated in FIG. 1B is performed by executing a layout editing application 121 that is executable on the system 100. That is to say, in particular, a layout edition step and a printing step are performed according to an instruction from software to be executed by the computer (for example, an information processor serving as a layout processing apparatus) 101.

The software is stored in a computer-readable medium including a storage unit described below. The software is loaded from the computer-readable medium to the computer 101 and is executed by the computer 101. A computer-readable medium having such software and a computer program recorded thereon are a computer program product. The use of the computer program product on the computer 101 provides an apparatus that is advantageous in editing a layout of a document and in printing variable data.

FIG. 1B shows the configuration of the computer 101. The computer 101 is connected to input devices, such as a keyboard 132 or a pointing device like a mouse 133, and to output units including a display unit 144 and a local printer 145. An input/output interface 138 connects the computer 101 to a network 107 to thereby connect the system 100 to another computer. Typical examples of a network connection 107 include a local area network (LAN) and a wide area network (WAN).

The computer 101 typically includes a processor unit 135, a memory unit 136 including, for example, a semiconductor random access memory (RAM) or a read-only memory (ROM), an input/output (I/O) interface including a video interface 137, and an I/O interface 143 for the keyboard 132 and the mouse 133. A storage unit 139 includes a hard disk drive 140 and floppy (registered trademark) disk drive (FDD) 141. Although not shown in FIG. 1B, a magnetic tape drive may be used. A CD-ROM drive 142 is provided as a nonvolatile data source The computer 101 utilizes components 135 to 143 of the computer module 101, which communicate through an interconnection bus 134 according to an operating system, such as GNU/LINUX or Microsoft Windows (registered trademark) or by a method performed typically according to the operating system or in a conventional operation mode of the computer system constituted by components known in the related art.

Examples of a system including the computer shown in FIG. 1B may be IBM-compatible PCs (Personal Computers), Sun Sparcstation computers, or a computer system including such computers.

The layout editing application 121 is typically resident in the hard disk drive 140 and is read therefrom and is executed by the processor 135. When data is fetched from the storage unit 139, which stores the layout editing application 121, or through the network 107, the data uses a memory unit 136 that works with the hard disk drive 140. The application edition program 121 is encoded on a CD-ROM or a floppy (registered trademark) disk and is read through the corresponding CD-ROM drive 142 or the corresponding FDD 141 and is provided to users. Alternatively, the application edition program 121 may be read by a user through the network connection 107. The software may be loaded into the computer 101 from another computer-readable medium which has an appropriate size and includes a magnetic tape, a ROM, an integrated circuit, a magneto-optical disk, media read through wireless communication or infrared communication between the computer 101 and another device, a computer-readable card, such as a PCMCIA card, E-mail communication, or the Internet, or an intranet having recorded information on a WEB site. The aforementioned computer-readable media are merely related standard media. Any other computer-readable media may also be used.

Now, referring back to FIG. 1A, the layout editing application 121 shown in FIG. 1A includes two software components adapted to instruct the computer to perform Variable Data Printing (VDP). One of the two software components is a layout engine module 105 that is a software component adapted to read variable data stored in a database 119 record by record according to limitations imposed on the sizes and the positions of containers (rectangular ranges) serving as partial regions, and also adapted to calculate the sizes and the positions of containers, in each of which the read data is flowed, according to the limitations imposed on the containers. Also, in the present embodiment, the layout engine 105 is adapted to draw data allocated to a container and to generate an image of a variable data document. However, the layout engine of the present invention is not limited thereto. The layout engine 105 may be adapted to operate as an application for determining the size and the position of each of the partial regions (containers) and to output drawing information to a printer driver (not shown) to cause the printer driver to perform a process of drawing an image of a variable data document and generate print data.

The other software component is a user interface 103 that allows a user to set the layout and the attribute of each container and that causes the user to create a document template. Also, the user interface 103 provides a mechanism to associate each container in the document template with a data source. The user interface 103 and the layout engine 105 communicate with each other through a communication channel 123.

Generally, the data source for creating a document is a typical database 119 on a database server 117 constituted by another computer which causes a database application to run. The host computer 101 communicates with the database server 117 through the network connection 107.

The layout editing application 121 creates a document template to be stored in the file server 115 that is constituted by the host computer 101 or another computer. Also, the layout editing application 121 creates a document including a document template merged with data. The document is stored in the local file system of the host computer 101 or in the file server 115, or is transmitted to and printed by a printer 113. A print server 109 is a computer adapted to provide a network function to a printer that is not connected directly to the network. The print server 109 and the printer 113 are connected to each other through a typical communication channel 111.

Figure 1C:
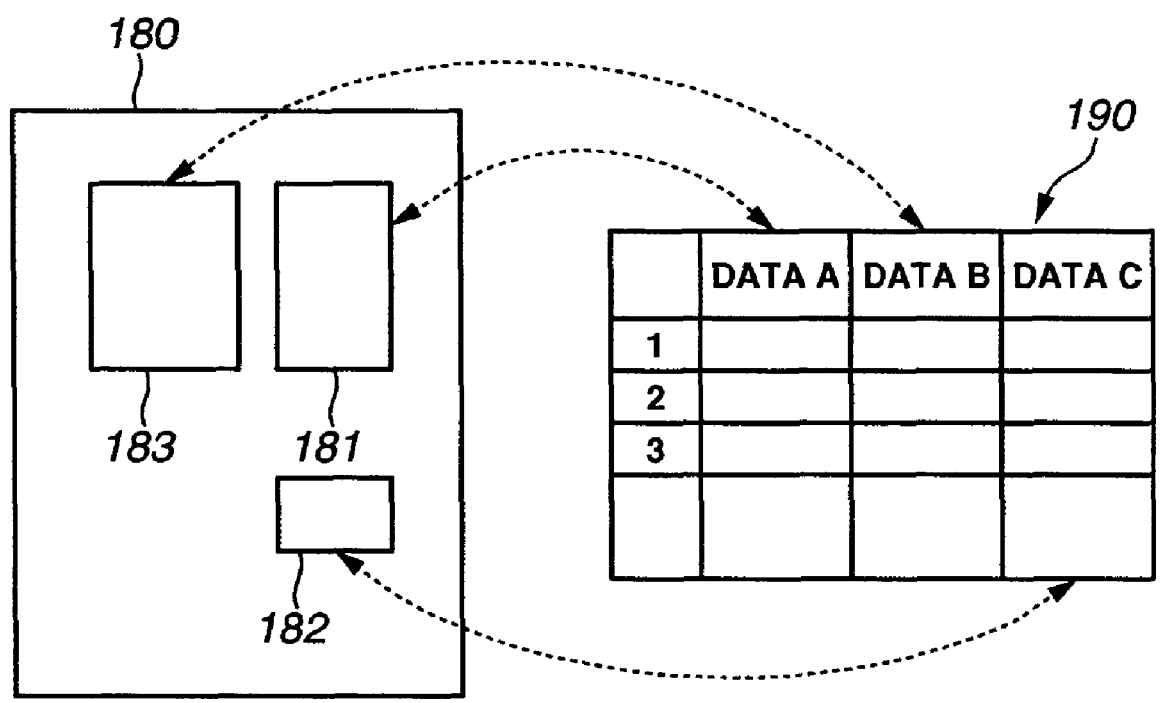
FIG. 1C is a diagram illustrating an exemplary outline of variable data printing.

FIG. 1C is a diagram illustrating an outline of variable data printing according to the present embodiment. A plurality of containers 181 to 183 are laid out on a page according to an operation instruction from a user through the user interface module 103 (hereunder referred to as the user interface 103) of the layout editing application 121. Then, constraints on the position and the size of each container are given to each container to thereby generate a document template 180. Also, the user interface 103 associates the document template 180 with a data source 190 and also associates each container with a data field in the data source 190. Association information representing the association between each container and a data field in the data source 190 is described in the document template. The document template is stored in the hard disk drive (HDD) 140. The data source 190 is a file in which item data is described for each record. The data source 190 is stored in the HDD 140.

According to a print instruction or a preview instruction from the user, the layout engine 105 reads out the data associated according to the association information from the data source 190, inserts the data into the containers 181 to 183 of the document template for each record (for example, data fields A to C of data record 1 are inserted into the containers 181 to 183), and adjusts the size of each container according to the inserted data (layout adjustment). In the case of inputting a preview instruction, a layout-adjusted document image is generated and is output so that the image is displayed on the screen of the video display 144 as a preview. In the case of inputting a print instruction, a document image generated by using the layout engine 105 or the printer driver is output to the print server 109 as print data. Variable data printing is implemented by sequentially processing data records 1, 2, 3 . . . .

The data source (190) adapted to create a document may be, for example, the general database 119 provided on a database server 117 constituted by another computer that causes the database application to run. In this case, the host computer 101 can acquire the data source by communicating with the database server 117 through the network 107. The document template (180) used to perform variable data printing, which is generated by the layout editing application 121, is stored in the host computer 101 or in a file server 115 constituted by another computer. As described above by referring to FIG. 1C, the layout engine 105 of the layout editing application 121 creates a variable data document including a document template merged with data. The document is stored in the local file system of the host computer 101 or in the file server 115, or is transmitted to and is printed by a printer 113.

The print server 109 is a computer to provide a network function to a printer which is not connected directly to the network.

Figure 2:
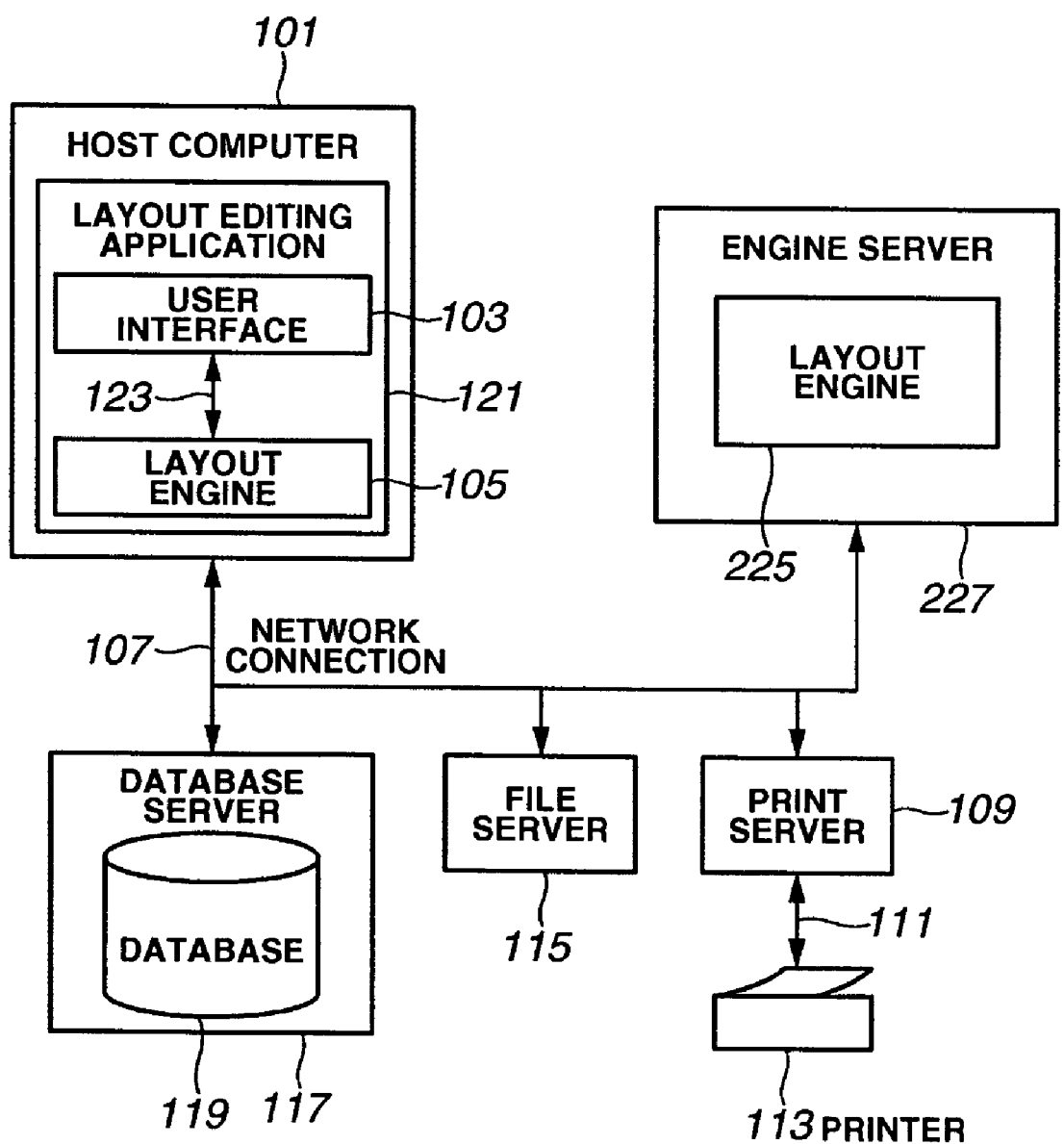
FIG. 2 is a diagram illustrating an exemplary configuration in which an engine server is added to the computer system shown in FIG. 1A.

FIG. 2 is a block diagram similar to FIGS. 1A and 1B, which include a separate version 225 of the layout engine 105, except addition of an engine server 227. The engine server 227 is a typical computer. The layout engine 225 can combine a document template stored in the file server 115 with data stored in the database 119 to create a variable data document used for printing or another purpose. Such an operation is requested through the user interface 103. Alternatively, it is requested to print only a specific record.

[Exemplary Main Window]

Figure 3:
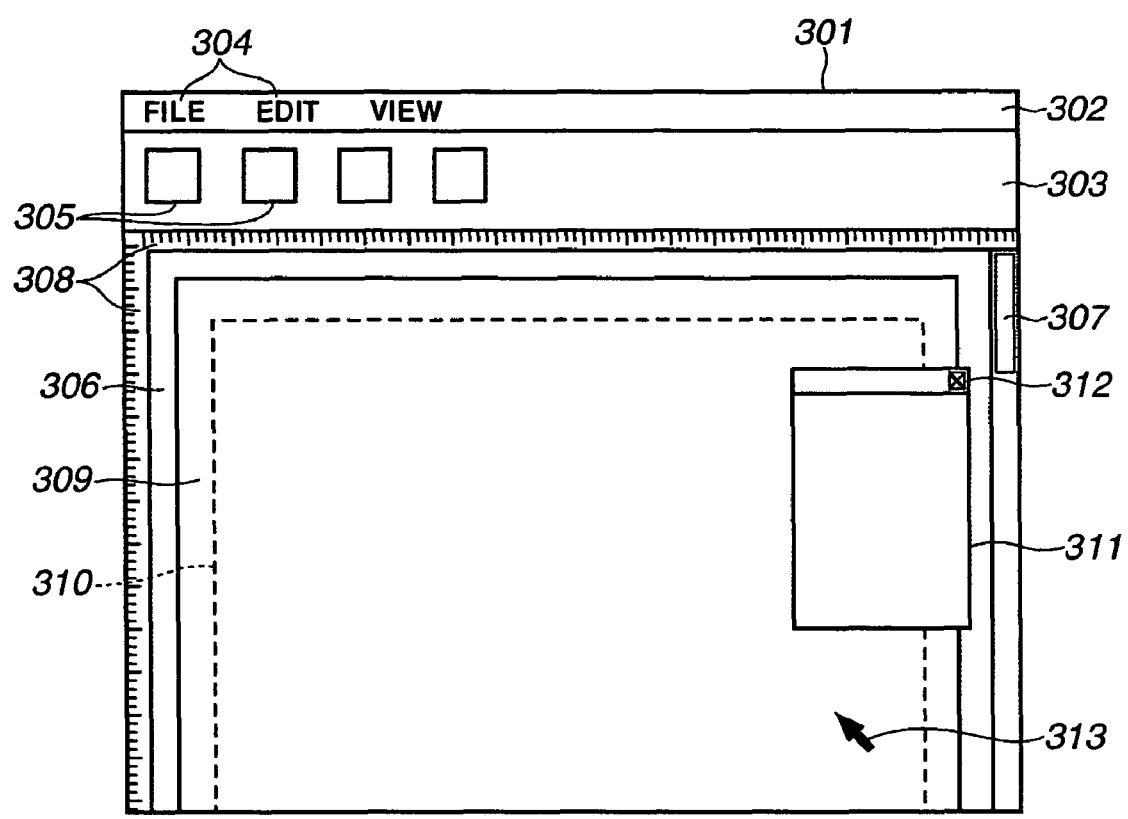
FIG. 3 is a diagram illustrating an exemplary application main window including a menu bar, a tool bar, a work area, and a floating palette in the embodiment of the present invention.

The user interface 103 causes the video display 144 to display a user interface window constituted by an application window 301 shown in FIG. 3 when operated. The window 301 has a menu bar 302, a tool bar 303, a work area 306, and an optional palette 311. The menu bar 302 and the tool bar 303 can be set in a non-display state and also can be moved to various positions on the screen. The position of the work area 306 can be moved by operating the mouse 133. The palette 311 is an option. A cursor/pointer device 313 represents a position indicated by the mouse 133.

The menu bar 302 has a number of menu items 304 extended under the layer of menu options, as a known technique. The tool bar 303 has a number of tool buttons and widgets 305 that can be put into a non-display state or a display state by a special mode of the application. A ruler 308 is an option and is used to indicate the position of a pointer, a page, a line, a margin guide, a container, or an object in the work area.

The palette 311 is used to access additional functional components, such as a variable data library. The palette 311 has a window control 312 to move, resize, or close it. The palette 311 can optionally be displayed on the foreground of the work area or can optionally be hidden behind an object. The palette 311 can be displayed only within the application window 301 or can partially or wholly be displayed outside the application window 301.

Figure 4:
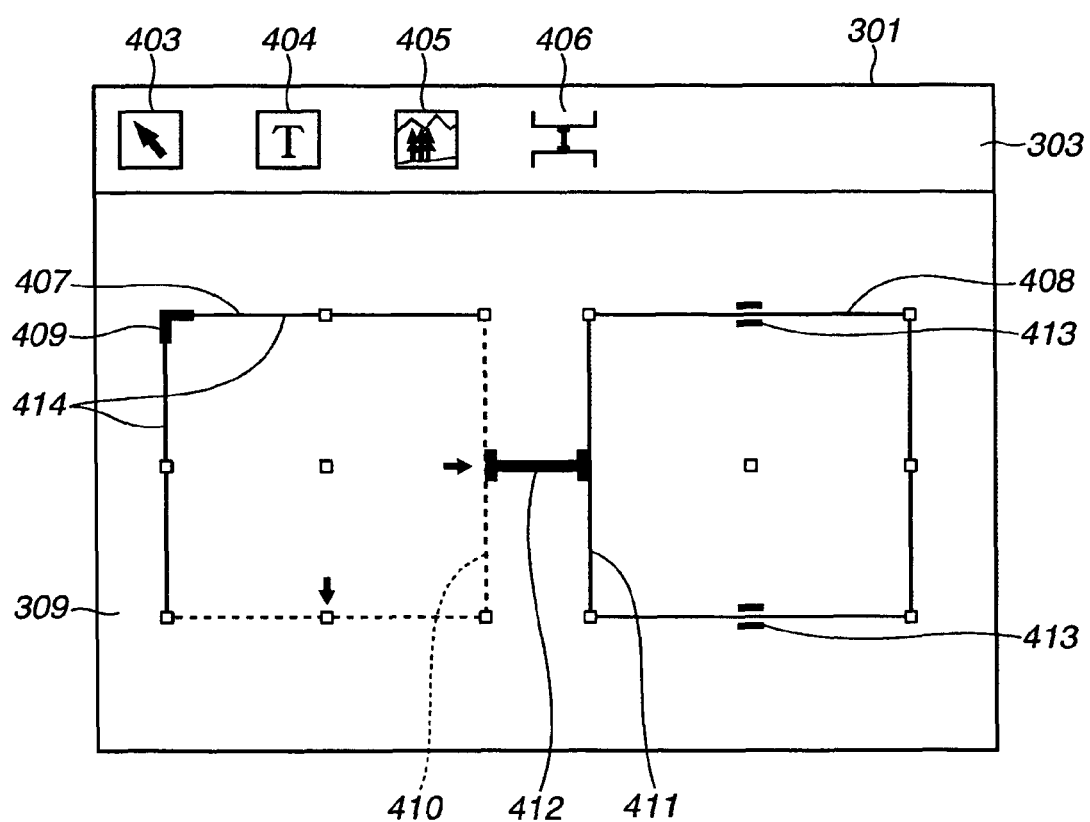
FIG. 4 is a diagram illustrating exemplary containers having a link provided therebetween, an anchor, and sliders in the embodiment of the present invention by using a screen, tools, and icons.

As shown in FIG. 4, various user-selectable "buttons" may be disposed on the tool bar 303 as follows:

(1) A selection tool button 403: This button is used to perform edge-selection, movement, size-change, resizing, or lock/unlock of a container. A container is selected by dragging a selection box around the container. The plurality of containers can be selected by performing a selecting operation on a plurality of containers while keeping the CTRL key pressed, the plurality of containers can be selected.

(2) A text container tool button 404: This button is used to create a container having a static or variable text.

(3) An image container tool button 405: This button is used to create a container having a static or variable image.

(4) A link tool button 406: This button is used to create a link that associates containers with each other. This button is also used to control the distance of the link.

In the application window 301 of the layout editing application 121 shown in FIG. 3, a basic layout can be determined by laying out containers and links in a page. The basic layout is a layout serving as the basis for variable data printing. When containers in the basic layout are fixed containers, all results of printing records have the same layouts. In a case where containers in the basic layout are flexible containers, the size or the position of each container varies within the range of constraints (to be described later) according to the amount or the size of data inserted for each record. The document template created by the layout editing application 121 is used for only determination of the basic layout. In a case where a flexible container is included, the final layout of a printed material is adjusted according to read data.

[Document Template]

Referring back to FIG. 3, the work area 306 is used to display and edit the design of the document template (180: basic layout). The document template may simply be referred to as a template. The outline of a document to be printed can be presented to the user in the process of causing the user to design the document template. Consequently, the user can easily understand how the document merged with the data source (190) changes according to the amount and the size of variable data.

When the data source is associated with the document template, a corresponding variable text or image is displayed in each container laid out so that a preview of a current document can be obtained. When the document template is created, visual constraint information (for instance, information on frame lines of containers, anchors, sliders, and links) representing the document structure of the document template and variable data containers in the document template are always displayed. In a preview mode in which variable data are inserted, the visual constraint information is displayed when the cursor is moved onto a container, or a container is selected.

The work area 306 includes a scroll bar 307, the optional ruler 308, and a document template 309. The document template 309 can indicate the presence of a plurality of pages. The document template 309 indicates the document template 180 shown in FIG. 1C. A border 310 shown in each page is an optional page margin representing the maximum width of a printable object on the page.

The page size of a given document template is designated by a user, using a known technique. For example, "Page Setup" is selected from "File" of the menu to display a dialog used to set the page size, on which the page size designated by the user is reflected. The actual number of pages of each document may change depending upon the variable data in the associated data source. This is because when a field like a flexible table, whose size is changed according to the amount of variable data, is set in the document template, and variable data, which cannot be fitted in one page, is read, an additional page is automatically created.

FIG. 4 is a diagram showing examples of objects which can be displayed on the document template 309 of one page. The objects include containers 407 and 408, an optionally applied anchor icon 409, fixed edges 411 and 414, an unfixed edge 410, a link 412, and sliders 413. The anchor icon 409 can be set at a corner or an edge of the rectangle of a container or the center of the container. When the anchor icon 409 is set, the position of the set point is fixed. That is, in the example shown in FIG. 4, the anchor icon 409 is set at the upper left corner of the container 407. When variable data is inserted into the container 407, and the image size or the text amount of the variable data is large, the container can be enlarged to the right and lower edges. When the anchor icon 409 is set on a side, the edge is fixed. The container can be enlarged in the directions of the three remaining edges. When the anchor icon 409 is set at the center of a container, the central position of the container is fixed. The container can be enlarged in four directions without changing the central position of the rectangle of the container.

The link 412 (to be described in detail later) indicates that the containers 407 and 408 are associated with each other. The link 412 indicates that the container 408 can be moved to the right while maintaining the length (the range can be designated) set for the link. The details of the link will be described by referring to FIG. 6. The sliders 413 indicate that the container can be moved in parallel to the edges on which the sliders are set.

[Exemplary Container]

An exemplary container will now be described. A container is a space (called a partial region or a data area), in which a fixed or flexible text or image is inserted from a variable data file to the document template and is drawn. A container is laid out together with other containers and objects, as illustrated in FIG. 4. The movement, the size adjustment, and the re-creation of the container are conducted by operating the mouse 133 according to an operation instruction from the user through the user interface window. Data inserted into the container is called contents or content data. More exactly, the container has a set of settings, visual expressions, interactions, and editing operations. The definition of a container according to the present embodiment will be described below.

(1) A container has fixed or flexible contents. Flexible contents can be dynamic because data acquired from the data source can change for each document, that is, each record. However, in the present embodiment, animated contents and contents that change with time by another method are not intended because such contents are not suitable for printing. Similarly, fixed contents are displayed in all documents generated by using containers. However, when flexible contents and a link are set, the fixed contents may be affected by the flexible contents and may differ in position in each document from one another.

(2) A container has ornament functions like text setting data, such as a background color, border, and font style, applied to contents. The setting data are called container attributes. The container attributes can be set for each container. The setting can also be conducted so that a container has the same container attribute as another container.

(3) A container is merged with data from the data source in generating a document. The ornament function is adapted so that all fixed contents can visually be recognized on a printed output product. Flexible contents provide display of specific data from the data source. This representation of the container can be, for instance, printed or displayed on the screen of the video display 144. Alternatively, both of the printing and the displaying of the representation are possible.

(4) A container has a user interface as a visual clue, as shown in FIG. 4. A container has, for example, an interactive graphical user interface (GUI) to edit the container or set display. Each element of the GUI is displayed on the screen of the video display 144 but is not printed in the document. The user interface 103 of the layout editing application 121 has a function of displaying some of the ornament functions of decorating a container, such as the background color and fonts, and a function of enabling the edition and the display of data for settings of the container.

[Exemplary Container Constraints]

Each of the containers has constraints on control of a manner in which contents displayed by the respective documents are combined with each other. These constraints (including constraints on the combination of a fixed or flexible content and a container) are used as a principal method of causing the user to control the creation of a number of documents from one document template. An example of the constraints is that "the maximum height of the content of this container is 4 inches". Another example of the constraint is that "the left edge of the contents of the container should be displayed at the same horizontal position in each document". The contents described herein indicate various methods of displaying and editing such constraints by using the GUI.

A content place holder designating the layout of fixed contents like an image, which has a defined place on a page, is known in the field of digital print techniques. Each container has a position and a size. The containers are edited and displayed by a method known as a publicly known technique. The following description is focused on display and edition of containers according to a method specialized for variable data printing.

The use of containers enables the user to designate the sizes (the drawing sizes) and the positions of contents in a document. Because a plurality of kinds of documents is created from one document template, various possibilities and constraints are set on the containers. To set (or designate) and display the possibilities and constraints, a predetermined user interface is used.

The edges of one container define virtual borders of associated contents displayed in the document. Similarly, discussion about the height of a container is equivalent to discussion about the constraints on the height of associated contents in the created document. In the present specification, the containers are clearly distinguished from the contents in discussing the edge or the size of a container by referring to the user interface 103.

In the following description, the term "fixed", which defines a certain value used to limit the display of contents, is similarly applied to all documents.

(1) In a case where the width of a container is fixed, the width to be assigned to associated contents is the same in all documents.

(2) In a case where the height of a container is fixed, the height to be assigned to associated contents is the same in all documents.

(3) In a case where a link distance (a link length) is fixed, the designated distance is a constraint in all documents.

(4) in a case where the left and right edges of a container are fixed, the horizontal positions of edges related to the page are the same in all documents. However, the height or the vertical position of the container may be changed. For instance, in a case where the left edge of a container is fixed, the position, at which associated contents are displayed, are the same horizontal position in all documents. However, the contents may be displayed on the upper edge of the page in a document and on the lower edge of the page in another document.

(5) In a case where the upper and lower edges of a container are fixed, the vertical positions of edges in the page are the same in all documents. However, the width or the horizontal position of the container can vary with documents.

(6) The vertical axis of a container is a virtual perpendicular line that is parallel to the right and left edges of the container and that is located at the intermediate position therebetween. In a case where the vertical axis of the container is fixed, the average of the horizontal positions of the left and right edges of the container (that is, the central position between the left and right edges) is the same in all documents. In this constraint, the width of the container may be changed. However, the vertical axis is placed at the same horizontal position in all of documents independent of whether the left and right edges are nearest to or farthest from the vertical axis. Incidentally, the height and the vertical position of the container are not affected by this constraint.

(7) Similarly, in a case where the horizontal axis is fixed, the average of the upper and lower edges of a container is placed at the same vertical position. However, the width and the horizontal position of the container are not affected by this constraint.

(8) In a case where both of the horizontal axis and the vertical axis are fixed, the central position of the container is fixed. However, the width and the height of the container are not affected by this constraint.

(9) In a case where the angular position of a container, the intermediate position of an edge of a container, or the central position of a container is fixed, the position is the same in all documents. For example, in a case where the upper left corner of a container is fixed, the upper left position of the disposed container is the same in all documents.

(10) The vertical edges or the vertical axis can be fixed by being associated with the left or the right edge of the page, the left or the right page margin, or another horizontal position. Similarly, the horizontal edges or the horizontal axis can be fixed by being associated with the upper or the lower edge of the page, the upper or the lower page margin, or another vertical position.

A term opposite to the term "fixed" is "flexible" that indicates that an edge, an axis, a corner, or an intermediate position of a container or a document constraint may change among documents (among records). For instance, in a page, the layout is expected to dynamically change depending upon the size or the amount of variable data. However, a user may wish to fix the size or the position of a specific container, or the four corners of a container at a corner of the page. For this purpose, the layout editing application 121 can appropriately set, for each container (each partial region), whether to fix or change an edge, an axis, a corner, or an intermediate position. Thus, the user can create a desired basic layout in the case of determining the basic layout of the document template 180.

[Exemplary Method of Creating a New Container]

Containers are described to be of two types, that is, a text container and an image container. A text container has a text and an embedded image. An image container has only an image.

As shown in FIG. 4, a new text container or image container is created on the document template 309 by clicking the mouse 133 on the text container tool 404 or the image container tool 405 and by dragging the tool on the document template 309.

Alternatively, a container may be created by activating the appropriate tool 404 or 405 and simply clicking the mouse on the document template 309. In this case, a container having a default size is inserted onto the template in response to the clicking operation of the mouse 133. Additionally, a dialog box or a prompt used to set the size of the new container is provided. The container size can be set by various methods. For example, the size may be defined automatically and preliminarily, or a container may be created and laid out by a calculated schema.

The generated container is selected by an input means, such as the mouse, and properties of the generated container are displayed by clicking on the right button of the mouse. Thus, the container property dialog is displayed so that constraints for the container can be set. In the container property dialog UI (corresponding to a partial region setting means), the aforementioned various kinds of constraints can be set. In the container property dialog, the size (the width and the height) and the position of the container can be set. To set a flexible size, the basic pattern (the standard size and the reference position) of the container is set. Additionally, the maximum container size (the width and the height) and the minimum container size (the width and the height) can be set. The container size set by using the aforementioned means is the standard size in setting the layout.

Figure 27:
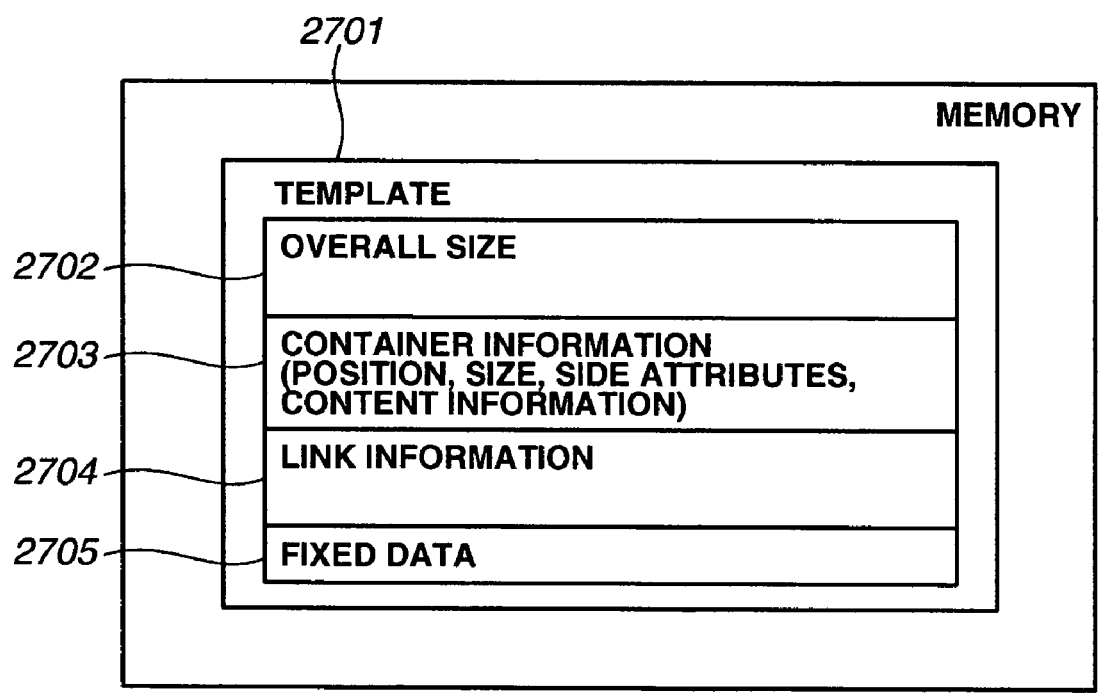
FIG. 27 is a diagram illustrating an example of the configuration of a template file in the embodiment of the present invention.

Incidentally, the set attributes of the container (the size of the container, which is set by a user by dragging, and the constraints set on the container) are described in a template file 2701 shown in FIG. 27. The template file 2701 is held in a memory unit 136, and can appropriately be referred to by the layout editing application 121. In a case where the conditions for constraints on a container are changed according to an instruction from a user, information described in the template file 1701 is updated.

[Exemplary Container Display Method]

FIGS. 5A to 5D illustrate display rules about the edges of a container. To express the state of an edge of a container, the application 121 expresses an edge by using a solid line (an item 503) or a dotted line (504). In addition, the application 121 uses an anchor (a line, a shape, and an icon designated by reference numerals 506, 507, and 509 drawn close to the edges), a handle (control points 502 drawn on or close to the edges of the region for movement and correction), sliders (short parallel lines drawn on both sides of an edge, 413 in FIG. 4), enlargement/reduction icons (505), and colors.

The rules for the container display method illustrated in FIGS. 5A to 5D are as follows:

(1) To fix an edge, it is drawn by a solid line.

(2) In a case where the width is fixed, the left edges and the right edges are drawn by solid lines.

(3) In a case where the height is fixed, the upper edge and the lower edges are drawn by solid lines.

(4) The axes are not drawn.

(5) Enlargement/reduction icons are drawn close to each of edges that are not drawn according to the rules (1) to (3). The edges are drawn by dotted lines.

(6) In a case where a pair of vertical and horizontal edges or a pair of vertical and horizontal axes are fixed, an anchor is drawn at the intersection therebetween.

(7) In a case where no anchor is drawn anywhere on a fixed edge, a slider is drawn at the center of the edge.

(8) In a case where neither anchor nor slider is drawn for the pair of vertical and horizontal edges or the pair of vertical and horizontal axes, a handle is drawn at the intersection therebetween.

The lines defined by the rules (1), (2), and (3) are fixed or are constrained, as described above, and are drawn by solid lines. Flexible edges defined by the rule (5) are drawn by dotted lines. Fixed points defined by the rules (6), (7), and (8) represent anchors. Some fixed edges represent sliders. Remaining points represent handles.

According to the aforementioned rules, constraints set by a user later have priority. That is, in a case where another constraint is set later and where the constraint affects edges to be drawn according to the aforementioned rules, the contents drawn by solid lines or dotted lines are changed.

A place, at which a flexible edge is drawn, depends upon the contents to be inserted into the container. As will be described later, "dynamic layout processing" is performed, which indicates that contents are merged with a document template and are visualized by the user interface. Alternative execution is used by another means adapted to determine the layout position of a flexible edge in the user interface or the content area of the container averaged over all documents.

These content expressions provide a graphical means adapted to display the state of each edge of a container. The expressions can be interpreted as follows:

(1) A dotted line indicates that the position of the edge in the document changes depending upon the contents inserted into the container, similarly to the edge 410 shown in FIG. 4.

(2) A solid line indicates that the edge is restricted because it is fixed (an edge 414), or the width or the height of the container is fixed (in the container 408, the four edges are indicated by solid lines so that both the width and the height are fixed).

(3) An anchor indicates that the point, at which an edge and an axis intersect with each other, is fixed. Thus, the anchor point may appear at each of the horizontal positions and the vertical positions in all documents. The anchor is fixed, as a matter of course. The icon 409 shown in FIG. 4 is an example of an anchor icon indicating that the position, at which the edges 414 intersect with each other, is fixed.

(4) A slider indicates that the associated edge may be translated although the associated edge has a fixed length. For example, an image size or a text amount of the contents to be inserted into the container 407 associated with the container 408 (a link is set between the containers 407 and 408) is small, the size of the container 407 is small, so that the container 408 is laid out by being leftwardly slid (or translated). Conversely, in a case where the size of the container 407 is large, the container 408 is laid out by being rightwardly slid.

Some or all of these icons and edges are drawn or are not drawn depending upon which tool or container is selected/highlighted or activated. Generally, the container edges and icons are not drawn on a printed material, because the container edges and the icons are assistant tools used to design the document template.

As described above, settings for the basic pattern including the basic values, the minimum values, and the maximum values of the width and the height of a container are displayed in a secondary dialog.

Figure 5A:
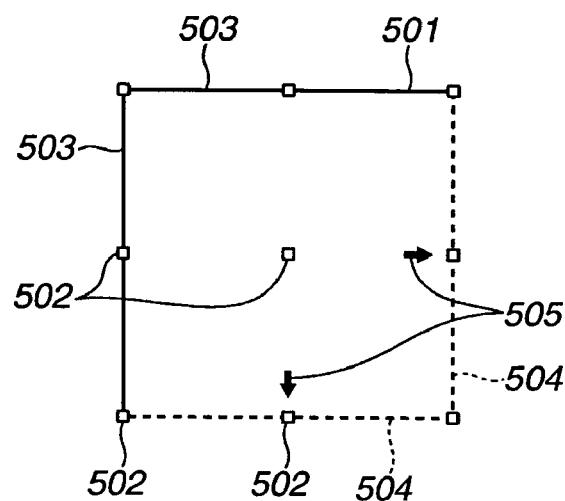
FIGS. 5A to 5D are diagrams illustrating exemplary container rules in the embodiment of the present invention.

Referring to FIG. 5A, in a container 501, neither the width nor the height is fixed (both of the width and the height are flexible). The fixed edges 503 are represented by solid lines. The flexible edges 504 are represented by dotted lines. The enlargement/reduction icons 505 indicate that the adjacent edges 504 are flexible. An indicator having another form may be used, instead or additionally.

Figure 5B:
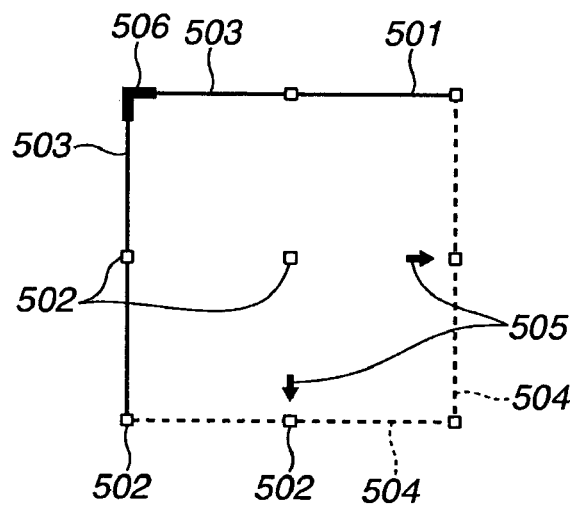

Referring to FIG. 5B, the container 501 is such that both of the width and the height are flexible. The anchor icon 506 is added to explicitly indicate that the position of the corner, at which the edges 503 intersect with each other, is fixed.

Figure 5C:
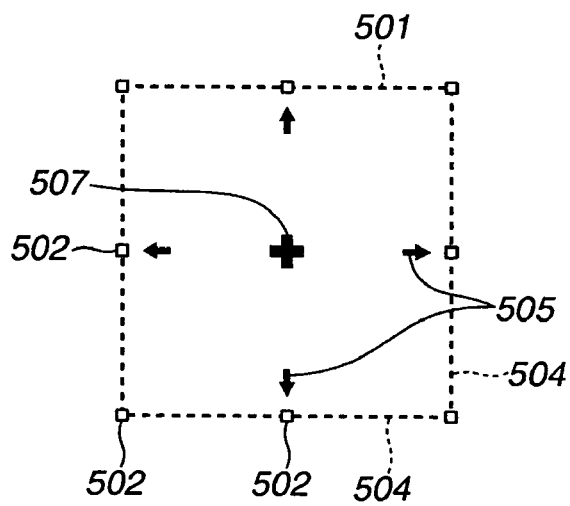

Referring to FIG. 5C, the container 501 is such that both of the width and the height are flexible. In this state, the container can extend equally from the central point indicated by the given anchor icon 507. That is, the container 501 can be enlarged or reduced around the anchor icon 507. In enlargement/reduction, the layout is adjusted such that the anchor icon 507 is always positioned at the central point of the container 501.

Figure 5D:
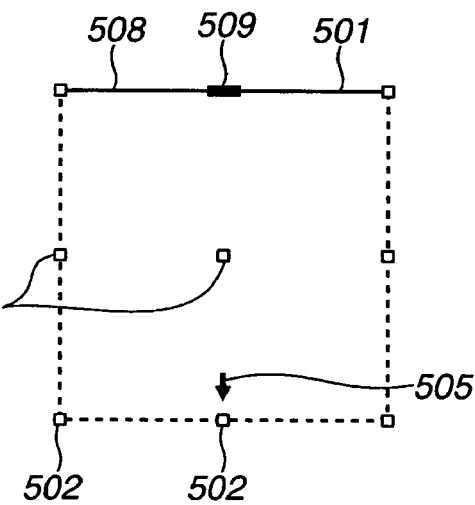

Referring to FIG. 5D, although an upper edge 508 of the container 501 is fixed, both the width and height of the container 501 are flexible. The anchor icon 509 positioned at the center of the upper edge 508 is fixed. The left edge and the right edges (502) of the container 501 enlarge or reduce the container around the central axis (the vertical axis) extending perpendicularly through the anchor icon 509.

[Exemplary Link]

A link indicates the association between a container and another container. The association indicates the distance between the containers. The layout of containers associated by a link is calculated under the influence of layout change therebetween. Reference numeral 412 shown in FIG. 4 denotes a link that associates the containers 407 and 408 in FIG. 4. The link setting method and the layout calculation method for containers associated by a link will be described later.

[Link Setting Method]

Figure 6:
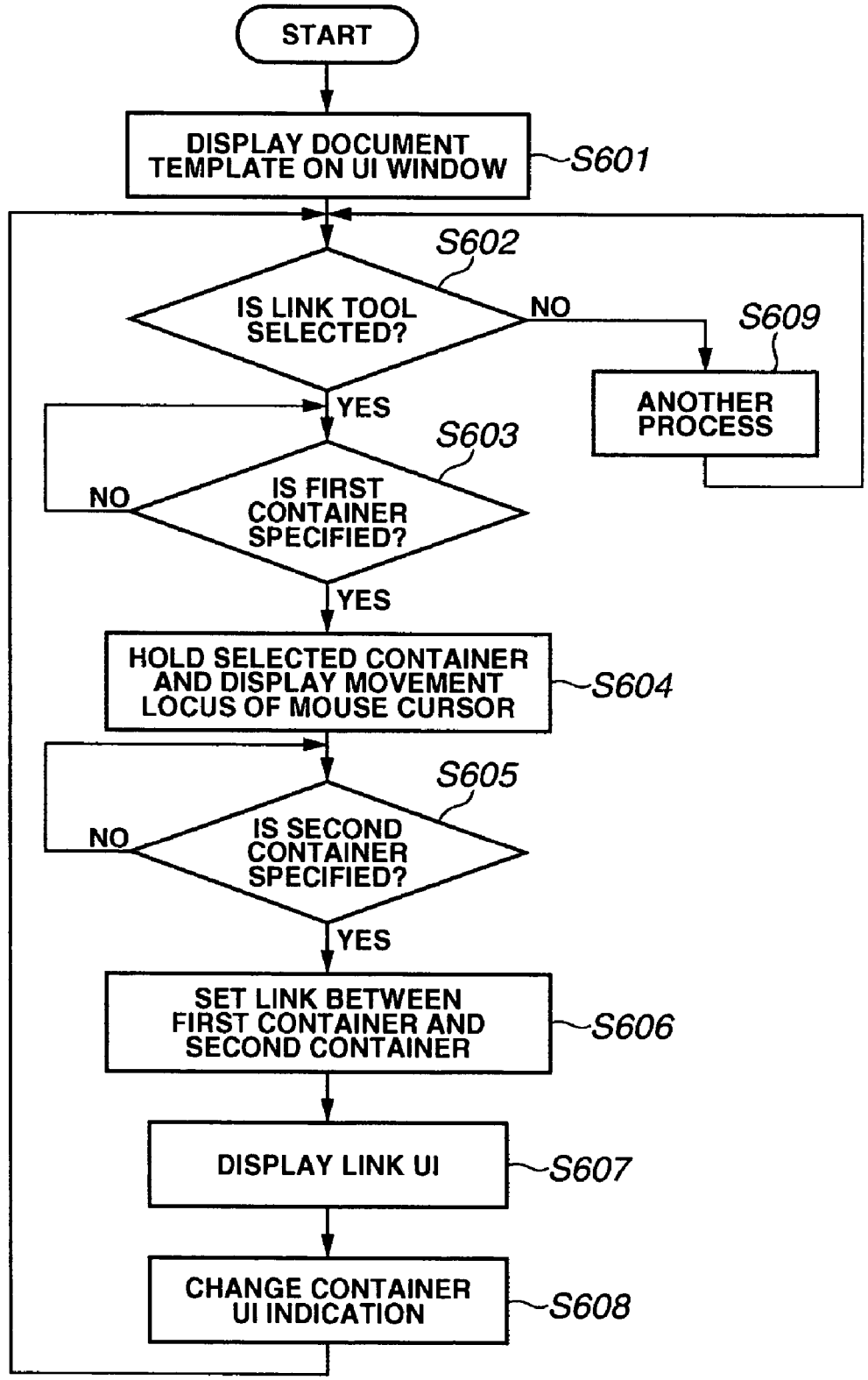
FIG. 6 is a flowchart illustrating exemplary creation of a link in the embodiment of the present invention.
Figure 7A:
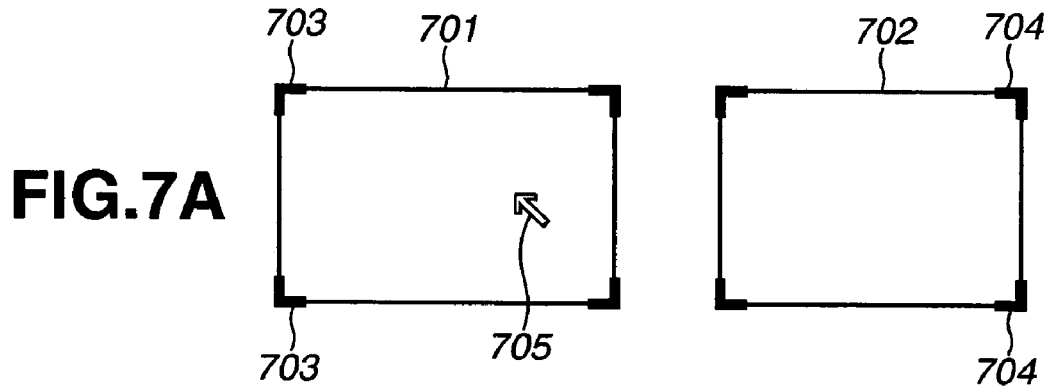
FIGS. 7A to 7C are diagrams illustrating an example of change of a user interface (UI) in a case where a link is set by creating containers.
Figure 7B:
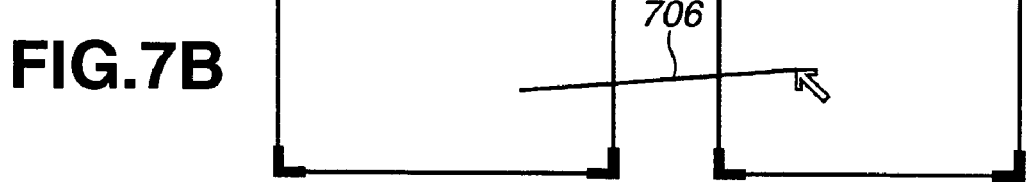
Figure 7C:
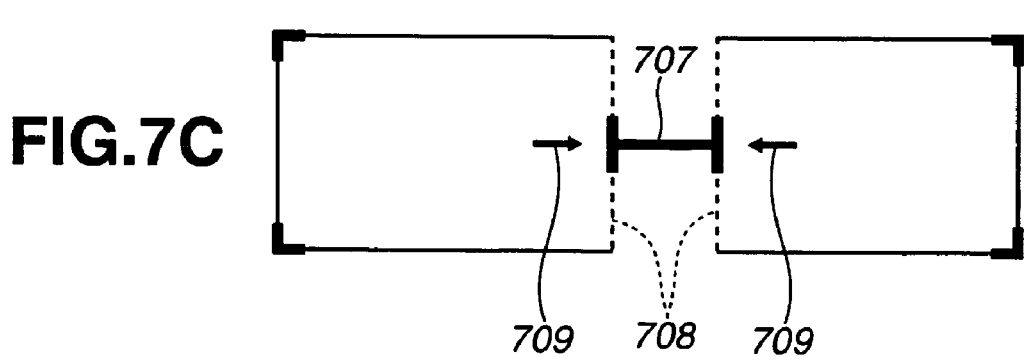

Next, exemplary setting of a link to associate containers with each other is described below. FIG. 6 is a flowchart showing the exemplary link setting method. FIGS. 7A to 7C show an example of change of the user interface (UI) in setting a link. An exemplary method of setting a link between containers is described with reference to FIGS. 6 and 7A to 7C. Incidentally, processing to be performed in each of the steps shown in the flowcharts of the present application is performed by the processor 135 provided in the computer 101.

Referring to FIG. 6, first, in step S601, the layout editing application 121 displays a document template, which is selected to edit, on the work area 306 of the user interface window. To set a link, containers (at least two containers) to set a link should be created on the document template. FIGS. 7A to 7C (which will described in greater detail later) show an example of change of the user interface in a case where two containers are created in step S601, and where a link is set.

Subsequently, in step S602, the layout editing application 121 determines whether the aforementioned link tool is set in a selected state (a selected state is set by clicking on the button 406 shown in FIG. 4). If the link tool is not in the selected state, another processing is performed as needed in step S609. Then, the process returns to step S602.

Referring to FIG. 7A, it is assumed that containers 701 and 702 includes only fixed edges. Reference numerals 703 and 704 denote anchors, which are similar to the anchor 409 shown in FIG. 4. Reference numeral 705 designates a mouse pointer. In a case where the link tool is in the selected state, the user clicks on one (the container 701) of the two containers, for which a link is to be set, to select the container. In response to this operation, the user interface 103 of the layout editing application 121 recognizes that the first container is designated in step S603 and holds information used to specify the selected container. Also, a locus corresponding to further movement of the mouse cursor is displayed on the screen in step S604. For instance, a line segment 706 shown in FIG. 7B indicates a line that connects the clicking point in the state shown in FIG. 7A and the current position of the mouse cursor. The position, at which a link to be set, can explicitly be presented to the user by using this UI.

Subsequently, as shown in FIG. 7B, the user moves the mouse pointer to the other container (the container 702) and clicks on this container. In response to this operation, the user interface 103 recognizes in step S605 that the second container is designated. In step S606, the layout editing application 121 sets a link between the first container held in step S604 and the second container, the designation of which is recognized in step S605 as a designated container.

Then, in a case where the link is set between the two containers 701 and 702 selected by the user, a link UI 707 is displayed in step S607. Additionally, in a case where the link is set, the display state of the containers is changed to that shown in FIG. 7C in step S608. That is, in a case where the link is set, the UI of the containers is automatically changed. In this case, the edges associated with each other by the link are changed to flexible edges and are indicated by dotted lines. Referring to FIG. 7C, edges 708 are indicated by dotted lines. That is, the edges 708 are flexible ones, as described above.

The state of the edges of the containers is automatically changed, as illustrated in FIG. 7C, because the containers should have flexible edges due to link setting. This aims at preventing occurrence of contradiction that even when a like is set, all edges are fixed. Reference numeral 709 designate marks that visually indicate the user the directions in which the containers can change due to link setting, similarly to the icons 505 shown in FIGS. 5A to 5D. In the example shown in FIG. 7C, the right edge of the left container and the left edge of the right container are changed to flexible edges. This is only an example. For example, the right container may be changed to setting with the sliders designated by reference numeral 413 in FIG. 4.

The link information (for instance, information representing a link size, and information indicating that the link is a fixed link) is described in the template file shown in FIG. 27 and is held in the memory unit 136. In a case where the fixed link is changed to a flexible link by the user performing, for example, processing to be described later, the information described in the template file 2701 is updated.

[Exemplary Layout Calculation Method (Overall Flow)]

FIG. 8 shows an overall flow of an exemplary layout calculation. The layout editing application 121 of the present embodiment has a layout mode, in which containers are created by using the user interface 103, and in which a layout is created by associating the containers with each other (link setting), and a preview mode in which each record of a data source is inserted in the created layout by the layout engine 105, and the layout result is previewed after actual record insertion. In the preview mode, actual records are inserted, and a layout is calculated in accordance with the above-described priority order. However, in the preview mode, the layout for display is calculated. Even in the case of actual printing, the layout is calculated by causing the layout engine 105 to insert data in each container. The calculation method at that time is the same as that use in the preview mode.

Referring to FIG. 8, first, the layout editing application 121 recognizes in step S801 that the preview mode is selected (step S801). When the preview mode starts, in step S802, the layout editing application 121 causes the user to select a record to be previewed from the data source, and determines that each field data of the selected record is inserted into each container. When the insertion of the field data in each container is determined, in step S803, the layout editing application 121 performs calculation so as to lay out the record, and also performs layout adjustment as needed. The layout calculation in step S803 is described below in detail.

In step S804, the layout editing application 121 displays the layout calculated in step S803. In step S805, the layout editing application 121 determines according to a user's instruction whether another record is previewed. If it is determined in step S805 that there is no need for previewing another record, the preview mode is finished in step S807. If it is determined in step S805 that there is need for previewing another record, the layout editing application 121 selects another record, performs layout calculation again, and previews the layout in step S806.

When the apparatus is not in the preview mode and performs printing, layout calculation is performed sequentially on all records to be printed. Thus, step S804 is omitted. In step S805, it is determined whether all records to be printed are processed. Results of the layout calculation performed in step S803 are output by being drawn out. Then, print data is generated by using the printer driver and is output to the printer. In this case, when print data output is performed on all records (all records to be designated as those to be printed), the process is finished.

[Exemplary Layout Calculation Method (Detail Flow)]

Figure 9:
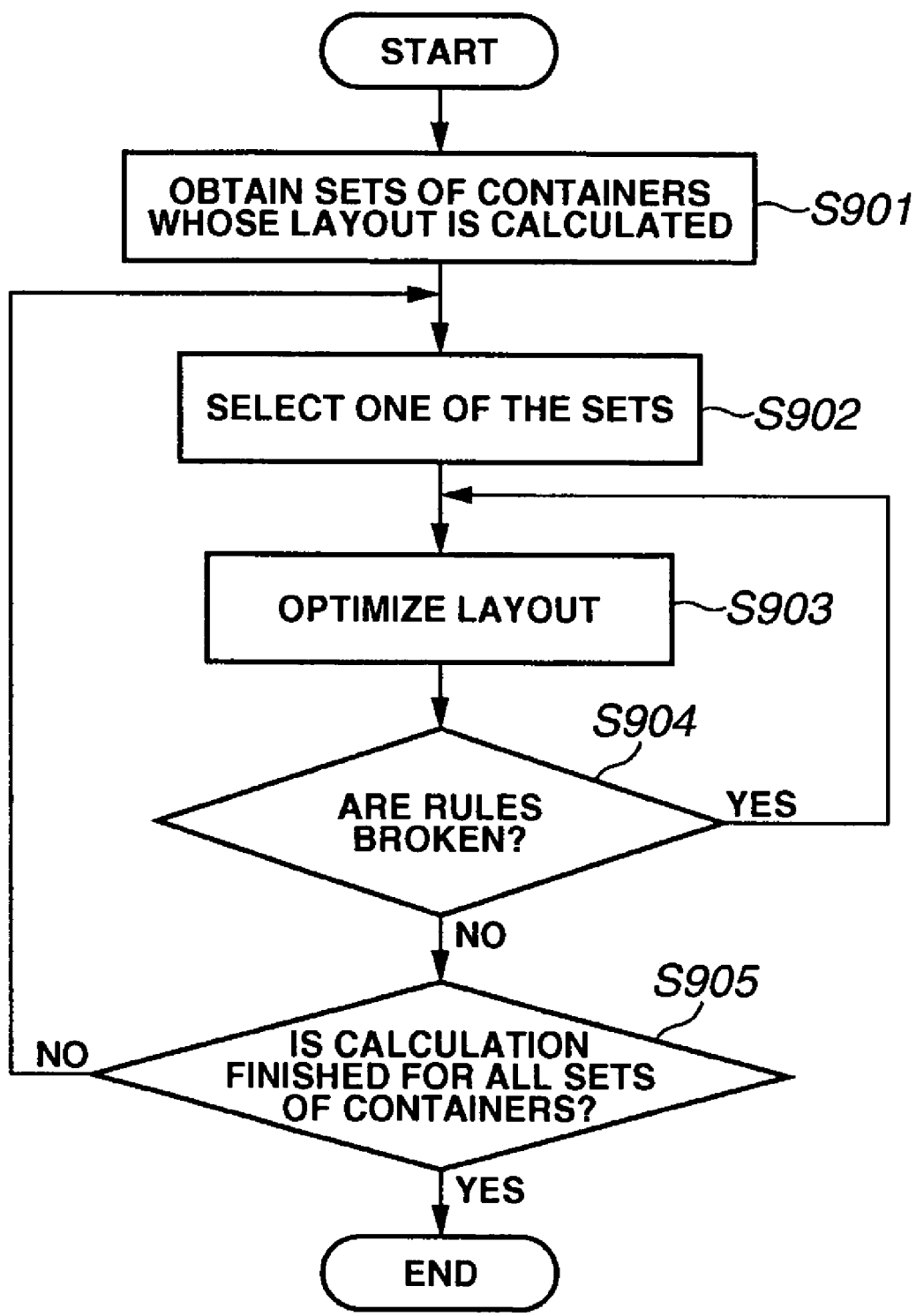
FIG. 9 is a detailed flowchart illustrating the layout calculation.
Figure 10A:
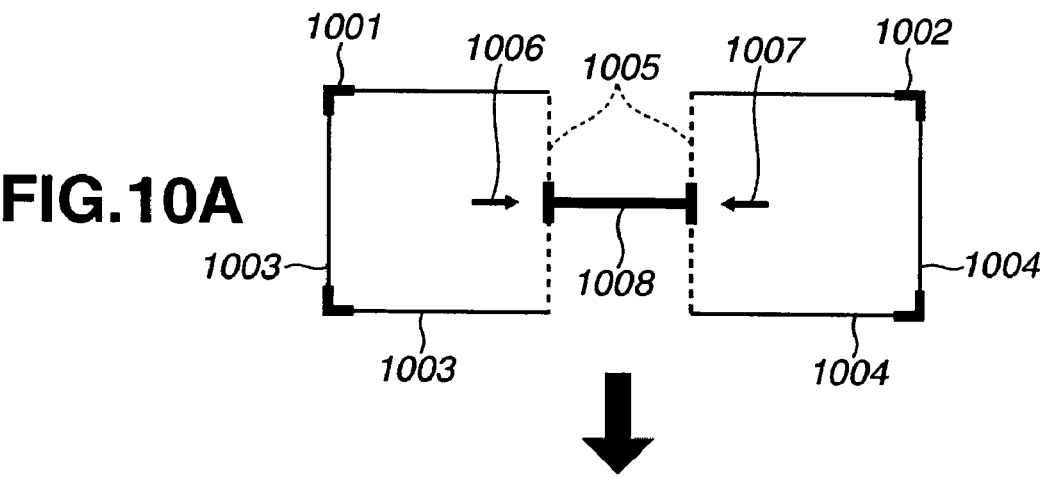
FIGS. 10A to 10C are diagrams illustrating an example of a UI corresponding to the flowchart illustrated in FIG. 9.
Figure 10B:
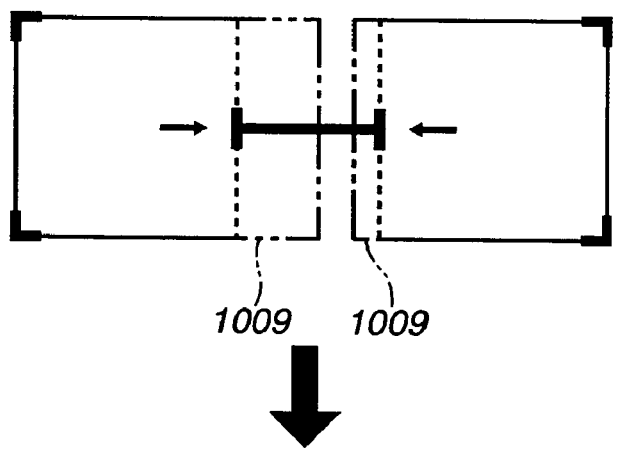
Figure 10C:
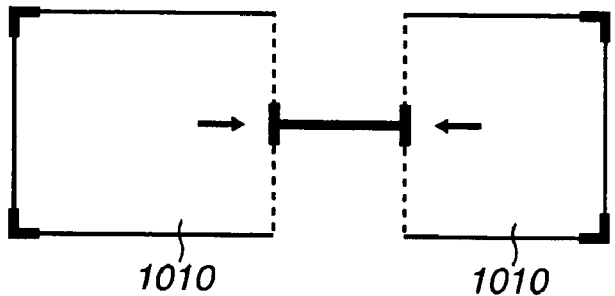

Next, the layout calculation in step S803 is described below in detail. FIG. 9 is a flowchart illustrating a layout calculation method in a case where the layout priority is not set in the present embodiment. FIGS. 10A to 10C are diagrams illustrating an example of the UI display at that time. FIG. 9 corresponds to the layout calculation method of printing/previewing one record for variable data printing. In a case where a plurality of records are present, the following process is repeated.

Figure 11:
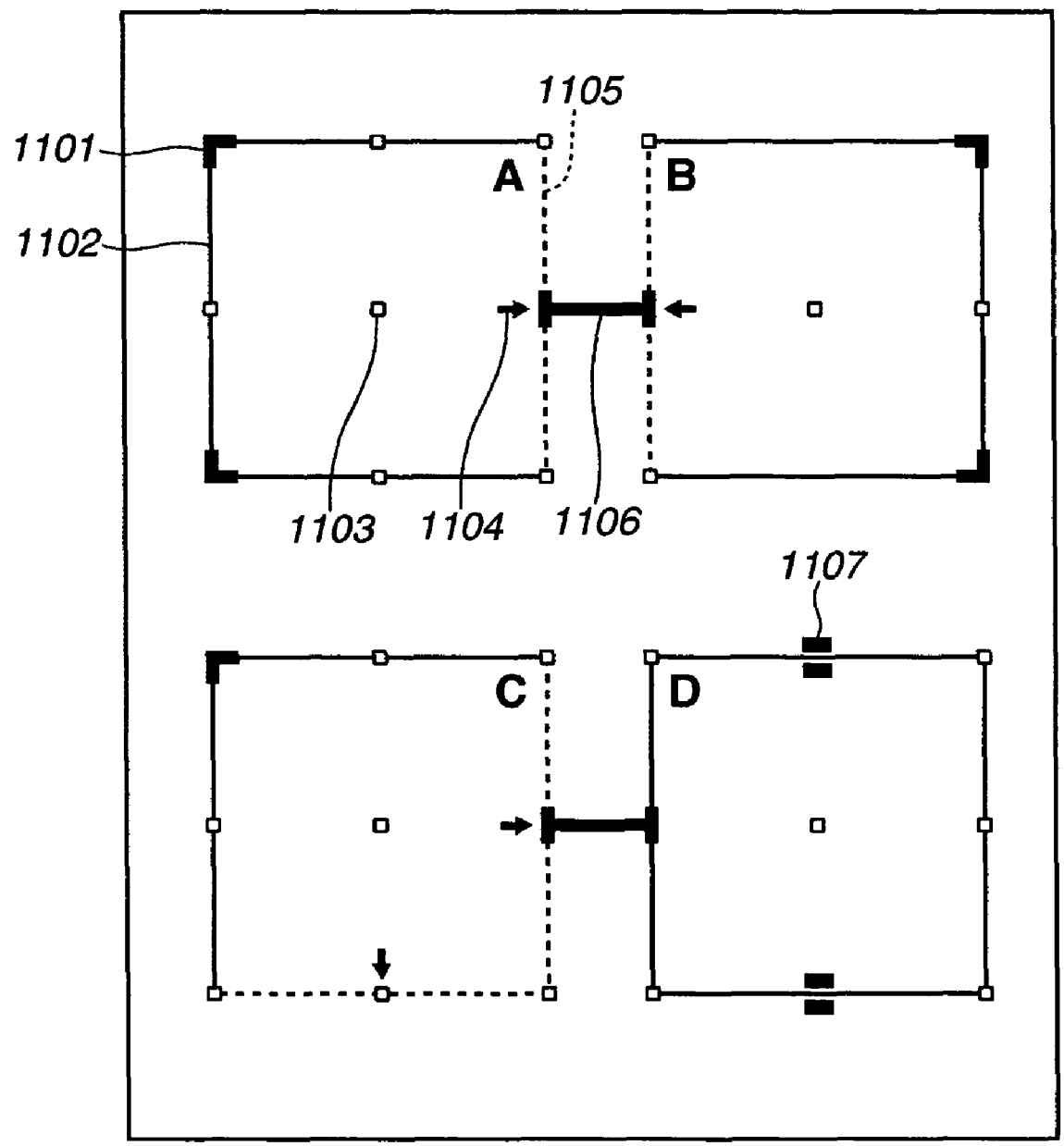
FIG. 11 is a diagram illustrating an exemplary set of containers in the layout calculation in the embodiment of the present invention.

First, the layout editing application 121 recognizes a set of containers, whose layout should be calculated, in step S901. Layout calculation is performed on a set of associated containers. Referring to, for example, FIG. 11, four containers are laid out on a page and are associated with each other. In this case, containers A and B are associated by a link, and containers C and D are also associated by a link. Thus, the containers A and B constitute a first set, and containers C and D constitute a second set. That is, a group of containers connected by a link is specified as a set. As described above, reference numeral 1101 denotes an anchor, reference numeral 1102 designates a fixed edge, reference numeral 1103 denotes a controller, reference numeral 1104 designates an arrow that indicates the change direction of a flexible edge, reference numeral 1105 denotes a flexible edge, reference numeral 1106 designates a link, and reference numeral 1107 denotes a slider.

Next, in step S902, the layout editing application 121 selects one of the container sets obtained in step S901. Layout calculation is performed on the selected container set. First, the sizes of the two containers A and B as flexible elements included in the selected set of containers are calculated in a case where the containers are unaffected by the image size or the text amount of content data to be flowed into the container. More specifically, the layout editing application 121 determines which of an image data container and text container the container A is. This determination can be conducted according to the attribute set for the container, as described above.

Next, the layout editing application 121 reads out the data flowed into the container A. In a case where the container A is an image data container, the size (the number of horizontal pixels, the number of vertical pixels, and the resolution) of the image data is defined as the size of the container A without any constraint. In a case where the container A is a text container, a constraint is applied, because the aspect ratio of the container A cannot be determined without considering a constraint. In the example illustrated in FIG. 11, because anchors are set at the upper left and lower left corners of the container A, the height (the longitudinal direction) is fixed. Thus, the layout editing application 121 determines whether characters corresponding to the calculated data amount (the text amount) can be flowed (inserted) into the container A having the width (the lateral direction) set as the basic pattern of the container A. If it is determined that all characters can be inserted, the standard size (the width and the height) set by the basic pattern does not change in the container A. If it is determined that it is impossible to flow all characters thereinto, the container A expands in the lateral direction, because the height is fixed by setting the anchors. Incidentally, the layout editing application 121 calculates the width of the container A, which enables the characters of the calculated amount to be flowed thereinto, to thereby calculate the size of the container A.

Next, the layout editing application 121 optimizes the layout in step S903 such that the difference between the size of each container to be laid out and the actual content size becomes as small as possible. The layout is optimized such that the difference between the size of the contents to be inserted and the size of layout becomes equal to one another as much as possible among the containers associated with one another to dynamically change the sizes. The layout editing application 121 obtains the size of the containers set selected in step S902, that is, the total size of the container A, the container B, and a link 1106 (a fixed link in this case). Then, the layout editing application 121 calculates the difference between the total size and the size of the container set in the basic layout (in the example shown in FIG. 11, the size of the container set corresponds to the distance between the anchor icons of the containers A and B). If the width of the container A or B is increased by the calculation in the preceding step, a difference value is generated. The layout editing application 121 equally distributes the difference value to the elements of the container set thereby to adjust the layout.

The layout editing application 121 optimizes the layout. If the rules are broken, the calculation is performed again in step S904 to prevent any violation of rules. The rules described herein are constraints set by the user when the layout is created. Examples of the constraints are a constraint on the container size changing range or container position, and for a flexible link, a constraint on the change in link length. In a case where the layout is calculated without breaking the rules, the layout of the set is completed. The process including steps S902 to S904 is performed on all sets on the page. The layout editing application 121 calculates the layout of the entire page in step S905.

FIGS. 10A to 10C illustrate a UI example at the creation of the layout of containers without setting the priority.

FIG. 10A shows a state in which a certain record is inserted, and in which the layout is determined. Reference numerals 1001 and 1002 denote anchors. Reference numerals 1003 and 1004 designate fixed edges. Reference numeral 1005 denotes a flexible edge. Reference numerals 1006 and 1007 designate an arrow that indicates the change direction of a flexible edge, and reference numeral 1008 denotes a link. In this state, the records are changed, and contents having different sizes are inserted. Referring to FIG. 10B, the sizes of the new contents are superimposed on the state shown in FIG. 10A. Reference numeral 1009 denotes a size of the content to be inserted in each container. Layout calculation is executed. FIG. 10C shows the result of layout calculation. The sizes of the containers are calculated so that the containers have the same difference from the size of the contents to be actually inserted, and that the aforementioned rules are not broken. As shown in FIG. 10C, the content size (1009) of the contents to be inserted, which is shown in FIG. 10B, and a content size (1010), which is obtained after calculation, have the same difference from the reference container size.

However, the process of performing layout calculation, which is performed so that the content sizes have the same difference therefrom, causes no problems in a case where the layout calculation is performed in consideration of only the adjustment in the lateral direction, as illustrated in FIGS. 10A to 10C. However, in a case where the layout calculation should be performed in consideration of the adjustment in each of the longitudinal direction and the lateral direction as illustrated in FIG. 30, the process of performing layout calculation may be unable to deal with problems.

Figure 30:
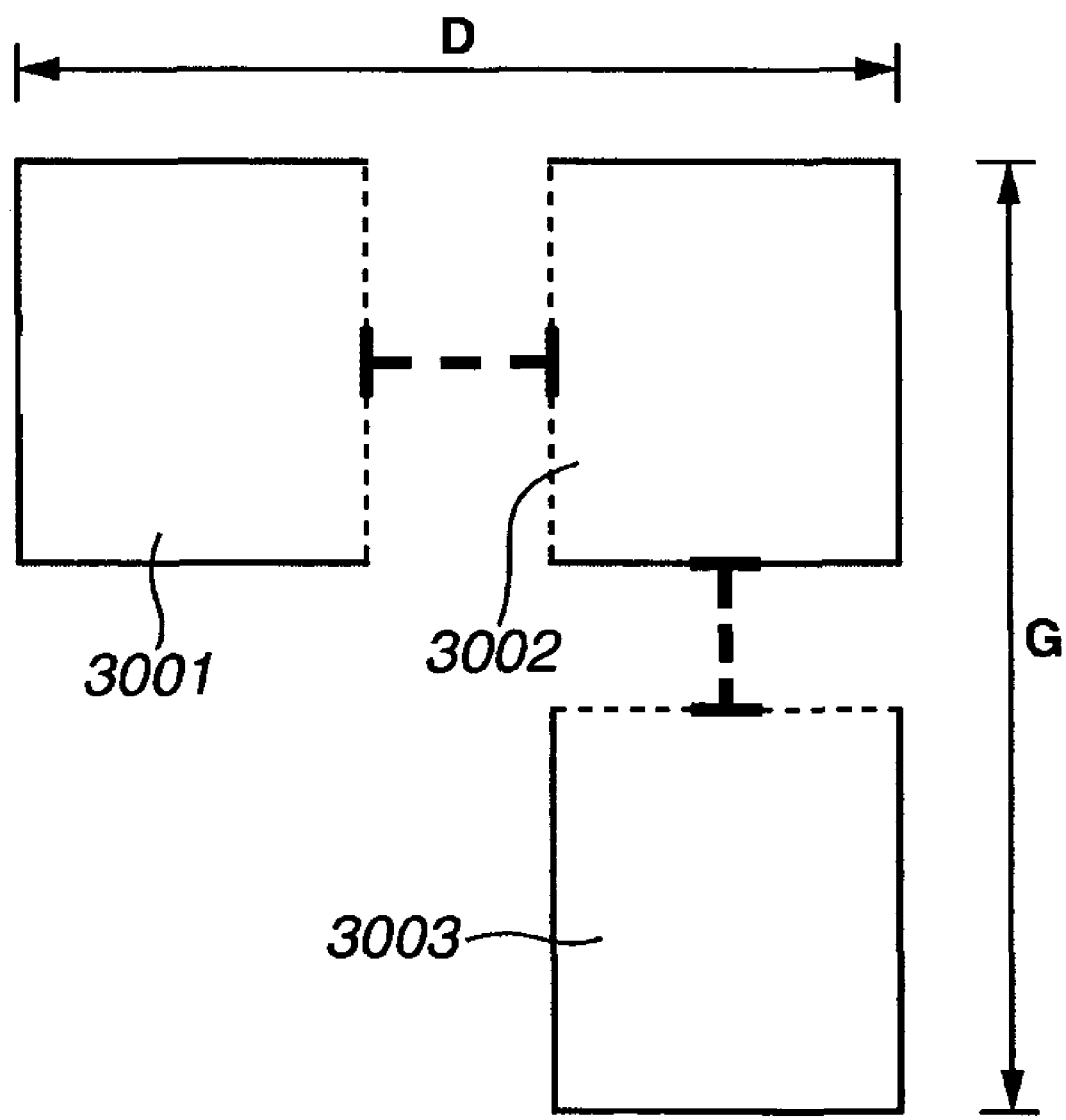
FIG. 30 is an explanatory diagram illustrating an exemplary layout optimization process in the embodiment of the present invention.

In the case illustrated in FIG. 30, in which the apparatus deals with a two-dimensional layout to be adjusted in the lateral direction and the longitudinal direction, first, adjustment in the lateral direction is performed by using the layout calculation method illustrated in FIG. 9. Subsequently, adjustment in the longitudinal direction is performed. That is, layout adjustment is performed on containers 3001 and 3002 so that the containers 3001 and 3002 are fitted in a preset value of a range D in the lateral direction, and that the containers 3002 and 3003 are fitted in a preset value of a range G in the longitudinal direction.

However, it is assumed that according to the adjustment method of performing adjustment in the lateral direction, and subsequently performing adjustment in the longitudinal direction, a resultant layout is deviated from the user's desired basic layout.

Thus, to prevent each of the containers from being deviated from the basic pattern (for example, the size of each container and the aspect ratio of each container) at the layout design, it can be considered to perform, for example, a method of obtaining a sum of the square of the difference between the width of the basic pattern and the width obtained after the layout adjustment is performed, and the square of the difference between the height of the basic pattern and the height obtained after the layout adjustment is performed, corresponding to each of all of the containers.

Also, the layout editing application 121 may perform the layout adjustment by calculating the width and the height of each of all of the containers so that a sum of the square of the difference in the lateral direction and the square of the difference in the longitudinal direction has a minimum value. Thus, the layout adjustment is conducted using the least-square method to thereby determine a totally well-balanced final layout without being largely deviated from a user's initially set basic layout.

Because the flexible link to be described later is set between the containers, the link size is changed according to the size of the content data to be flowed thereinto. The layout editing application described in the present application has such a layout adjustment unit thereby to perform layout adjustment so that the content size of the content data and the size of the container (or the data area), into which the content data is flowed, is small, and to perform the adjustment of the positions of a plurality of partial display regions (or containers) according to the size of the allotted data.

Also, in the foregoing description, the use of the least square method has been described as an example of the layout adjustment algorithm. However, the layout adjustment algorithms may be changed among algorithms, which use the third power or the fourth-power of the difference by a predetermined operation.

[Exemplary Setting of Link with Flexible Length]

Figure 12:
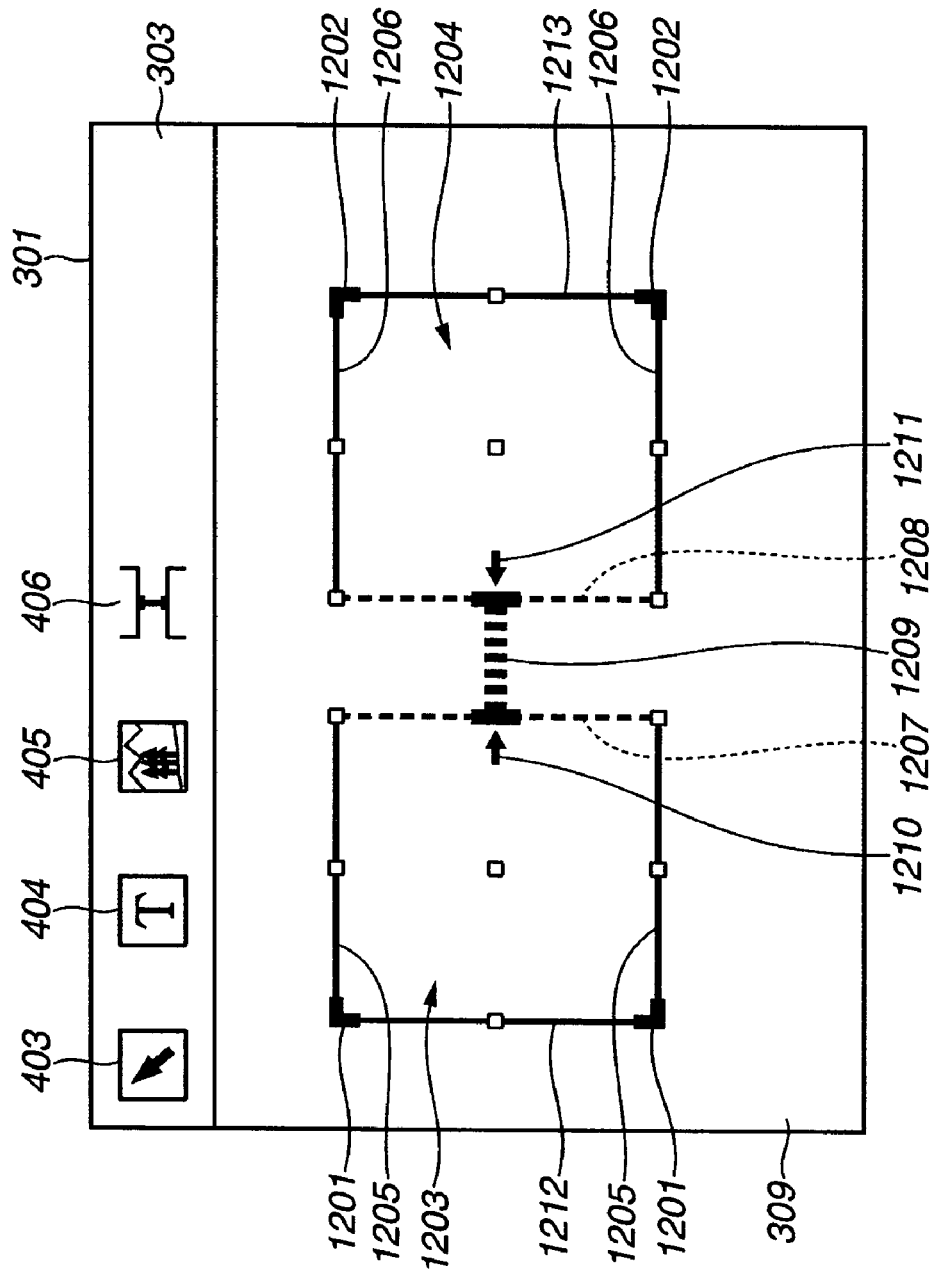
FIG. 12 is a diagram illustrating an exemplary layout of containers by a flexible link in the embodiment of the present invention.

FIG. 12 shows a user interface to set a flexible link. Similarly to the case shown in FIG. 4, the user interface has the application window 301 and the tool bar 303. In the state shown in FIG. 12, containers 1203 and 1204 are present on the document template 309. The containers 1203 and 1204 include anchor icons 1201 and 1202 and fixed edges 1205 and 1206. A link 1209 having a flexible size is set between the containers 1203 and 1204 to connect these containers. Because the link is set between the containers 1203 and 1204, a right edge 1207 of the container 1203 and a left edge 1208 of the container 1204 are indicated by dotted lines. Thus, indicators 1210 and 1211 are displayed in the containers to indicate that the edges 1207 and 1208 are flexible.

Figure 14:
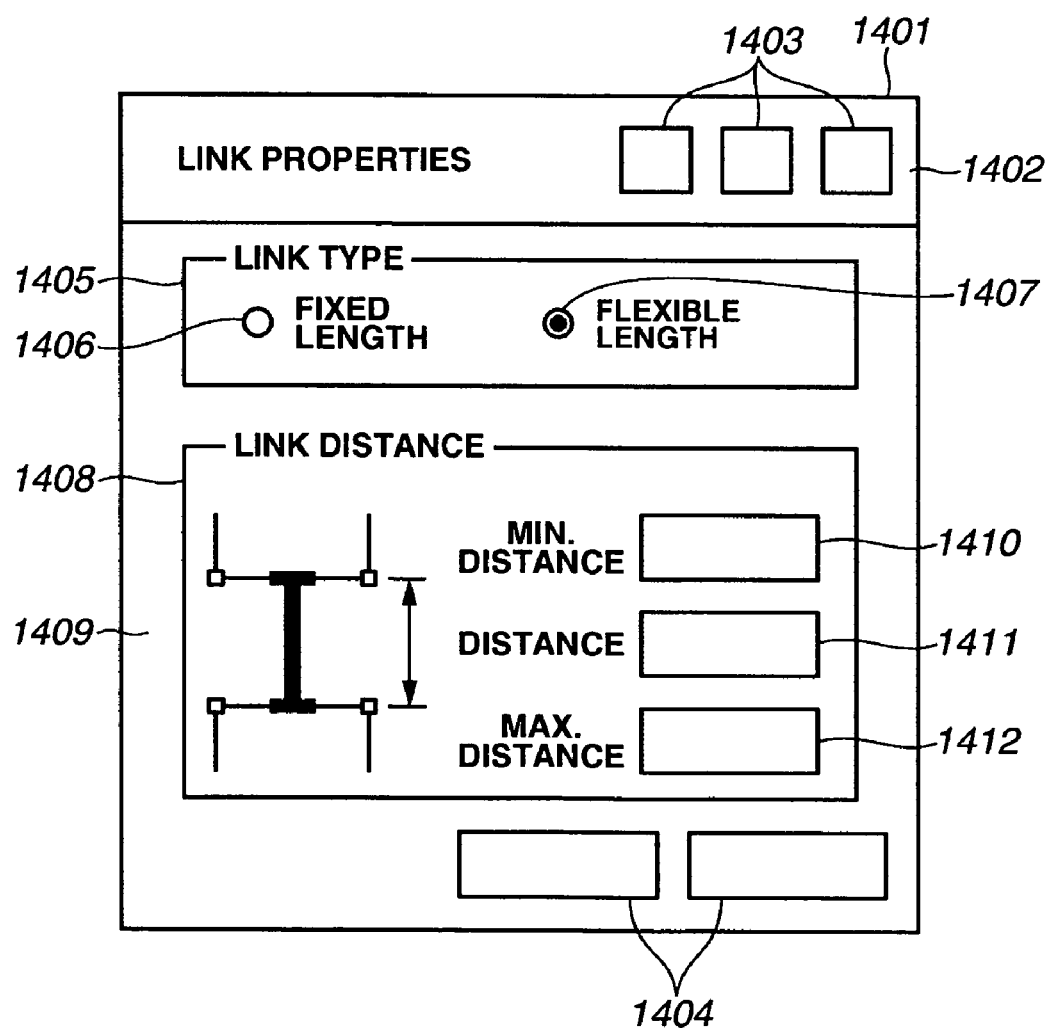
FIG. 14 is a diagram illustrating an example of a dialog window in which a link is set.

FIG. 14 shows a user interface window for use in setting a link, and also shows an example of a dialog window 1401 to set the information of the link 1209. This dialog includes a title bar 1402, a tool button 1403, buttons 1404 to open/close the dialog, and an area 1409 used to set various kinds of information. In this dialog, the link type can alternatively be selected from a flexible length (1407) and a fixed length (1406). In a case where the link type is "flexible", the minimum value (Min. Distance 1410), the maximum value (Max. Distance 1412), and the reference value (Distance 1411) of the link length can be set. The dialog window 1401 shown in FIG. 14 is displayed when a link is set between two containers by the link setting operation described with reference to FIGS. 6 and 7A to 7C. The set link is selected by, for example, a clicking operation. Alternatively, immediately after a link is set, the dialog window 1401 relating to the link may automatically be displayed. The reference value 1411 of the distance between the containers indicates a link length used when the size of each container does not change when the data is flowed thereinto.

Figure 13:
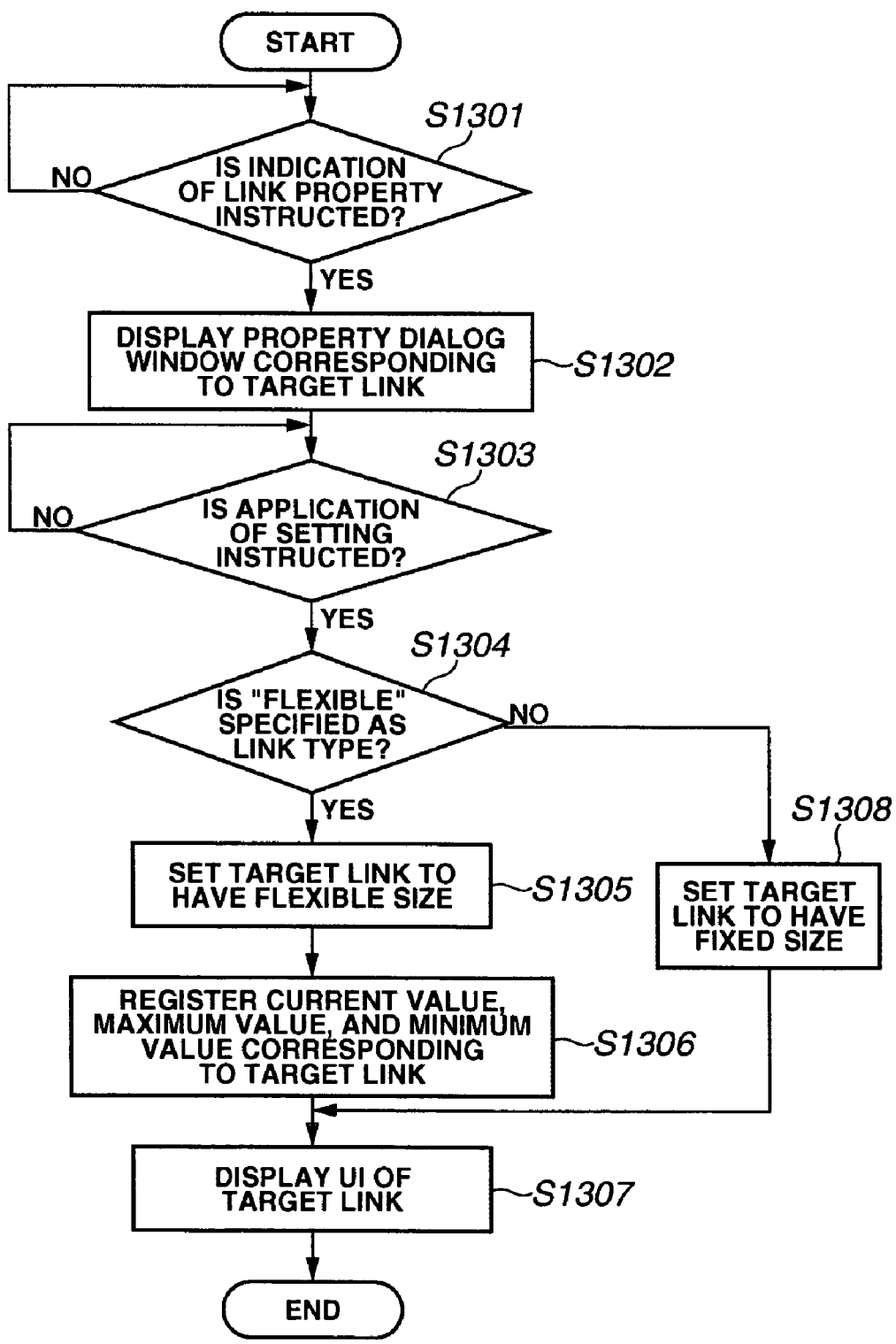
FIG. 13 is a flowchart illustrating an exemplary change of an operation to a state shown in FIG. 12 in the embodiment of the present invention.

FIG. 13 is a flowchart illustrating exemplary flexible link setting procedures by using the user interface 103 according to the present embodiment. For example, when a link is set between, for instance, the containers A and B shown in FIG. 11 according to the procedures described with reference to FIGS. 6 and 7A to 7C, first, a link having a fixed size is set. The process illustrated in FIG. 13 is performed by selecting this link, so that the link can be changed from a link 1106 (FIG. 11) having a fixed size to a link 1209 (FIG. 12) having a flexible size.

Referring to FIG. 13, first, a desired link (for example, a link 1106) is selected by the mouse thereby to perform a predetermined operation to display link properties. The user interface 103 of the layout editing application 121 recognizes the operation as an input of a link property display instruction in step S1301. When the link property display instruction is recognized, the property dialog window 1401 corresponding to the selected link (hereunder referred to as a target link) is displayed as illustrated in FIG. 14. Subsequently, the user interface 103 displays link properties in step S1302. A link can be selected by any operation, such as an operation of clicking on the right button of the mouse or operating a specific key of the keyboard, similarly to the setting of the basic pattern of a container.

The current state of the selected link is shown in the dialog window 1401 (from FIG. 14) displayed in step S1302. In this example, because the link 1106 is selected, the link size is fixed at this step. As a Link Type 1405, the Fixed Length 1406 indicating a fixed length is selected.

In the dialog window 1401, the Flexible Length 1407 is selected as the Link Type 1405 to change the size of the link from the fixed size to the flexible size. Consequently, the Max. Distance 1412, Min. Distance 1410, and Distance 1411 arranged in a Link Distance 1408 are enabled, so that numerical values can be set. To set the flexible size of the link, the user sets the maximum value of the link length in the Max. Distance 1412, the minimum value in the Min. Distance 1410, and also sets the current value in the Distance 1411.

Upon completion of setting, the user instructs application of the setting by clicking on the general dialog opening/closing buttons 1404. When the user interface 103 detects this instruction, the processing advances from step S1303 to step S1304 or later to reflect the set state on the target link. In step S1304, the layout editing application 121 determines which of a fixed size and a flexible size the target link has. When a fixed size is designated, the process advances to step S1308 to set the size of the target link at a "fixed size". In step S1307, the display state of the target link is changed to a "solid line" state representing a "fixed link".

If it is determined in step S1304 that a flexible size is designated, the process advances to step S1305. The layout editing application 121 sets the size of the target link as a "flexible size". Then, in step S1306, the current value (or the reference value), the maximum value, and the minimum value of the target link set in the dialog window 1401 are registered. Subsequently, in step S1307, the display state of the target link is changed to a "dotted line" state representing a "flexible link". Consequently, the state of the UI display of the link is changed to the state indicated by the link 1209 in FIG. 12 in step S1306. The pieces of setting-information of the dialog window 1401 are stored in the memory unit 136. It is further noted that as the current value set in the Distance 1411, the distance between the containers currently laid out may automatically be input as a default value.

Figure 15:
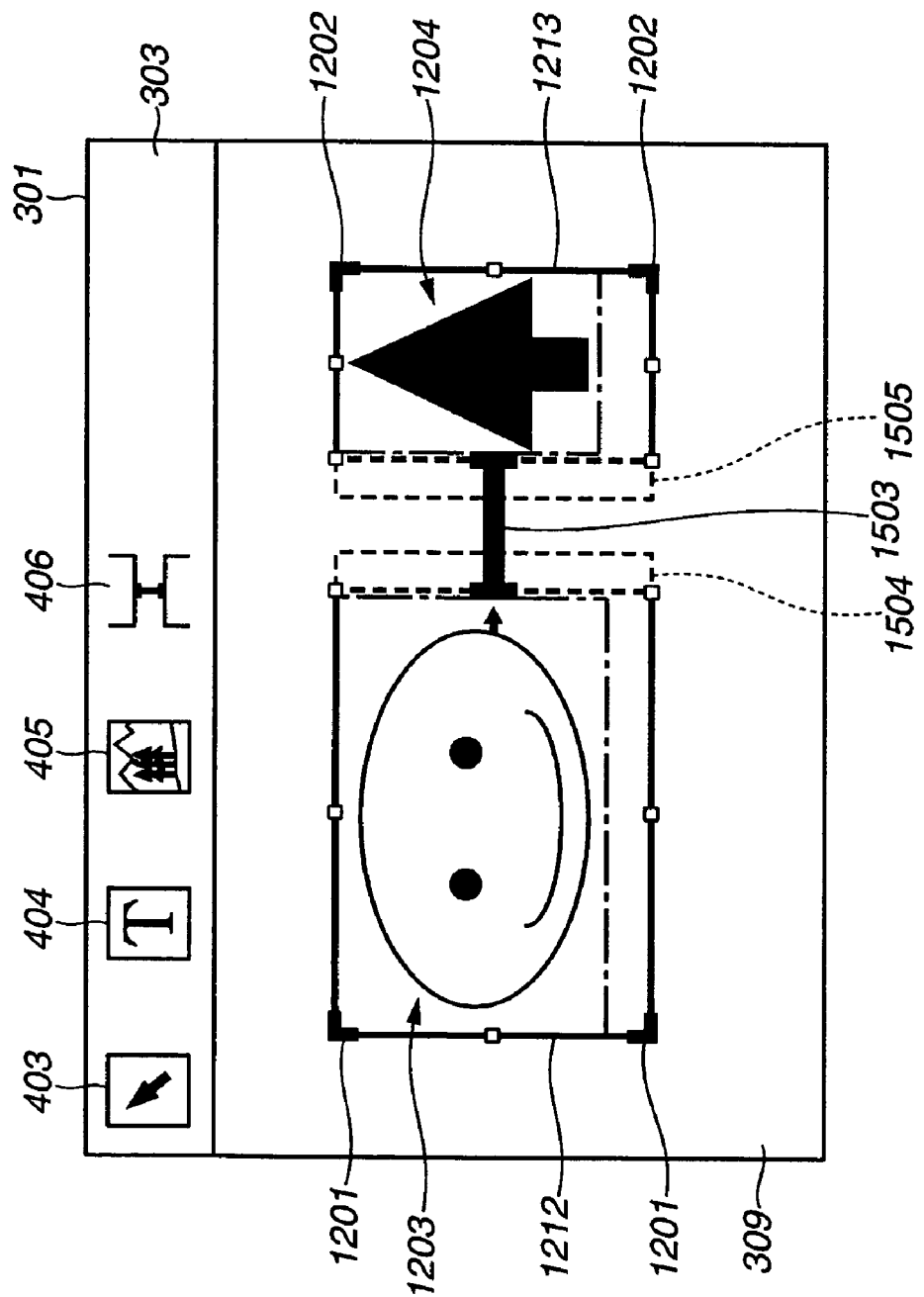
FIG. 15 is a diagram illustrating a layout result obtained by a fixed link in the embodiment of the present invention.

FIG. 15 shows an exemplary layout result in a case where a link having a fixed size is used. Layout calculation is performed in the above-described way. For example, it is assumed that image data having different sizes are inserted in the containers 1203 and 1204 shown in FIG. 15. In this case, each container regards the data size as being optimum. The size of the container 1203 is rightwardly changed to a frame 1504 (an optimum container size) corresponding to the size of the inserted image. Similarly, the size of the container 1204 is changed leftwardly to a frame 1505 (an optimum container size) corresponding to the size of the inserted image. However, the left edge 1212 of the container 1203 and the right edge 1213 of the container 1204 cannot be moved, because of the anchors 1201 and 1202. To change the sizes of the containers, the distance therebetween must be shortened. However, a link 1503 having a fixed size is set between the containers. Because the link length is maintained in the layout calculation, the sizes of the containers 1203 and 1204 are changed.

Consequently, the containers 1203 and 1204 cannot ensure the optimum sizes corresponding to the aspect ratios of the data. Finally, as shown in FIG. 15, the container sizes are smaller than the optimum sizes (the frames 1504 and 1505). That is, because the size of the link 1503 is fixed, the containers 1203 and 1204 cannot achieve the optimum sizes (as shown in FIG. 15, the range indicated by the alternate long and short dashed lines in each container represents the aspect ratio of the data).

Figure 16:
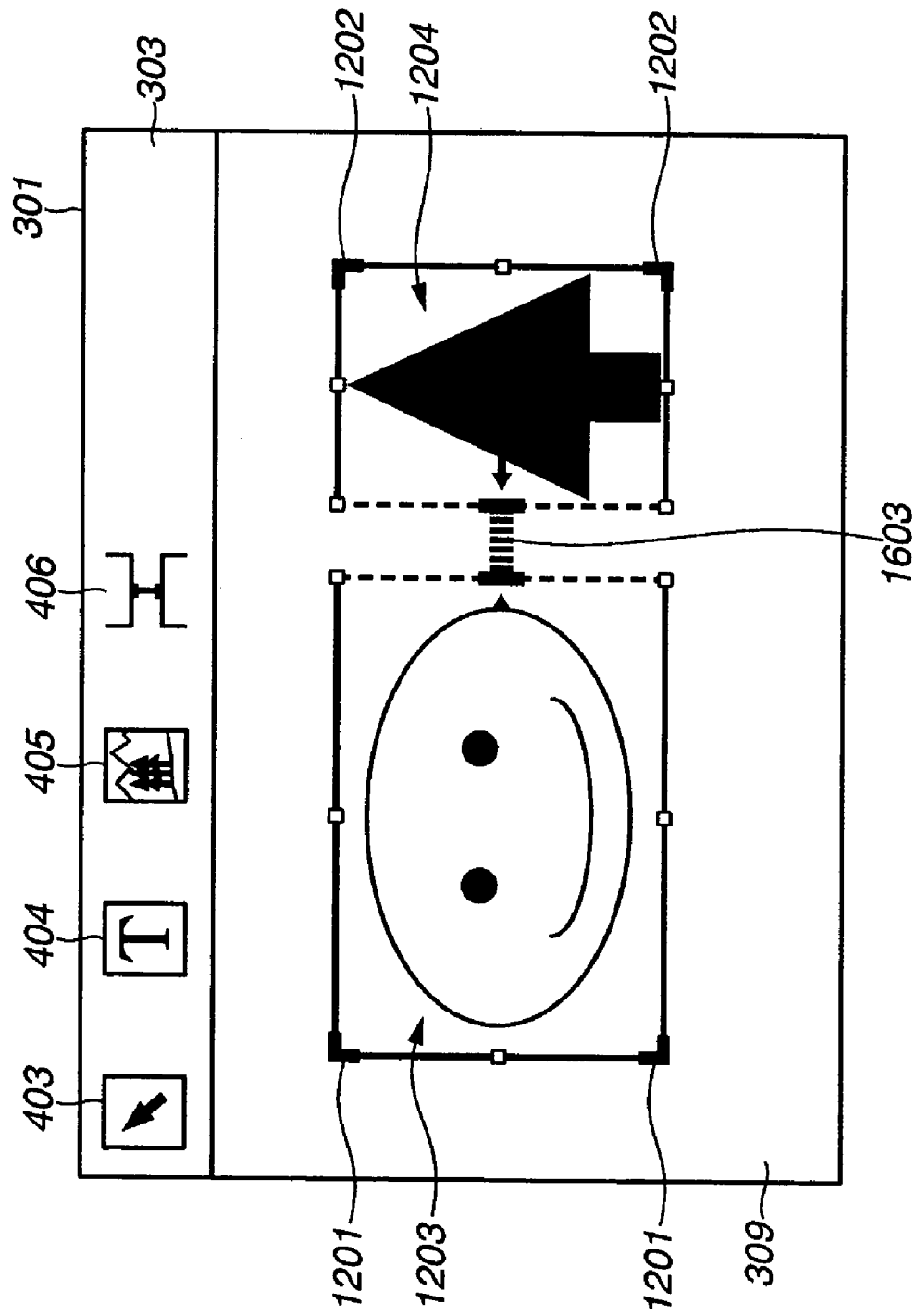
FIG. 16 is a diagram illustrating an exemplary layout result obtained by a flexible link in the embodiment of the present invention.

Meanwhile, FIG. 16 shows a similar case as in FIG. 15 except that the link has a flexible size. In this case, a link having a flexible size is set between the containers 1203 and 1204 of the aforementioned example, as shown in FIG. 16. Thus, when the sizes of the containers 1203 and 1204 are changed, the link size decreases so that the containers 1203 and 1204 can be made to be larger than those in the example shown in FIG. 15. Consequently, optimum sizes corresponding to the inserted data sizes can be achieved. Alternatively, container frames being close to the sizes of the inserted data (the optimum sizes) can be set. FIG. 16 shows this result. The size of the flexible link 1209 changes to a size indicated by a flexible link 1603 as a result of layout calculation. In this case, the containers 1203 and 1204 have optimum sizes (that is, sizes corresponding to the data sizes).

[Exemplary Overall Flow]

Figure 28:
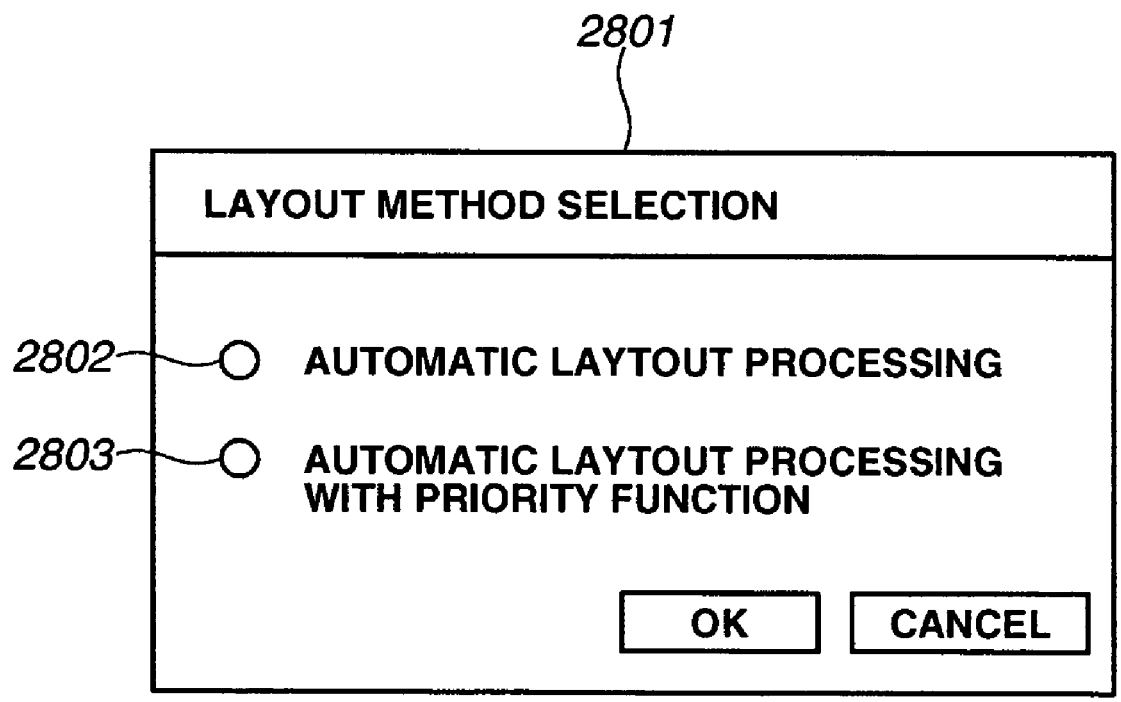
FIG. 28 is a diagram illustrating an exemplary layout method selecting dialog in the embodiment of the present invention.

FIG. 28 shows an exemplary layout method selection dialog 2801 displayed by a predetermined operation before the layout editing application 121 starts an automatic layout process. The "automatic layout method" 2802 and an "automatic layout method with priority" 2803 are displayed in the layout method selection dialog 2801. In a case where the automatic layout method with priority 2803 is selected by using the layout method selection dialog shown in FIG. 28, not only the execution of the layout process, in which the priority is set, illustrated in FIG. 29 but the selection of two layout processing methods (to be described later), in which the priority is changed according to the content data to be flowed into each container, (the difference between "the actual size of the contents and the basic size" or the difference between "the actual size of the contents and the container size obtained after the layout is performed") is enabled. Thus, according to the present invention, one of the automatic layout process, the automatic layout process with priority, and the two automatic layout processing methods according to the changed priority can be selected.

In a case where the automatic layout method 2802 is selected by using the mouse pointer, the layout editing application 121 performs the layout process described in FIGS. 8 and 9 when the layout adjustment is performed by flowing the content data into the set container and the set link. Alternatively, when the automatic layout method 2803 with priority is selected, priority is set on each container.

Hereinafter, an example of the layout process performed in the case where the automatic layout with priority 2803 is described by referring to FIG. 29. The containers A, B, and C designated by reference numerals 2901 to 2903, respectively, are associated with the fixed link 2904. The sizes in the horizontal direction of each of the containers and the links are set, as illustrated in this figure. A total of the sizes of the containers and the links is 57. It is assumed that a total of the sizes in the horizontal direction of the containers and the links is fixed in this layout. When the content data A', B', and C' designated by reference numerals 2905 to 2907 are newly inserted to the containers A, B, and C, respectively, stress (or a load on the layout) is generated, because of the difference between the content data and the size of each of the containers.

The content data A' to C' have actual sizes (or ideal sizes). The actual size of each of the contents is set, as illustrated in the figure. The actual sizes of the content data A', B', and C' are 17, 13, and 27, respectively. In a case where the contents are texts, the ideal size thereof is determined according to the content amount (the text amount) of the contents of the current contents, the font size set on the container, the flexible/fixed value and the maximum value/the minimum value of the aspect ratio, and so on. Also, in a case where the contents are images, the size (or the number of pixels arranged in each of the longitudinal direction and the lateral direction) of the image data is an ideal size.

To layout all of the content data having the ideal sizes after inserting them into the containers, a total of the following horizontal sizes, that is, 69, is needed. That is, 17 (the contents A')+5 (the link)+13 (the content B')+7 (the link)+27 (the contents C')=69. However, as described above, the horizontal size of this layout is fixed and is 57. Therefore, the difference therebetween 12 (that is, 69−57=12) is the stress to which this layout is subjected. Then, the stress is distributed to the containers. According to the present automatic layout system, the stress, to which the layout is subjected, is calculated to be minimized. The technique used at that time is the aforementioned least square method.

The following description is described by assuming that High Priority, Normal Priority, and Low Priority, that is, 75%, 50%, and 25%, are set on the containers A (2901), B (2902), and C (2903), respectively.

Let a, b, and C respectively denote the sizes of the containers, which are obtained after the layout calculation. A cost k, which is a sum of the squares of the stress applied to each of the containers, is given by the following equation (1).

$$k=(a-17)^2+(b-13)^2+(c-27)^2 \qquad (1)$$

Also, the following equation (2) is obtained from the size of the layout obtained after the calculation.

$$a+5+b+7+c=57 \qquad (2)$$

Next, an equation in a case in which the cost k is minimized is derived. However, because the priorities are set this time, it is necessary that the stress applied to each of the containers is multiplied by the priority. Thus, the following equation is obtained.

$$75/100(a-17)=50/100(b-13)=25/100(c-27) \quad (3)$$

Thus, the size of each of the containers, which are obtained after the calculation in consideration of the priority is performed, can be found from the equations (2) and (3). In this case, the stress applied to the containers is distributed thereto according to the priorities. The sizes of the containers A", B", and C" (2908 to 2910), which are obtained after the calculation, are 14.82, 9.73, and 20.45, respectively. That is, it is found that the containers having high priorities are laid out so that the sizes of the containers are close to the ideal sizes of the content data, respectively. Also, although the layout is performed only in a horizontal direction in this example, the calculation of the layout in the vertical direction is performed by employing a similar method.

That is, as a result of multiplying the stress by the priority in the equation (3), concerning the group of containers associated by the link, the ratio of the differences between the calculated layout sizes of the containers and the ideal sizes of associated contents is equal to the ratio of the reciprocals of the priorities set for the containers in the containers associated by links. Consequently, the higher the priority of a container is, the smaller the difference from the ideal size is. Thus, a layout, on which the ideal size (the actual size) of each content data is reflected, can be created.

Figure 29:
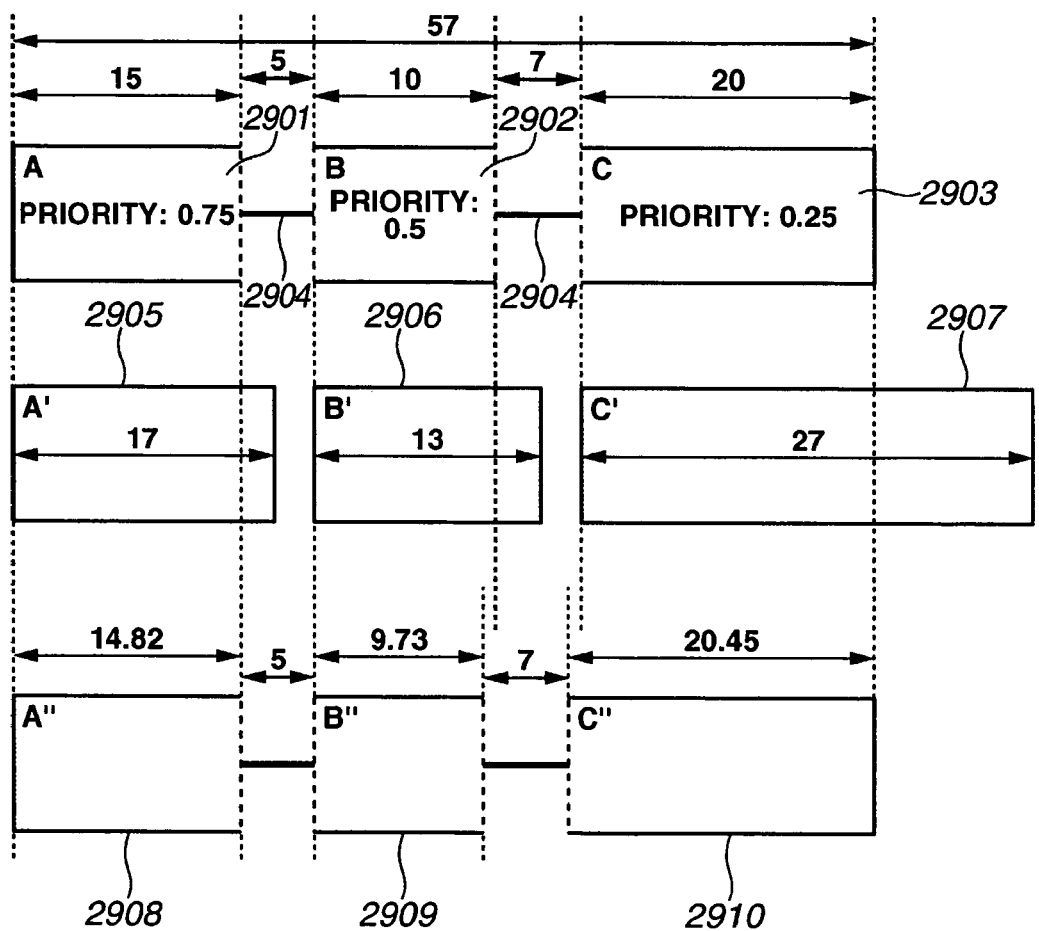
FIG. 29 is a diagram illustrating an example of a layout process performed according to an automatic layout method with priorities in the embodiment of the present invention.

However, in the case illustrated in FIG. 29, the priority should be set on each of the containers. Thus, the priority cannot be changed according to the content data to be flowed into each of the containers Hereinafter, an exemplary method of altering (or changing) the priority according to the content data to be flowed into each of the containers is described below. It is assumed that priorities are set in the case illustrated in FIGS. 17 and 18 by using a priority setting dialog 3200 illustrated in FIGS. 32A to 32C. The change of the priority in the present embodiment is an operation of altering the priority.

Figure 17:
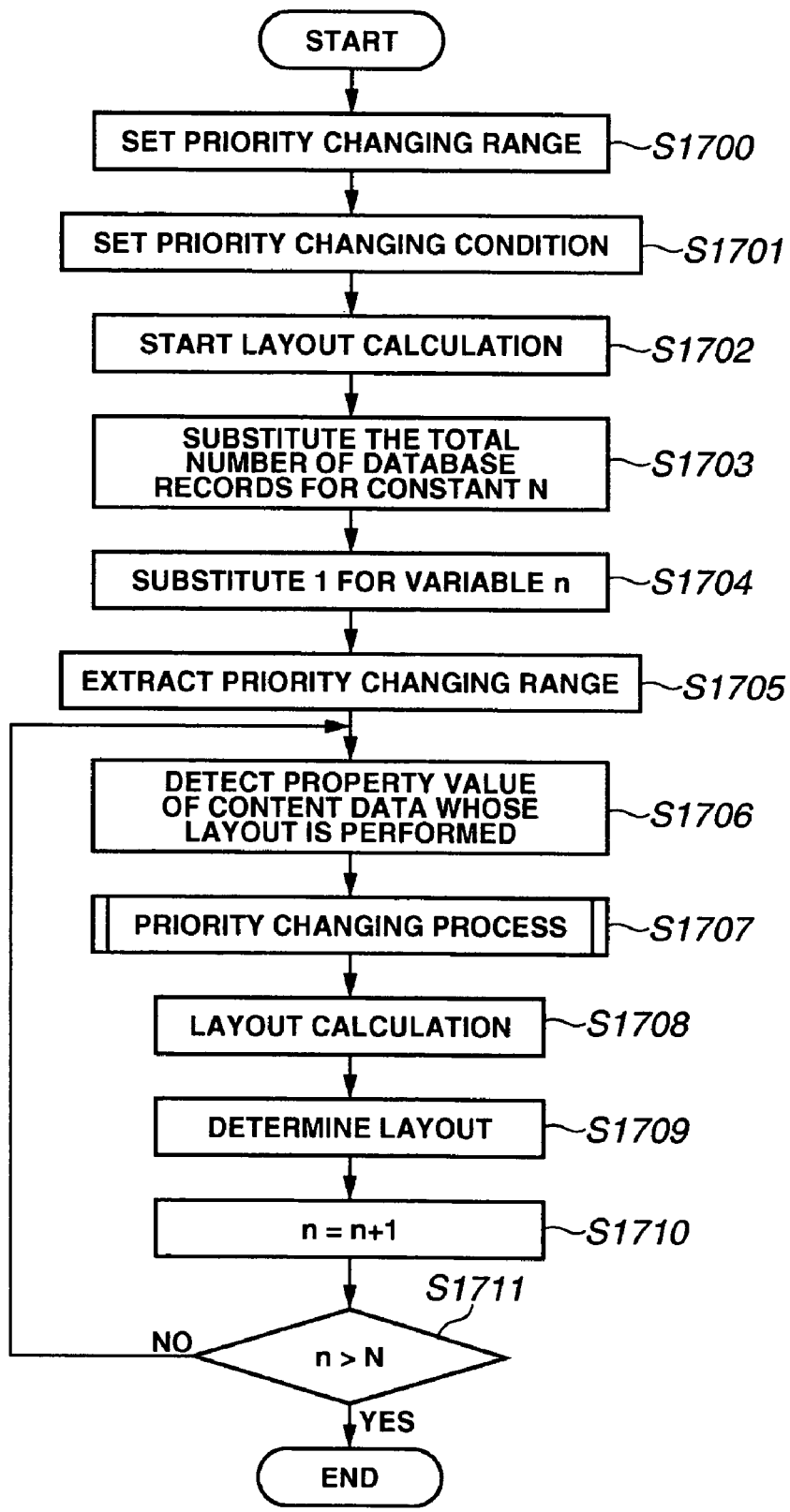
FIG. 17 is a flowchart illustrating an exemplary process using a fundamental size of a container for determination on a change of the priority in the embodiment of the present invention.
Figure 18:
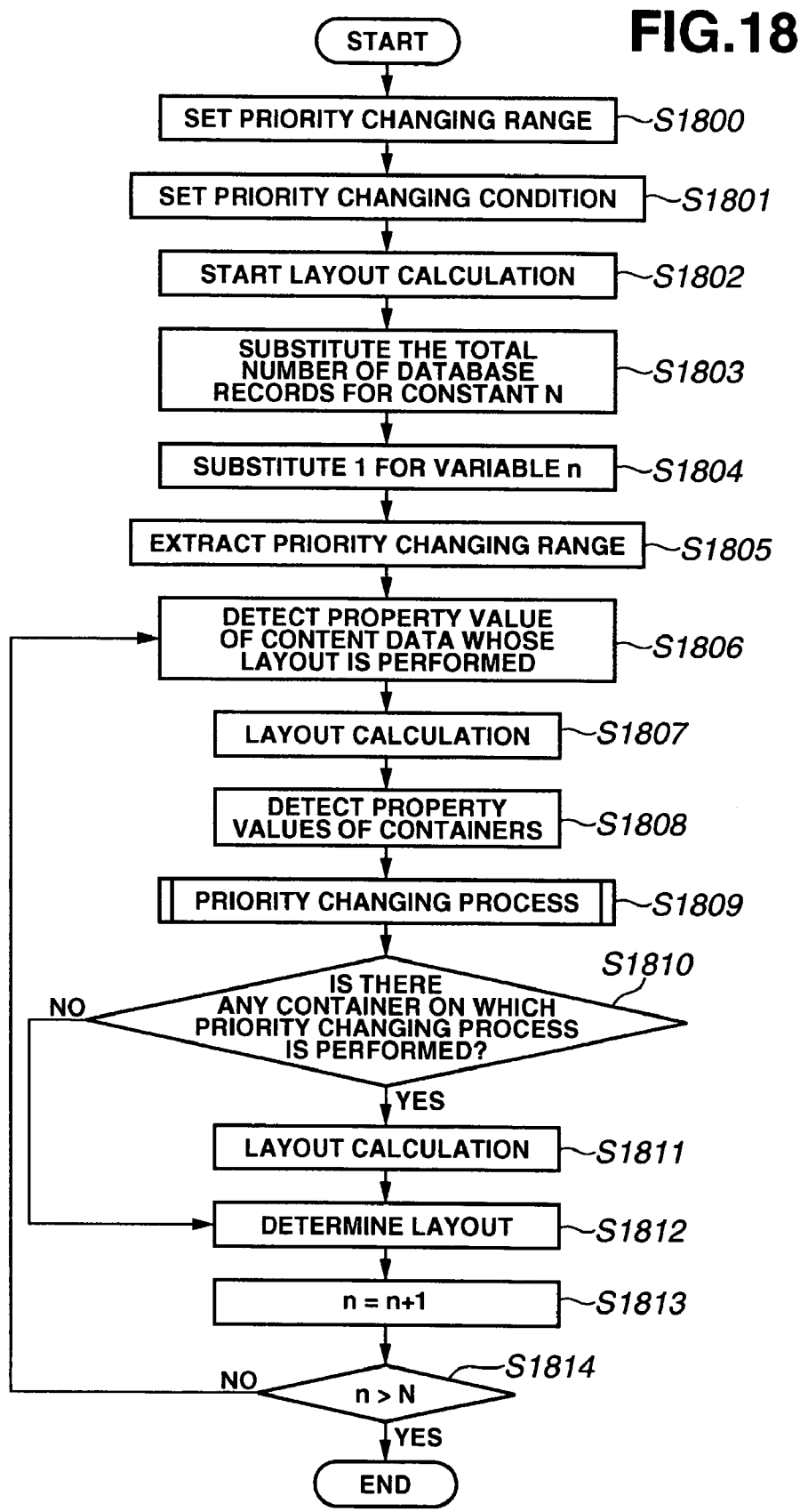
FIG. 18 is a flowchart illustrating an exemplary process using a container size, which is obtained as a layout result, for determination on a change of the priority in the embodiment of the present invention.

FIGS. 17 and 18 are flowcharts illustrating an exemplary overall process according to the present embodiment. FIG. 17 is a flowchart corresponding to an exemplary priority changing method using the difference between the size of the contents to be laid out and the basic size of the container set in the template file. FIG. 18 is a flowchart corresponding to an exemplary priority changing method using the difference between the actual size of the contents to be laid out and the calculated size of the container.

The process illustrated in the flowchart of FIG. 17 is described below. First, the layout editing application 121 recognizes the set priority changing range, which is designated by a pointing device, in step S1700. Information representing the set priority changing range is held in the memory unit 136. A method used to set this information will be described later. Subsequently, the layout editing application 121 recognizes the priority changing condition set by the pointing device in step S1701. The set priority changing condition is held in the memory unit 136. Similarly, a method of setting this condition will be described later. Then, the layout editing application 121 starts layout calculation according to the process illustrated in FIGS. 8 and 9 in step S1702. Timing, with which the layout calculation is started, is timing with which data stored in the database is merged with the template. Thus, the moment, at which the layout calculation is started, is that at which a layout preview or variable printing is started. The process to be performed thereafter is internal processing to be performed during the layout calculation. The process is described by assuming that the layout calculation is performed on all of records to be laid out and to be held in the database. Although the layout calculation can be performed only on a certain record or a given record, the processing to be performed on each of the records is the same. Thus, the description of this processing is omitted herein.

First, the layout editing application 121 substitutes a total number of records to be laid out, which are held in the database, for a constant N in step S1703. The total number N of records, which is substituted in step S1703, is held in the memory unit 136. Then, the layout editing application 121 substitutes 1 for a variable n in step S1704. Subsequently, in step S1705, the layout editing application 121 extracts the priority changing range recognized in step S1700. More specifically, because the priority changing range recognized in step S1701 is held in the memory unit 136, the processing to be performed in step S1705 can be achieved by causing the layout editing application 121 to refer to the memory unit 136. Although the setting of the changing range is described later, examples of the changing range are "the entire document", "a page", and "a given range". Although the apparatus is described in the present application by assuming that these three kinds of the changing ranges can be set as the priority changing range, the priority changing range according to the present invention is not limited thereto. In the present embodiment, the layout editing application 121 extracts information indicating that one of the three kinds of priority changing ranges from the memory unit 136 is designated.

Subsequently, in step S1706, the layout editing application 121 detects a property value of content data included in a record, which should be presently processed, by communicating with the database. The property value indicates the size of the content data (in the present embodiment, in the database, the size of the content data to be laid out is defined to be an ideal size). The layout editing application 121 performs priority changing processing in step S1707 according to results of the extraction in steps S1705 and S1706. The priority changing processing is described later in detail. However, in the priority changing processing, the size of the content data acquired in step S1706 is compared with the basic container size. Information representing the container, in which the priority changing processing is performed, is extracted by using a result of the comparison. Then, the processing performed to change the priority set in each of the containers is designated. Information on the priority changed in step S1707 is held in the memory unit 136. A priority setting method will be described later.

After the priority changing processing is performed in step S1707, the layout editing application 121 performs the layout calculation, which is illustrated in FIGS. 8 and 9, in step S1708, thereby to determine layout in step S1709. Information on the layout determined in step S1709 (for example, information on a position on which the content data is laid out) is held in the memory unit 136. Upon completion of the layout calculation on an n-th record that is currently processed, the layout editing application 121 increments the variable n in step S1710. Then, the layout editing application 121 checks in step S1711 whether the layout calculation has been performed on all of the records. The memory unit 136 holds information on the total number N of the records to be processed in the process illustrated in this flowchart. Thus, the checking in step S1711 can be achieved by comparing the number n of the record, which is presently processed, with the total number N of the records. If it is determined as a result of checking in step S1711 that the layout calculation is not completed on all of the records, the process returns to step S1706. Then, the process is repeated. If it is determined in step S1711 that the layout calculation is completed on all of the records, the process illustrated in this flowchart is finished.

The priority is changed by performing, in a case where the difference between the basic size of the container, which belongs to the priority changing range, and the ideal size of the content data, which should be flowed into this container, meets a predetermined condition, the process illustrated in FIG. 17. Thus, a layout reflecting information on the content data can be created.

Next, the process illustrated in a flowchart of FIG. 18 is described below. The process including steps S1800 to S1806 is similar to that including steps S1700 to S1706 shown in FIG. 17. Therefore, the detailed description of the process including steps S1800 to S1806 is omitted.

The layout editing application 121 performs the layout calculation illustrated in FIGS. 8 and 9 in step S1807. The layout calculation is performed by applying information, which is preliminarily set in the layout template (for example, information on the priority), to the layout template. Information on the size of each of the containers, which is calculated by the layout calculation, is held in the memory unit 136.

Subsequently, the layout editing application 121 detects the property value (the value indicating the size and the position) of each of the containers, which value is calculated in step S1807) in step S1808. More specifically, the value calculated in step S1807 is held in the memory unit 136. Thus, the value calculated in step S1807 can be detected by the layout editing application 121 by referring to the memory unit 136.

Then, the layout editing application 121 performs the priority changing processing in step S1809. Although the details of the priority changing processing are described later, the size of the content data, which is acquired in step S1806, is compared with the container size calculated in step S1807 after the layout calculation. The layout editing application 121 determines the container, whose priority is changed, by using a result of the comparison. Then, the layout editing application 121 changes the designated priority. In a case where no containers on which the priority changing processing should be performed in step S1809 are detected in step S1810, the layout editing application 121 determines layout in step S1812 without performing layout calculation. In a case where it is determined in step S1810 that a container whose priority should be changed is present, the layout editing application 121 performs the layout calculation illustrated in FIGS. 8 and 9 in step S1811 by using the priority changed in step S1809. Thus, the layout editing application 121 determines the layout in step S1812. Information on the determined layout is held in the memory unit 136. Upon completion of performing the layout calculation on an n-th record, the variable n is incremented in step S1813. Subsequently, it is checked in step S1814 whether the layout calculation has been completed on all of the records. If not, the process returns to step S1806. Then, the process is repeated. If completed, the process illustrated in this flowchart is finished.

The priority is changed by performing, in a case where the difference between the calculated size of the container, which belongs to the priority changing range, and the ideal size of the content data, which should be flowed into this container, meets a predetermined condition, the process illustrated in FIG. 18. Thus, a layout reflecting information on the content data and a result of the layout calculation can be created.

[Exemplary Priority Changing Range Setting]

Figure 19:
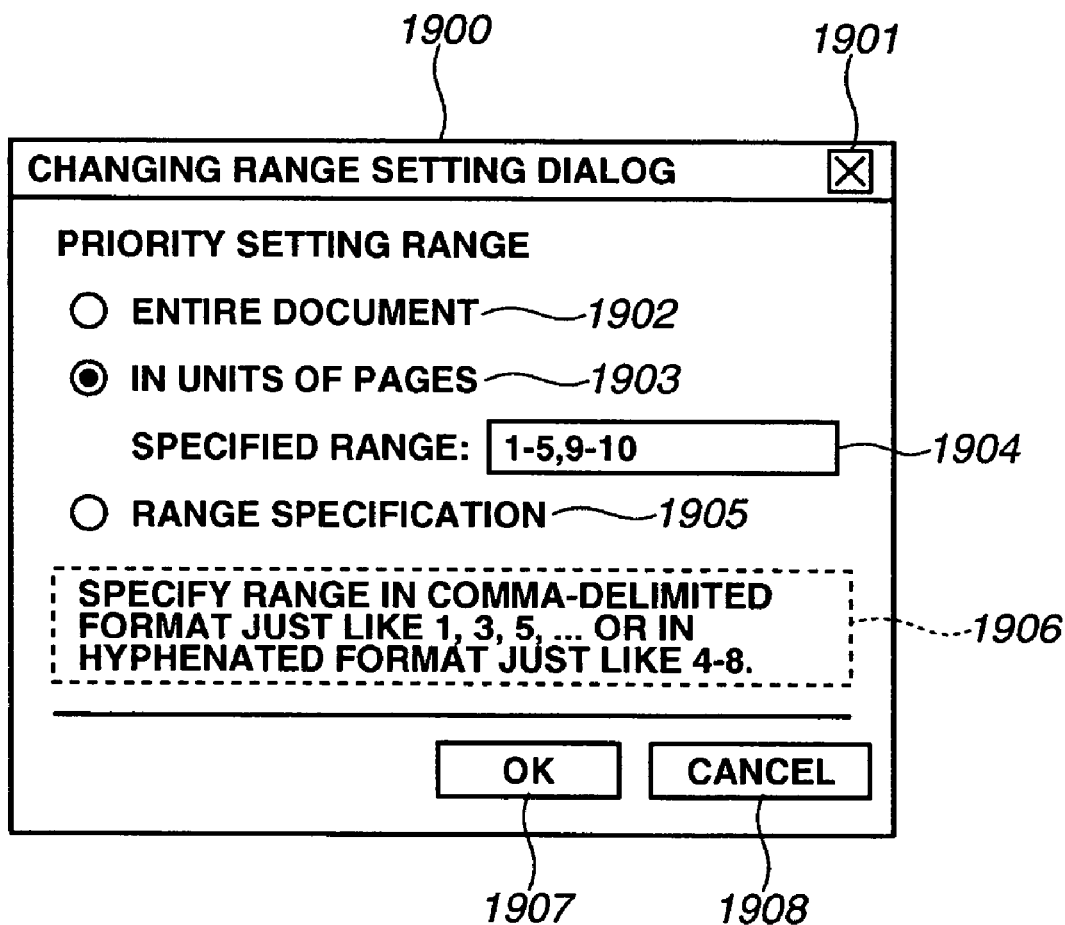
FIG. 19 is a diagram illustrating an example of a UI window for a priority changing range setting dialog in the embodiment of the present invention.

FIGS. 19 and 20 show examples of a UI window used to designate the priority changing processing range according to the present invention. An operator designates the priority changing range by using the UI windows illustrated in FIGS. 19 and 20, respectively. The information set herein is recognized by the layout editing application 121 in step S1700 or S1800. The priorities included in the designated range are to be changed.

A priority changing range setting dialog 1900 shown in FIG. 19 is displayed by recognizing that a predetermined operation is performed. FIG. 19 indicates the "entire document" 1902 and the expression "in units of pages" 1903 as the changing range. This dialog 1900 can be displayed in the display 144. Techniques of displaying this dialog may include a menu bar and a popup menu.

Reference numeral 1901 designates a button used to close the dialog. In a case where the entire document 1902 is selected, information, which indicates that the entire document is selected as the changing range, is held in the memory unit 136. Even in a case where the expression "in units of pages" is selected, a similar operation is performed. In a case where the expression "in units of pages" is selected, it is necessary to designate what page, whose priority is changed, is selected. Thus, an edit box used to edit a specified range 1904 is enabled. This edit box is used to specify a page on which the priority changing processing is performed. A document page No. is input by using a pointing device. Thus, a page having the specified page No. is designated as a page on which the priority changing processing is performed. A method of specifying the pages is to specify the range in comma-delimited format just like "1, 2, 3" or in a hyphenated format just like "1-5".

Reference numeral 1906 denote a help window, the display of which is changed according to the selected changing range. In the case illustrated in FIG. 19, the expression "in units of pages" 1903 is selected. Therefore, help information at the selection of the "page" is displayed in the help window 1906. Reference numeral 1907 designates an OK button used to terminate the dialog by applying the set item. Reference numeral 1908 denotes a cancel button used to cancel the set item and to close the dialog. A value selected by using the UI window illustrated in FIG. 19 is held in the memory unit 136 by selecting the OK button 1907. In a case where the expression "in units of pages" 1903 is not selected, an edit box 1904 used to specify a page in the range specification is disabled.

The range specification button 1905 is a check button used to set a given range specified by a user in the changing range. In a case where the range specification button 1905 is selected, a given range is specified in the changing range. The range set at that time is a range preliminarily specified by a user using another method.

FIG. 20 shows an example of a UI window used by an exemplary method of allowing a user to specify the range to be set in the case where the range specification button 1905 shown in FIG. 19 is selected. Reference numeral 2001 denotes a container laid out on a document. Reference numeral 2002 designates a link representing the association between the containers. Reference numeral 2003 denotes a mouse pointer. Reference numeral 2004 designates a rectangular frame indicating that the frame is selected by a user. Reference numeral 2005 denotes an edit menu. Reference numeral 2006 designates an edit menu list. Reference numeral 2007 denotes a "set a changing range" menu. Reference numeral 2008 designates a "cancel the setting of the range" menu. In view of the aforementioned configuration, a method of specifying a changing range is described below.

First, a user encloses a container, which is laid out on a document, with a rectangle by clicking the mouse or by dragging. A plurality of containers can be selected. When the "set a changing range" menu is selected from the edit menu while maintaining the container in a selected state, the selected container is designated as a changing range. A plurality of the changing ranges may be specified. In the case of a document having a plurality of pages, the "changing range" may be specified over a plurality of pages. When the "cancel the changing range" menu is selected during the designated container is in a selected state, the container can be removed from the changing range.

The container specified as the changing range by this method is enabled only when the range specification" menu 1905 shown in FIG. 19 is selected. That is, information on the container specified as the changing range shown in FIG. 20 is held in the memory unit 136. The "range specification" menu 1905 shown in FIG. 19 is selected to thereby read information on the container as the changing range, which is held in the memory unit 136.

[Exemplary Priority Changing Condition Setting]

Figure 21:
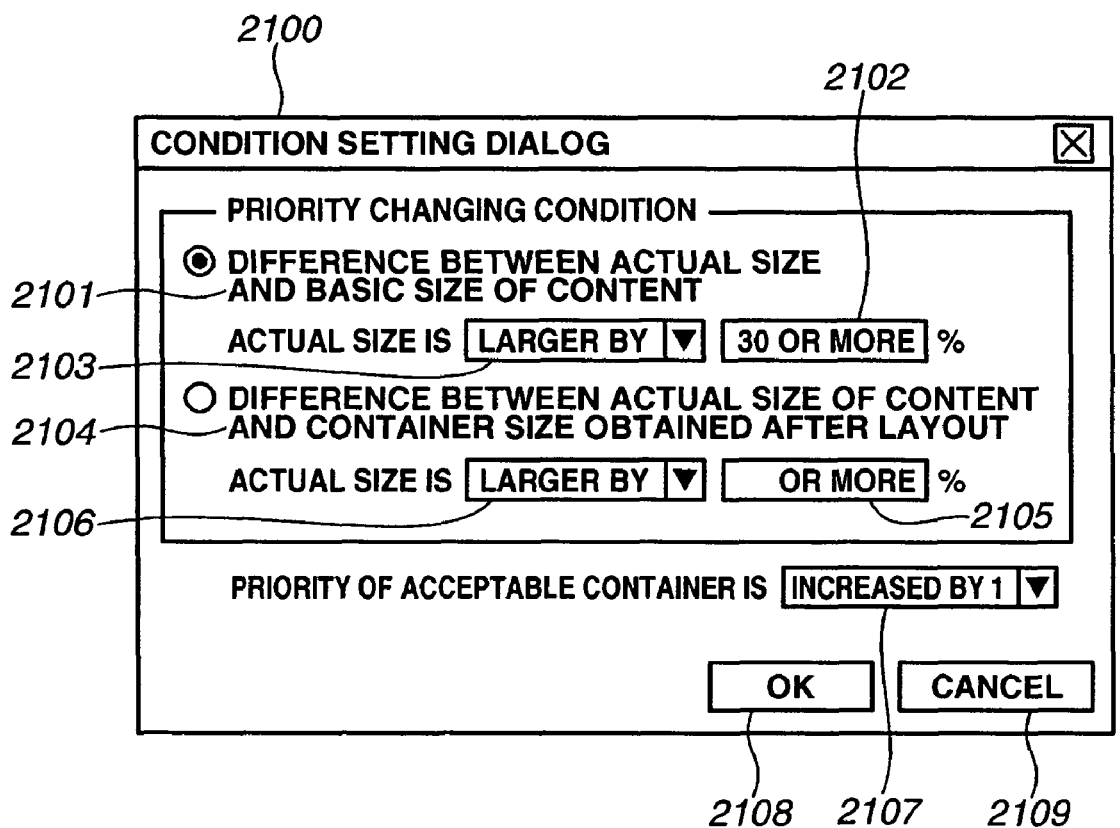
FIG. 21 is a diagram illustrating an example of a UI window for a priority changing condition setting dialog in the embodiment of the present invention.

FIG. 21 shows an exemplary condition setting dialog 2100 displayed by pushing the OK button 1907 shown in FIG. 19. The use of this dialog 2100 enables the designation of the priority changing condition for the priority changing processing according to the present invention. The layout editing application 121 recognizes values, which are set in the window shown in FIG. 21, in the aforementioned steps S1701 and S1801 shown in FIGS. 17 and 18.

This dialog 2100 can be displayed on the display 144. The technique for displaying the dialog may be, for example, a menu bar. In a case where an operator selects the "difference between the actual size of the contents and the basic size" button 2101 by using a pointing device, an operation performed on edit boxes 2102 and 2103 are made to be effective. Similarly, in a case where the "difference between the actual size of the contents and the container size obtained after the layout" menu 2104 is selected, operations performed on the edit boxes 2105 and 2106 are made to be effective. A process illustrated in a flowchart of FIG. 17 is performed in a case where the "difference between the actual size and the basic size of the contents" check button 2101 is selected. On the other hand, a flowchart of FIG. 18 is performed in a case where the "difference between the actual size of the contents and the size of the container obtained after the layout" check button 2104 is selected. An edit box 2107 is a combo box used to designate change of the priority, which is applied in a case where the set changing condition is satisfied. In a case where a value set in the condition setting dialog 2100 is reflected, an operator selects the OK button 2108. Conversely, in a case where the value set by using the condition setting dialog 2100 is disabled, the cancel button 2109 is selected.

The comparison between the size of the contents, which should be laid out in a container that is held in the database, and the size (the basic size) of the container, which is stored in the template file and is set by a user, is made according to the present embodiment. The value of this difference, which is a result of the comparison between the actual size of the contents and the basic size (the flowchart of FIG. 17 is applied), is employed as a changing condition. Also, the comparison between the size of the contents held in the database and the size of the container, which is obtained as a result of layout calculation by using the priority set on the container, is made according to the present embodiment. The value of this difference between the "actual size of the contents and the container size obtained after the layout" (the flow chart of FIG. 18 is applied) is employed as another changing condition. The priority may be changed according to this difference. The condition "the actual size is larger by 30 or more %", which is designated by reference numerals 2102 and 2103 and is expressed in terms of % and uses a magnitude relation expression, are also employed as the changing condition. An aspect ratio may be used instead of %. A numerical value for representing a percentage term is input in an edit box 2102. This holds good for another edit box 2104. Expressions of determination conditions "larger by" and "smaller by" can be selected from the combo box 2103. Definitive conditions, such as the expression "equal to", may be designated, in addition to less-definitive conditions represented by using the expressions "larger by". This holds good for the combo box 2106. Preferably, a broad range of determination conditions can be set. Also, clear conditions may be set by using the expression "differ from the actual size by XX or more %", in addition to the expressions, such as the expression "larger by".

As described above, the layout editing application changes the priority of the container, which is to be changed, in a case where it is determined that the changing conditions set by using the setting dialog 2100 are satisfied, by performing the process illustrated in FIG. 17 or 18. A manner, in which the priority is changed, is set by using, for example, the expression "the priority of the container meeting the condition is increased by 1", as designated by reference numeral 2107. The expressions, such as "increased by 1" and "increased by 2", can be selected from the combo box 2107. The number of items, which can be set in the range of the priority by the layout editing application 121, may be changed.

As described above, the dialog shown in FIG. 21 is displayed in a case where the OK button 1907 shown in FIG. 19 is pushed. The conditions, therefore, are not limited thereto. For instance, even in a case where the layout calculation is performed without setting the priority, as illustrated in FIGS. 8 and 9, the apparatus may be adapted so that the dialog 2100 shown in FIG. 21 is displayed by performing a predetermined operation. The state, in which no priority is set, as described herein is defined as that in a case where the priorities of containers associated with a link are equal to one another (for example, 1:1), that is, a case where the order of priority is not set. In the case where no priority is set, the dialog 2100 shown in FIG. 21 is displayed by performing a predetermined operation, and subsequently, the priority changing condition is set. Consequently, in a case where groups of containers, on which no priorities are set, are set to be objects on which the layout calculation described in FIGS. 8 and 9 is performed, if the difference between the actual size of the content data and the container size (that is, the basic size) meets the predetermined condition set as illustrated in FIG. 21, the priorities of the containers satisfying the predetermined conditions are changed by using the value set in the box 2107 shown in FIG. 21. Also, in a case where the difference between the container size, which is obtained after the layout calculation described in FIGS. 8 and 9, and the actual size of the container meets the predetermined conditions set in the window shown in FIG. 21, similarly, the priorities of the containers are changed by using the value set in the box 2107 shown in FIG. 21.

For example, in a case where there are containers A and B, on each of which no priority is set, this state is equivalent to that the priorities of both of these containers are 1:1. For instance, the "difference between the actual size of contents and the basic size" button 2101 is selected, and the difference between the container size (basic size) of one of the containers A and B and the content data to be flowed into the associated one of these containers is compared with that between the container size (basic size) of the other container A or B and the content data to be flowed thereinto. As a result, in a case where the container A meets the condition set in the window shown in FIG. 21, only the priority of the container A is changed.

[Exemplary Priority Changing Flow]

Figure 22:
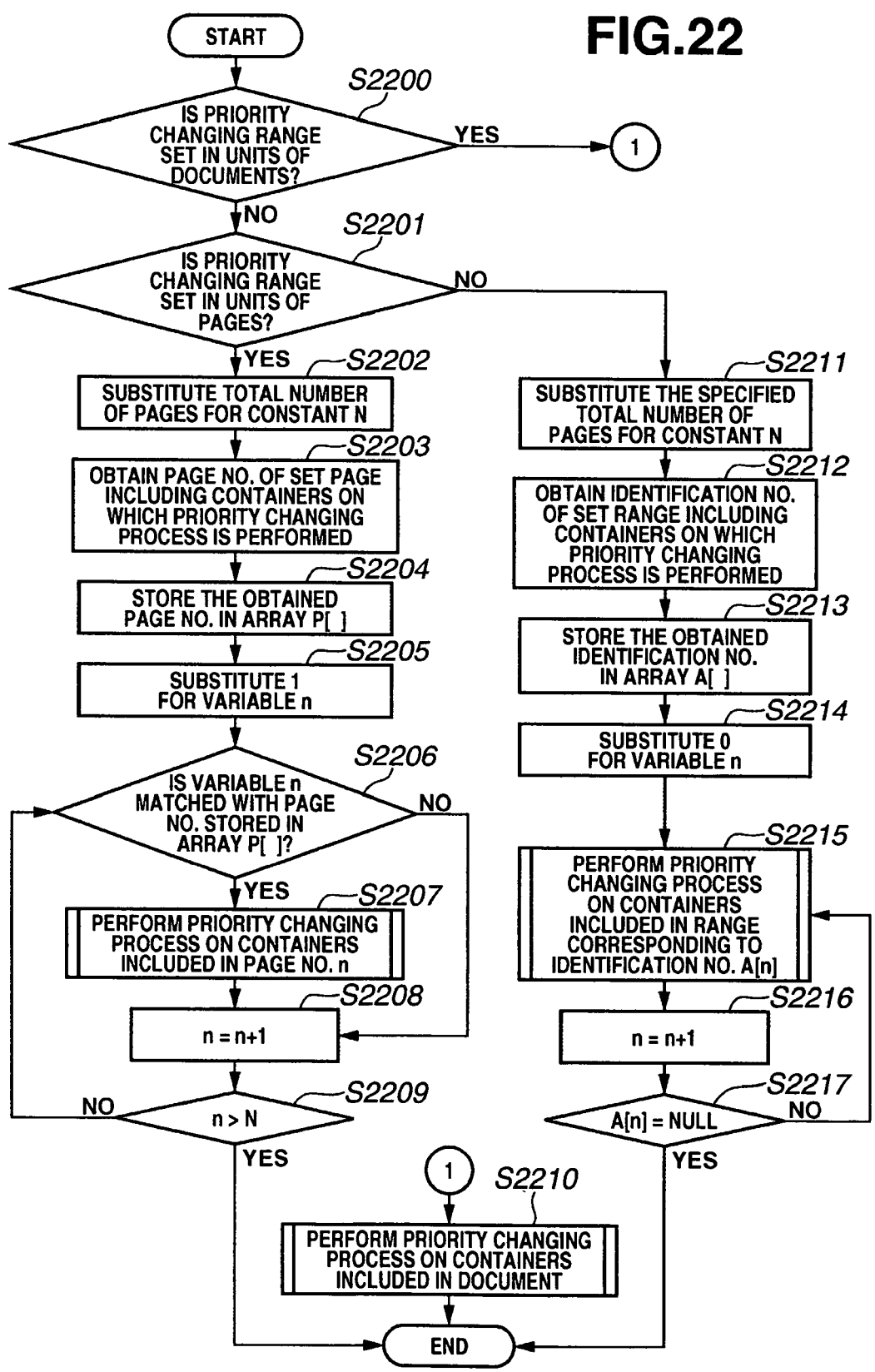
FIG. 22 is a flowchart illustrating an exemplary priority changing process in the embodiment of the present invention.

FIG. 22 is a flowchart illustrating an exemplary priority changing process according to the present invention. This figure describes processing performed in each of steps S1707 and S1808 in the overall flow in detail. The processing to be performed in each of these steps is described below.

First, the layout editing application 121 checks in step S2200 whether the priority changing rage is set in units of the entire document. More specifically, since the information set in the window shown in FIG. 19 is held in the memory unit 136, the processing to be performed in step S2200 can be performed by causing the layout editing application 121 to refer to the memory unit 136. In a case where the layout editing application 121 determines in step S2200 that the priority changing range is set in units of the document, the priority changing processing is performed on the containers in the document in step S2210. The priority changing processing will be described later by using FIG. 23.

If the layout editing application 121 determines in step S2200 that the changing range is not set in units of the document, the application 121 checks in step S2201 whether the changing range is set in units of pages. That is, the layout editing application 121 refers to the memory unit 136 and determines whether the expression "in units of pages" 1903 shown in FIG. 19 is selected. If it is determined in step S2201 that the expression "in units of pages" is set, the process advances to step S2202, in which the application 121 goes into a process of performing the changing processing in units of pages. If the range is not set in units of pages, it is determined that the range specification button 1905 is designated. Then, the process proceeds to step S2211, in which the values set in the window shown FIG. 20 are used. First, the changing processing performed in units of pages (in the case where YES in step S2201) is described below.

The layout editing application 121 substitutes the total number of pages of the document, which is to be currently processed, for the constant N, and holds information thereon in the memory unit 136 in step S2202. Then, the layout editing application 121 acquires a page No. of a page, on which the priority changing processing should be performed, in step S2203. More specifically, because the set in the edit box 1904 shown in FIG. 19 is held in the memory unit 136, the processing to be performed in step S2203 can be achieved by causing the layout editing application 121 to refer to the memory unit 136. As described above, in the window shown in FIG. 19, a single page or a plurality of pages can be set, so that a single page No. or a plurality of page Nos. may be acquired. The layout editing application 121 stores data representing the acquired page No. in step S2203 in an array P[] and holds the data in the memory unit 136 instep S2204. In this case, in view of the possibility that the layout editing application 121 acquires a plurality of page Nos., the array is ensured as the storage for storing the data. For initialization, the layout editing application 121 substitutes 1 for the variable n in step S2205. Then, the layout editing application 121 checks in step S2206 whether the variable n is matched with the page No. stored in the array P[]. More specifically, because information stored in the array P[] is held in the memory unit 136, the comparison between the variable n and the information stored in the array P[], which is held in the memory unit 136, can be achieved.

If the layout editing application 121 determines in step S2206 that the variable n is matched with the page No. stored in the array P[], the priority changing processing is performed on the containers laid out in the page No. n in step S2207. The priority changing processing will be described later. The layout editing application 121 increments the variable n in step S2208 after the priority processing is performed in step S2207. Then, the layout editing application 121 checks in step S2209 whether the processing is completed on all of the pages. If the processing is not completed on all of the pages, the process returns to step S2206. Then, the aforementioned process is repeated. If the processing is completed on all of the pages, the process illustrated in this flowchart is finished.

Next, a process to be performed in a case, in which the priority changing range is not set in units of pages (NO in step S2201), is described below. As described above, in a case where the range is not set in units of pages, the range specification button 1905 is set. First, the layout editing application 121 substitutes the number of the specified ranges for the constant N in step S2211. As described by referring to FIG. 20, the range including containers, the priority of each of which should be changed, can optionally be set. Information on the range including containers, the priority of each of which should be changed, is set by using the window shown in FIG. 20 and is held in the memory unit 136. Thus, the processing to be performed in step S2211 can be achieved by causing the layout editing application 121 to refer to the memory unit 136.

Next, the layout editing application 121 acquires an identification No. representing the range including containers, the priority of each of which should be changed, in step S2212. This identification No. is used to identify the range including containers, the priority of each of which should be changed, and may be a character string, instead of a number. The identification No. may be set by being designated by a user. Alternatively, the identification No. may be a value internally and automatically set by the layout editing application 121 in a stage in which the range including containers, the priority of each of which should be changed, is selected. The set identification No. is held in the memory unit 136. Thus, the processing to be performed in step S2212 can be achieved by causing the layout editing application 121 to refer to the memory unit 136. Then, the layout editing application 121 stores the acquired identification No. in an array A[]. The identification No. is held in the memory unit 136 in step S2213. For initialization, the layout editing application 121 substitutes 0 for the variable n in step S2214. The layout editing application 121 performs the priority changing processing on the containers included in the range indicated by the identification No. A[n] in step S2215. The details of the priority changing processing to be performed on the containers in step S2215 will be described later by referring to FIG. 23. In a case where the priority changing processing is completed on containers included in the range that is designated by the identification No. A[n], the layout editing application 121 increments the variable n in step S2216. Then, the layout editing application 121 checks in step S2217 whether the identification No. A[n] is NULL, That is, the layout editing application 121 determines whether information representing the range corresponding to the next identification No. is present. If the processing is not completed on all of the identification Nos. stored in the array A[], the process returns to step S2215. Then, the aforementioned process is repeated. If completed, the process illustrated in this flow chart is finished.

The process illustrated in this flowchart is performed to thereby perform the priority changing processing on containers included in the range specified in the window shown in FIG. 19, in which the priority changing processing should be performed.

[Exemplary Priority Changing Processing]

Figure 23:
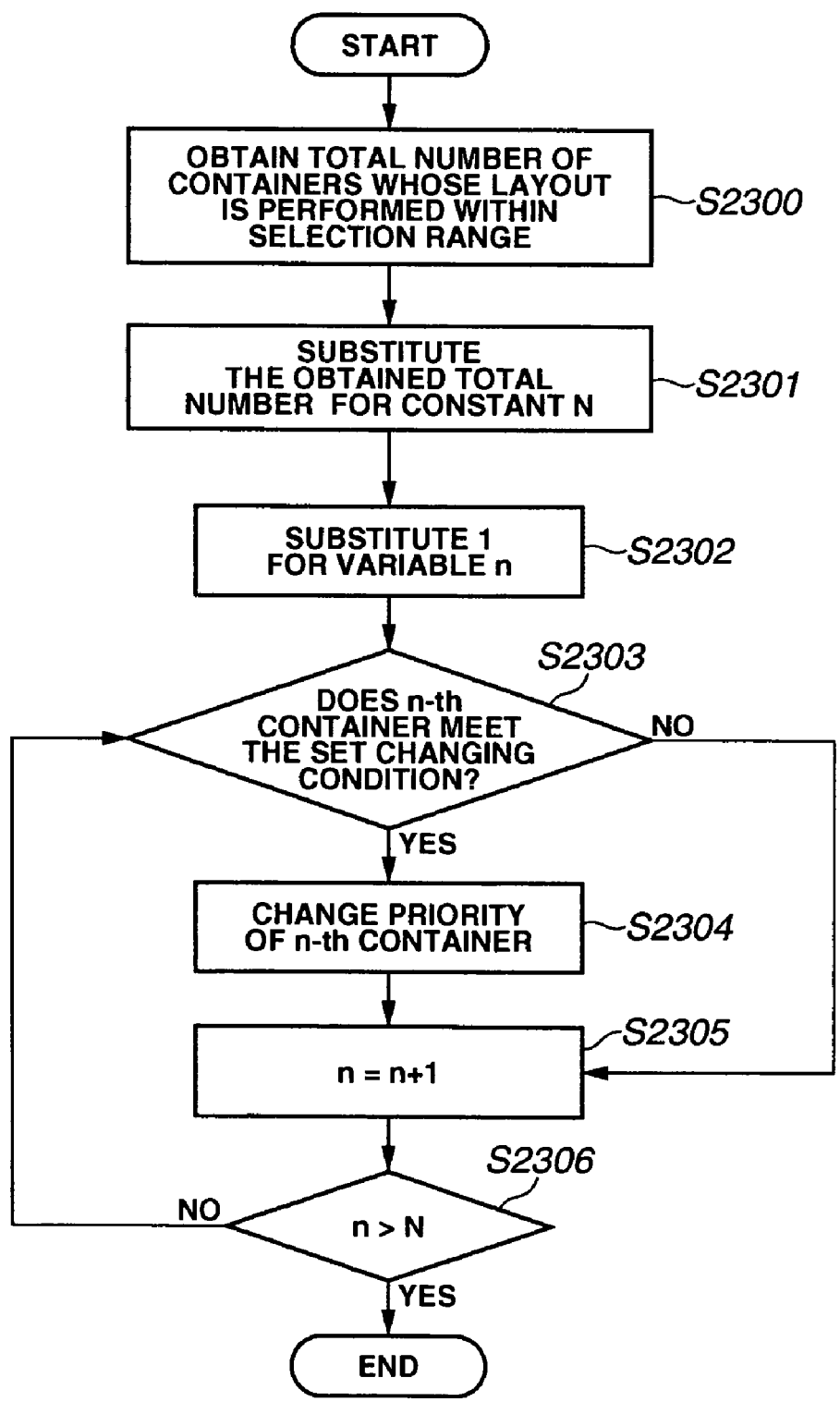
FIG. 23 is a flowchart illustrating an exemplary priority setting process in the priority changing process illustrated in FIG. 22, which is performed in the embodiment of the present invention.

FIG. 23 is a flowchart illustrating an exemplary priority changing processing according to the present embodiment. This figure shows the detailed flow of the priority changing processing to be performed in steps S2207, S2210, and S2215 of the flowchart shown in FIG. 22. The priority changing processing to be performed in each of steps S2207, S2210, and S2215 is described below.

First, the layout editing application 121 acquires the total number of containers laid out in a selection range in step S2300. The selection range is set to be in units of pages in step S2207. In the case of step S2210, the selection range is the entire document. In the case of step S2215, the selection range is the optionally selected range. For instance, in a case where the entire document 1902 or the pages 1903 are selected, the number of containers laid out in each of these ranges is stored in the template file of the memory unit 136. Thus, the processing to be performed in step S2300 can be achieved by causing the layout editing application 121 to refer to the template file of the memory unit 136. In a case where the range specification button 1905 is selected, after a user optionally designates the range in the window shown in FIG. 20, the "set changing range" menu 2007 is selected, so that the optionally selected container number is stored in the memory unit 136. Thus, similarly, the priority changing processing can be achieved. The process flow of setting the priority on the containers laid out in the selected range is the same, regardless of the different selection ranges.

Subsequently, the layout editing application 121 substitutes the acquired total number of the containers for the constant N and holds the acquired total number of the containers in the memory unit 136 in step S2301. For initialization, the layout editing application 121 substitutes 1 for the variable n in step S2302. Then, the layout editing application 121 determines in step S2303 whether the n-th container meets the changing conditions set by using the dialog 2100 shown in FIG. 21. The changing conditions set in the window shown in FIG. 21 are held in the memory unit 136. Thus, the processing to be performed in step S2303 can be achieved by causing the layout editing application 121 to refer to the memory unit 136. If it is determined in step S2303 that the conditions are satisfied, the layout editing application 121 changes the priority of the n-th container in step S2304. The value specified in the box 2107 shown in FIG. 21 is held in the memory unit 136. Thus, the application 121 determines according to the information set in the box 2107 whether the priority is changed. Subsequently, the layout editing application 121 increments the variable n in step S2305. Then, the application 121 checks in step S2306 whether the priority changing processing is completed on all of the containers. If the processing is not completed on all of the containers, the process returns to step S2303. Subsequently, the aforementioned process is repeated. If completed, the process illustrated in this flowchart is finished. In the process illustrated in this flowchart, in a case where the priority changing conditions are satisfied, and where the priority is changed to a value specified by the user, the changed priority is tentatively applied only at the layout calculation. The priorities of the containers, which are set in the template file of the automatic layout system, are not changed.

The process illustrated in the flowchart shown in FIG. 23 is performed, as described above. Thus, it can be determined according to the content data, which is actually flowed into the container, whether the priority set on the container included in the designated range is changed. Consequently, the layout processing more effectively reflecting a user's intention can be achieved.

EXAMPLES

Figure 24A:
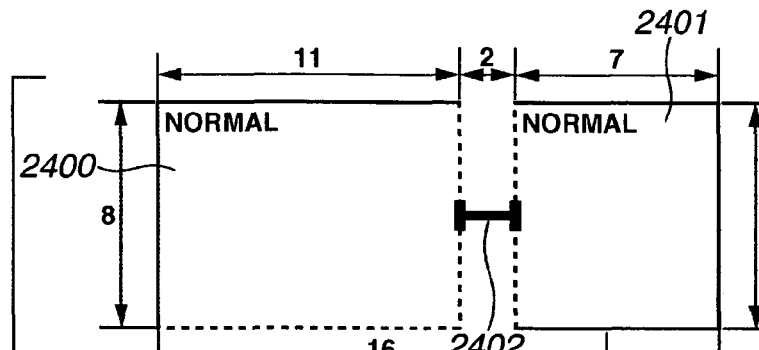
FIGS. 24A to 24C are diagrams illustrating an example of the priority changing process in the embodiment of the present invention.
Figure 24B:
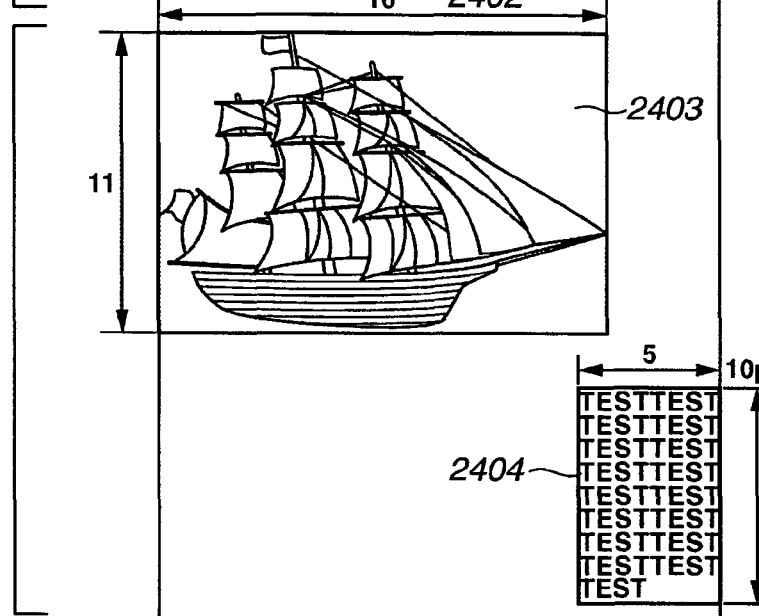
Figure 24C:
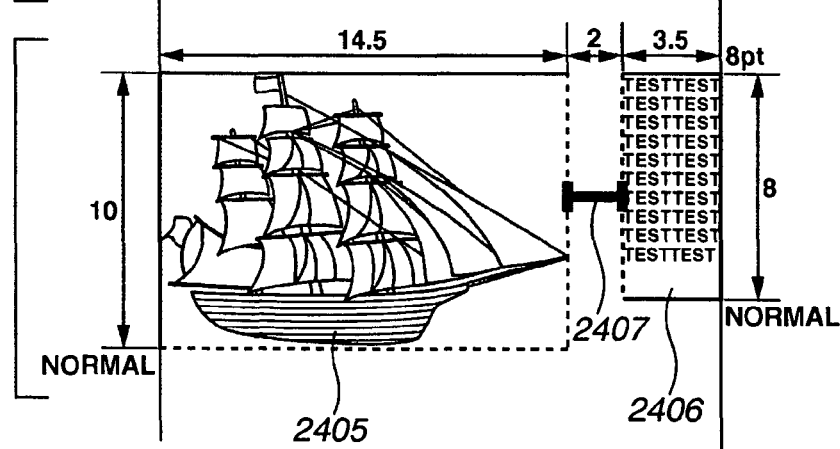
Figure 25A:
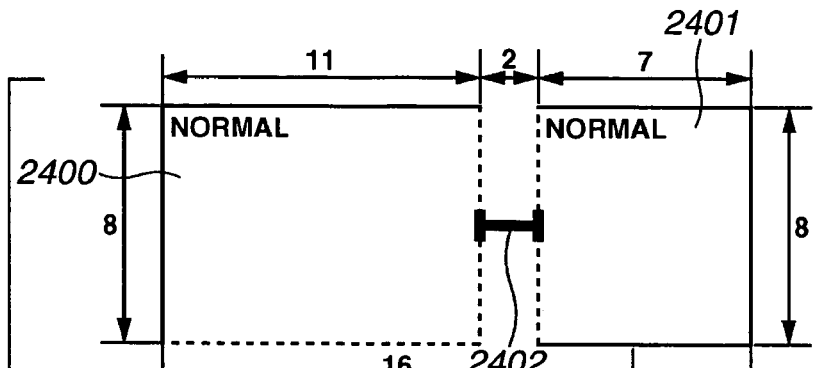
FIGS. 25A to 25C are diagrams illustrating another example of the priority changing process in the embodiment of the present invention.
Figure 25B:
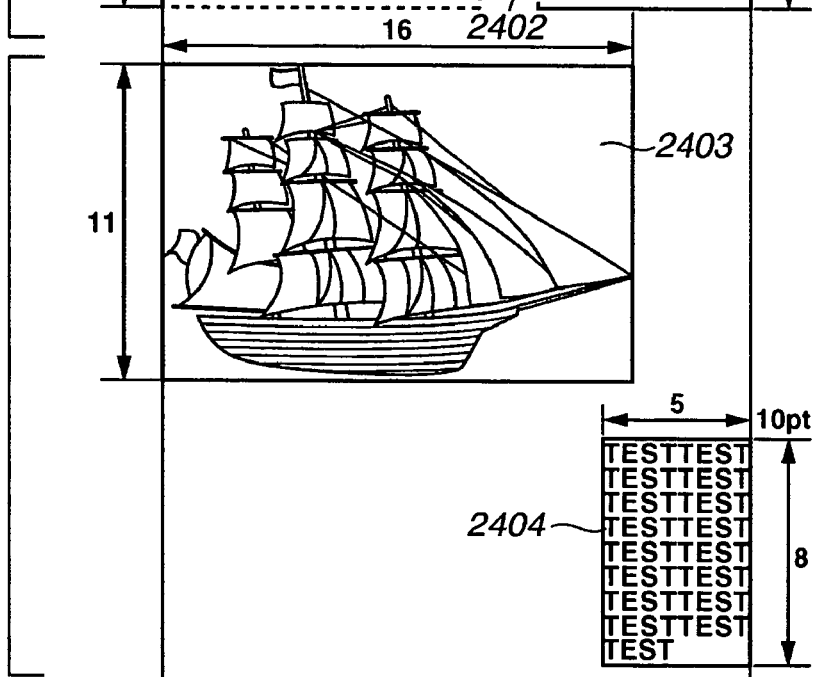
Figure 25C:
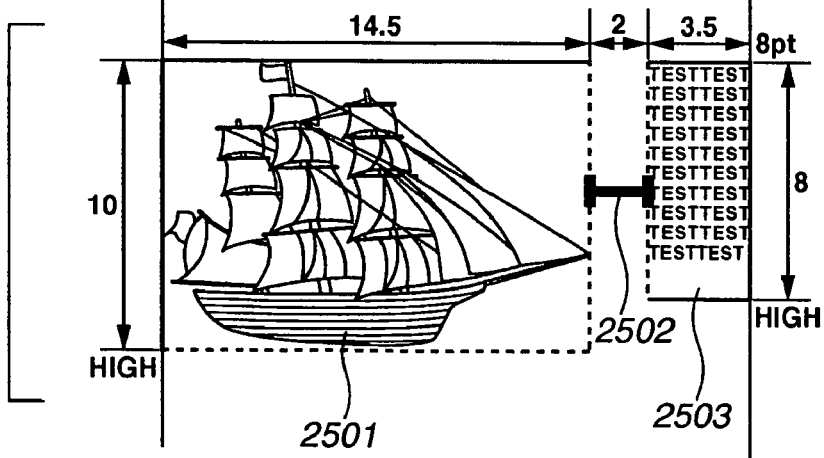
Figure 26A:
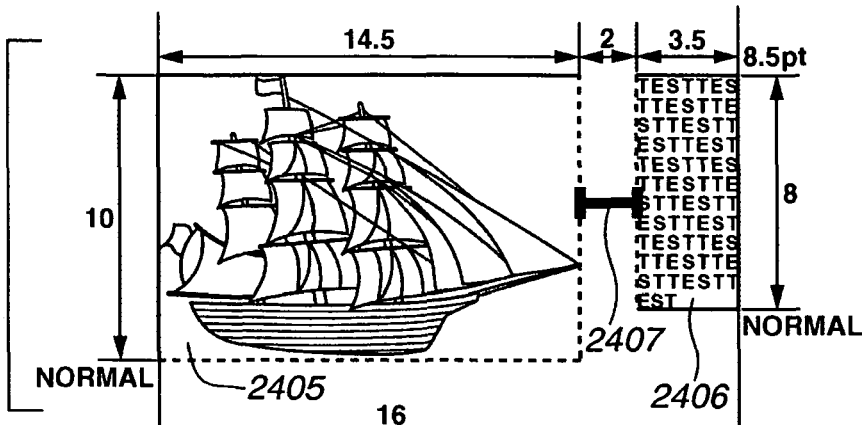
FIGS. 26A to 26C are diagrams illustrating another example of the priority changing process in the embodiment of the present invention.
Figure 26B:
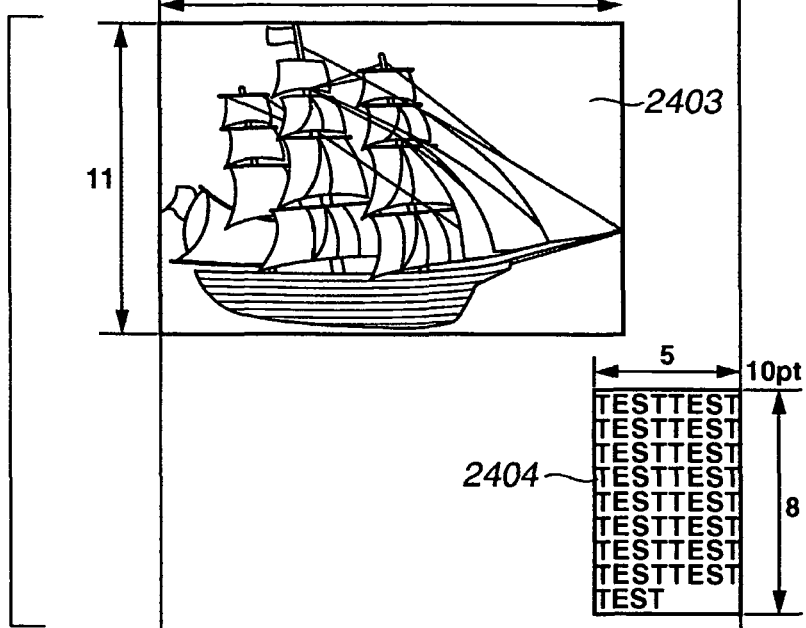
Figure 26C:
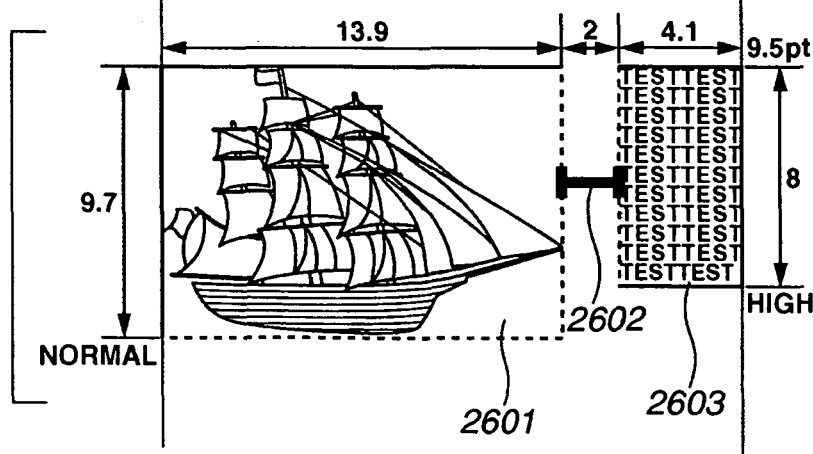

FIGS. 24A to 24C, 25A to 25C, and 26A to 26C illustrate use cases in the embodiment. FIGS. 24A to 24C illustrate an example of layout calculation in the automatic layout system that does not perform the priority changing processing employed in the embodiment of the present invention. FIGS. 25A to 25C illustrate an example of layout calculation using the "difference between the actual size of the content and the basic size" button used in the priority changing processing in the embodiment as a changing method. FIGS. 26A to 26C illustrate an example of layout calculation using the "difference between the actual size of the content and the container size obtained after the layout" button used in the priority changing processing in the embodiment as a changing method. The changing conditions employed as prerequisite conditions are set so that the "actual size of the content data differs form the basic size by 30% or more" or that the "actual size of the content data differs form the container size, which is obtained after the layout, by 30% or more". In a case where the conditions are satisfied, an operation set to be performed in such a case is that the "priority is increased by 1". It is assumed that the aforementioned conditions are set by using the dialog 2100 shown in FIG. 21. Each of these examples of the layout calculation is described below.

The basic sizes set in the layout template (that is, the container sizes and the link size, which are preliminarily set by a user) are seen from the containers 2400 and 2401 and the link 2402 illustrated in FIG. 24A. The container 2400 is an image container used to display an image. The width, the height and the priority of the container 2400 are set to be 11, 8, and "Normal", respectively. The container 2401 is a text container used to display a text. The width, the height and the priority of the container 2401 are set to be 7, 8, and "Normal", respectively. The font size is set to be 10 points. The link 2402 is a fixed link adapted to associate the containers 2400 and 2401 with each other. The length of the link 2402 is set to be 2.

Content data 2403 shown in FIG. 24B represents image contents to be flowed into the container 2400. The width and the height of image contents 2403 are set to be 16 and 11, respectively, as actual sizes (also referred to as ideal sizes). Content data 2404 represents text contents to be flowed into the text container 2401. The width and the height of the text contents are set to be 5 and 8, respectively, as actual sizes (or ideal sizes). Such content data are flowed into predetermined containers, respectively. FIG. 24C shows a calculated layout result obtained by performing automatic layout described in FIGS. 8 and 9. As is understood from containers 2405 and 2406 and a link 2407, the sizes of the containers and the link are changed from the basic sizes indicated in FIG. 24A. The priority set on each of the containers 2405 and 2406 is "normal". Thus, the layout is calculated so that loads are equally imposed on these containers, and that the sizes of these containers equally differ from the basic sizes. Consequently, the width and the height of the image container 2405 are set to be 14.5 and 10, respectively. The width and the height of the text container 2406 are set to be 3.5 and 8, respectively. The link 240 6 is a fixed link, so that the sizes thereof do not change, and that the length thereof is 2.

Next, FIGS. 25A to 25C illustrate an example of the layout calculation using the "difference between the actual size of the content and the basic size" button used in the priority changing processing in the embodiment as a changing method. FIGS. 25A and 25B are similar to FIGS. 24A and 24B, respectively. Thus, the description of FIGS. 25A and 25B is omitted. FIG. 25C illustrates containers 2501 and 2503 and a link 2502, which are layout results obtained by performing layout calculation under the condition, in which the same content data as shown in FIG. 24C are flowed into the same containers as shown in FIG. 24C, by using the "difference between the actual size of the content and the basic size" as the priority changing conditions. First, the image container 2501 is described below. The content size, that is, the width and the height of the content data (2403) to be flowed thereinto are 16 and 11, respectively. The basic size, that is, the width and the height of the container (2400), which are set in the template file, are 11 and 8, respectively. The difference therebetween is calculated. In this case, the calculation using an area ratio is described by way of example. The area of the container 2400 having the basic sizes stored in the template file is 88 (=11×8). The area of the content data to be flowed into the container 2400 is 176 (=16×11). The ratio of the area of the content data to the area of the container having the basic size is 2:1 (=176:88) by converting the value of the area of the container having the basic sizes to 1. Therefore, the area of the data having a content size is larger than the area of the container having the basic sizes by 100%. This meets the changing conditions (that is, the actual sizes of the content data differ from the basic sizes of the container by 30% or more). Consequently, the condition set in the dialog 2100, that is, the "priority is increased by 1" is applied to this case. Hence, the layout editing application 121 raises the priority of the container 2501 from "Normal" to "High".

Next, the text container 2503 is described below. Processing similar to that in the case of the image container 2501 is performed. The size, that is, the width and the height of the content data (2404) to be flowed into the container 2503 are 5 and 8, respectively. The difference therebetween is calculated. The area of the container 2401 having the basic sizes is 56 (=7×8). The area of the content data 2404 to be flowed into the container 2401 is 40 (=5×8). The ratio of the area of the content data to the area of the container having the basic size is 0.7:1 (=40:56) by converting the value of the area of the container having the basic sizes to 1 (the ratio is rounded off to a first decimal place). Therefore, the area of the data 2404 having a content size is smaller than the area of the container 2401 having the basic sizes by 30%. This meets the changing conditions (that is, the actual sizes of the content data differ from the basic sizes of the container by 30% or more). Consequently, the layout editing application 121 raises the priority of the container 2401 from "Normal" to "High". Then, the layout calculation is performed by using the changed priority. Consequently, the width and the height of the image container (2501) are 14.5 and 10, respectively. The length of the link (2502) is 2. The width and the height of the text container (2503) are 3.5 and 8, respectively. Also, the function of changing the font size to prevent occurrence of text overflow is applied to the text container. Thus, the font size becomes 8 points.

In this example of the layout, both containers satisfy the changing conditions. Thus, the priority of each of the containers is changed to "High". Thus, the manner of imposing loads is unchanged from that in the case of the layout calculation in the example shown in FIGS. 24A to 24C. Consequently, the same layout result is obtained. However, the priorities of the containers may differ from each other depending upon the setting of the sizes of the contents and the changing conditions. Hence, the layout result may change.

Next, FIGS. 26A to 26C illustrate an example of layout calculation using the "difference between the actual size of the content and the container size obtained after the layout" button used as a changing method. Among FIGS. 26A to 26C, to compare the container sizes obtained after the layout calculation with the actual sizes of the content data, FIG. 26A shows the container sizes of the containers 2405 and 2406 obtained after the layout calculation is performed by flowing the content data 2403 and 2404 into the containers 2400 and 2401 shown in FIGS. 24A.

First, the image container 2601 is described below. The difference between the size of the content data (2403) and the size of the container (2405), which is obtained after the layout calculation, is calculated by using the area ratio, similarly to the aforementioned examples. The area of the container 2405, which is obtained after the layout calculation, is 145 (=14.5× 10). The ratio of the area of the content data to the area of the container is 1.2:1 (=176:145) by converting the value of the area of the container having the basic sizes to 1. Therefore, the size of the content data 2403 is larger than that of the container 2405 by 20%. This does not meet the changing conditions (that is, the actual sizes of the content data differ from the basic sizes of the container by 30% or more). Consequently, the layout editing application 121 does not change the priority, so that the priority of the container is still "Normal". Next, the text container 2603 is described below. The difference between the size of the content data (2404) and the size of the container (2406), which is obtained after the layout calculation (that is, the width and the height of the container (2406) are 3.5 and 8, respectively) is calculated. The area of the container 2406 is 28 (=3.5×8). The ratio of the area of the content data to the area of the container having the basic size is 1.4:1 (=40:28) by converting the value of the area of the container having the basic sizes to 1 (the ratio is rounded off to a first decimal place). Therefore, the area of the content data 2404 having a content size is larger than the area of the container 2406 having the basic sizes by 40%. This meets the changing conditions (that is, the actual sizes of the content data differ from the basic sizes of the container by 30% or more). Consequently, the layout editing application 121 raises the priority of the container 2603 from "Normal" to "High". Then, the layout calculation is performed by using the changed priority. Consequently, the width and the height of the image container (2601) are 13.9 and 9.7, respectively. The length of the link (2602) is 2. The width and the height of the text container (2603) are 4.1 and 8, respectively. Also, the function of changing the font size to prevent occurrence of text overflow is applied to the text container. Thus, the font size becomes 9.5 points. In this example of the layout, the layout calculation is then performed by using the changed priorities (that is, the priority of the image container 2601 is "Normal", while the priority of the text container 2603 is "High"). Thus, the weight set on the layout calculation changes, so that the layout result changes. The weight is coefficient. That is, the layout calculation is preferentially performed on the text container so that the size of the text container 2603 is close to the actual size (or the ideal size) of the content data as much as possible. A method of calculating the container size according to the weight or the priority is similar to that described by referring to FIG. 29. The layout editing application 121 performs the layout of the content data according to the container size obtained by this layout calculation, and outputs the layout result.

A "deviation" of the container size of the layout, which is obtained after the calculation and is obtained from each of the layout result shown in FIGS. 24A to 24C and the layout result shown in FIGS. 26A to 26C, from the actual size is calculated.

The "deviation" of the calculated layout from the actual size is defined by the following equation:

(The container size after the layout)=(the actual size of the contents)×$M$ where M denotes a deviation index. Therefore, as the deviation index of a layout result becomes smaller, the layout result becomes closer to the actual size (the ideal size). A sum of the deviation indexes of the image container and the text container is defined to be the deviation index of the entire layout. The deviation indexes of the example shown in FIGS. 24A to 24C are calculated. As described above, the actual size of the contents, that is, that of the image contents is 176, and that of the text contents is 40 (incidentally, the sizes are represented in terms of the area). The calculated container size, that is, that of the image container is 145, and that of the text container is 28. Therefore, the deviation index M is 0.48 (=(1−145/176)+ (1−28/40)). The deviation indexes of the example shown in FIGS. 26A to 26C are then calculated. The calculated container size, that is, that of the image container is 134.8, and that of the text container is 32.8. Therefore, the deviation index M is 0.4 (=(1−134.8/176)+(1−32.8/40)). Thus, the layout result shown in FIGS. 26A to 26C is closer to the actual size. Consequently, as compared with the calculation result using the priority set in the template file, a more appropriate layout result can be obtained by performing the priority changing according to the present embodiment.

For example, in a case where layout processing is performed by flowing content data, which is included in records, into a predetermined container, similarly to the variable printing, where a plurality of records should be processed, and where a priority is preliminarily set on each of the containers, a layout result may be adverse to a user's intention depending upon the content data included in the record to be flowed into the container, because of the preliminarily set priority. However, according to the present embodiment, even when the priority is preliminarily set on each of the containers, the priority is changed according to the actual size (the ideal size) of the content data to be actually flowed into the container. Thus, the aforementioned problem due to the preliminarily set priority can be solved.

FIG. 27 shows an exemplary template file with data included. In this figure, the template file 2701 is stored in the memory unit 136 or the hard disk 140. The template data includes the following elements:

(1) An overall size element 2702, which indicates the size of pages included in the entire template. The size is represented by longitudinal and lateral lengths, or a blank form size. Also, this element stores information representing how many pages the entire template includes.

(2) Container information element 2703, which indicates identification information used to identify each container disposed in the template, information (position information) on the reference positions of the containers, information (size information) on the lengths of longitudinal and lateral sides of the containers, information (attribute information) on the attributes of edges and points constituting the containers, and information on contents associated with the containers. The position information and the size information are defined by designations through the user interface shown in FIG. 4 when the template is created. The position information is set by users at the creation of the containers and represents the reference positions of the containers. For instance, in a case where the set container is a flexible container, the layout editing application 121 recognizes the difference between the container and the content data according to the reference position of the container set in the template file and to the size of the content data to be flowed into this container. Then, the layout editing application 121 performs layout processing. The container size changed by the layout processing is held in the memory unit 136. In a case where the position of the container is fixed, this container has fixed position information. The position and the size of a container can be identified by information enabling the diagonal points of the container. Information on the positions of all points on the container in the template may be stored. Alternatively, this element may store the position information corresponding to one point on the container and may store information on the relative positions corresponding to other points on the container. That is, the container may be defined by information on one point thereon and information on the size of the container. Also, a fixed point maybe defined by information on the position thereof on the template. A variable point may be defined by relative position information.

The container attribute information representing the attributes of edges and axes of each container and those of intersections therebetween. The layout editing application 121 can recognize according to the attribute information whether a container to be processed is a fixed one or a flexible one.

Information (content association information) on associated content data includes information representing the kind of a container, that is, which of a text container and an image container the container to be used is. The content association information also includes information representing an identifier of a data source to be inserted into a container, for example, a part or all of a database name, a record name, and a field name. The content association information also includes association information on condition expressions used to extract contents. Regarding a text container, the content association information also includes information on fonts, for instance, kinds and sizes of fonts, color information, character decoration information on italic and bold fonts, and underlines. The container information 2703 is held so that the number of pieces of the information 2703 is equal to the number of the containers provided in the document template.

(3) Link information element 2704. A link is an object used to associating containers with one another and is one of container constraints. The link information includes information representing the attributes of the link, especially, information representing whether a link is a fixed one or a flexible link, information representing a link size, information representing a maximum value and a minimum value set on a flexible link, and information representing a link setting direction. Also, the link information element includes information representing containers between which a link is provided.

(4) Fixation information element 2705 includes information on the definition of a fixed part other than flexible parts. For example, common texts and images can be defined in all documents (or records), which are created by applying the template thereto. Regarding texts and images, position information thereon may be included instead of including text and image data themselves. Also, the fixation information element includes information used to define the positions of texts and images. That is, the fixation information is fixed information that does not change even when a record, to which the fixation information is applied, is changed.

Figure 32A:
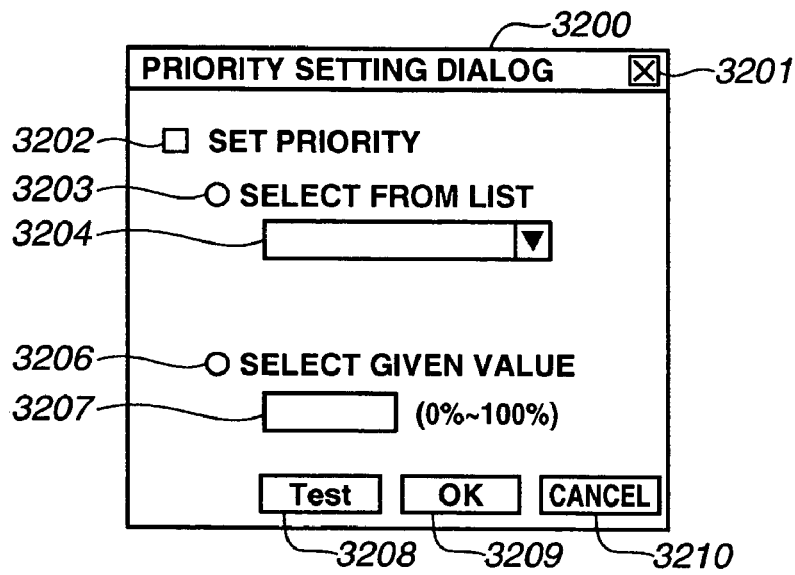
FIGS. 32A to 32C are diagrams illustrating exemplary priority setting dialogs for setting priorities in the embodiment of the present invention.
Figure 32B:
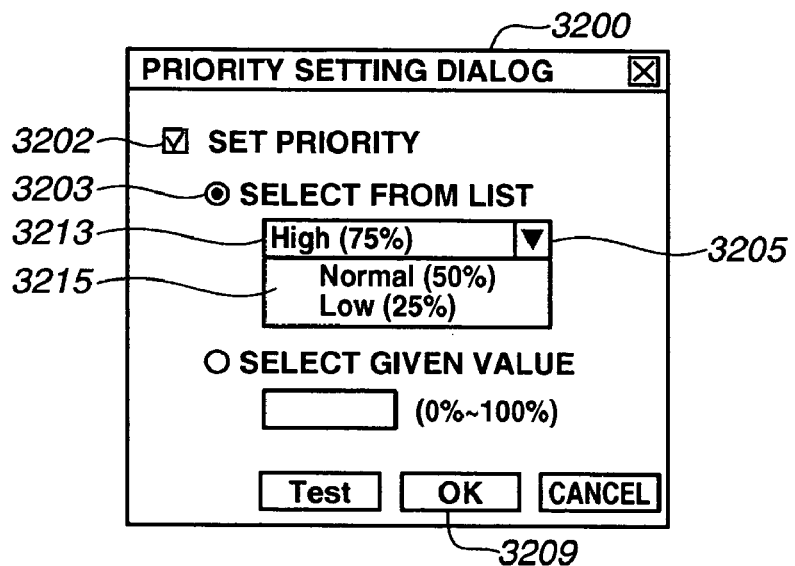
Figure 32C:
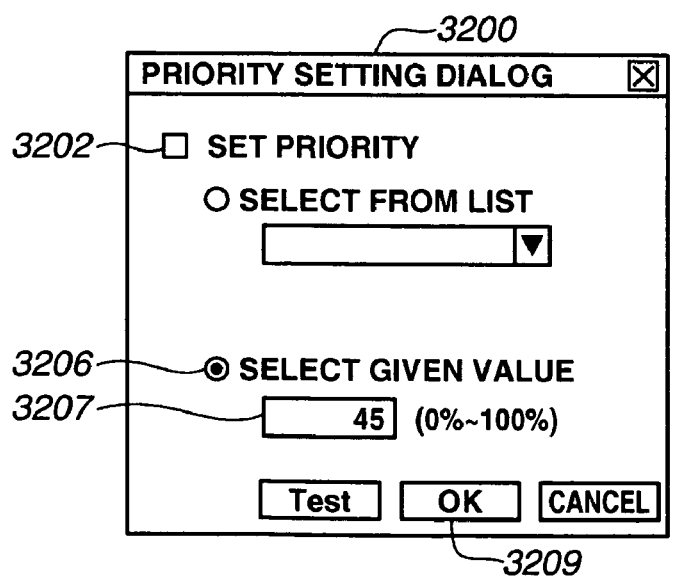

According to the first embodiment, the priority set on a container (or a data area) by using the dialogs 3200 shown in FIGS. 32A to 32C is changed in a case where the difference between the size of the content data and the size of the container associated with the content data meets predetermined conditions set by the dialog shown in FIG. 21. Also, the size of each of the containers is determined according to the weighting based on the changed priority. Incidentally, a method of determining the size according to the weighting based on the priority has been described by referring to FIG. 29. A size determining method according to the present invention is not limited thereto.

Also, according to the present invention, content data can be laid out and output according to the size of each of the containers and to the weighting based on the changed priority.

Second Exemplary Embodiment

In the foregoing description of the first embodiment, it has been described that a layout processing method to be performed can be selected from an automatic layout process, an automatic layout process with priority, an automatic layout processing method adapted to change between two priorities. However, the layout processing method to be performed is not limited thereto. In the following description of the second embodiment, a method of serially applying four layout processing methods to the apparatus is described. Incidentally, in the following description, only the differences between the first embodiment and the second embodiment are described. Programs implementing the four layout processing methods are held in the memory unit 136 serving as a storage portion of the computer.

Figure 31:
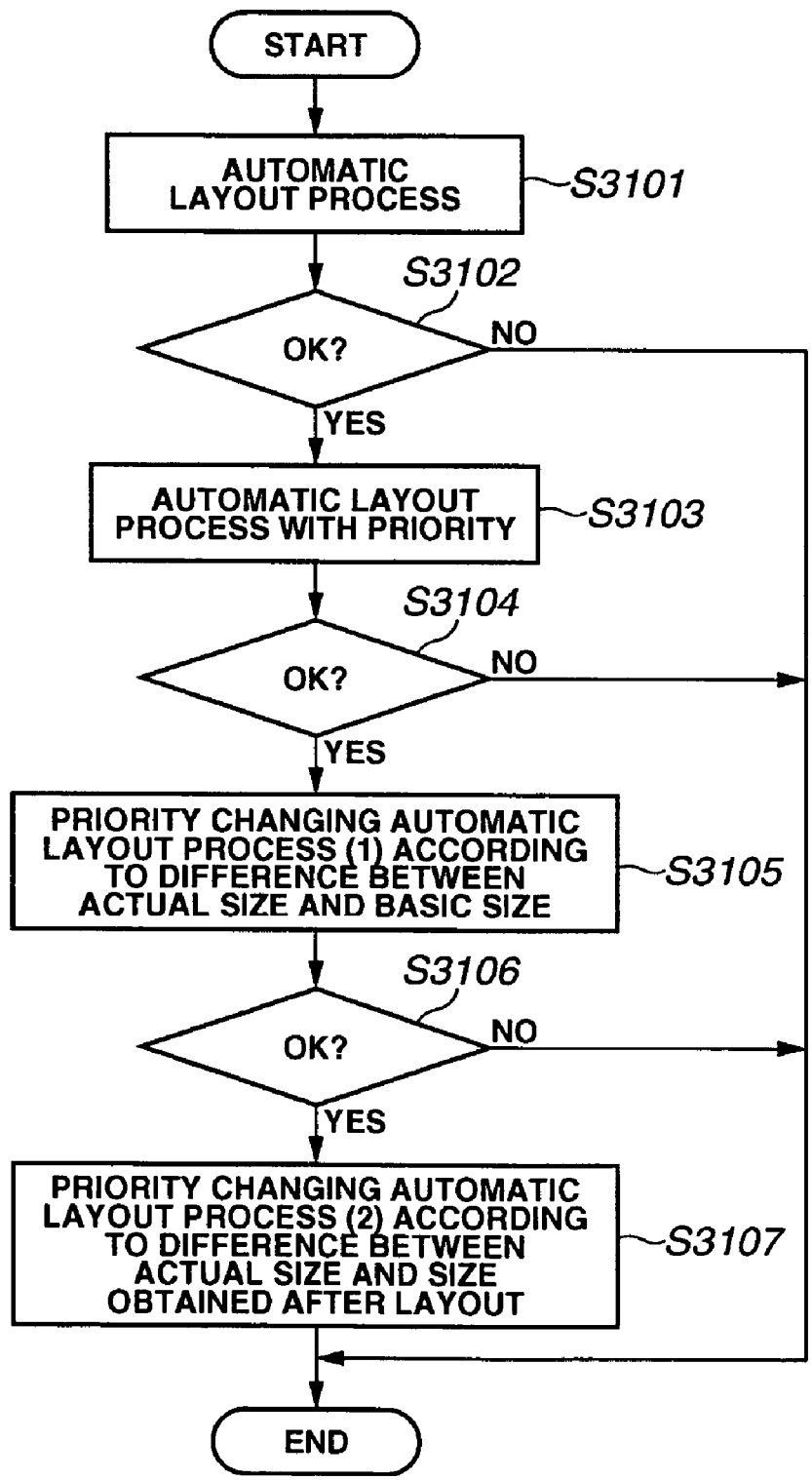
FIG. 31 is a flowchart for applying a layout processing method to the embodiment of the present invention.

FIG. 31 is a flowchart illustrating an exemplary process of implementing the second embodiment. Each of the layout processing methods has been described in the foregoing description of the first embodiment. Thus, the detailed description of the four layout processing methods by referring to FIG. 31 is omitted.

The layout editing application performs layout processing illustrated in FIGS. 8 and 9 in step S3101 by receiving a layout processing instruction. After the automatic layout processing is performed in step S3101, the layout editing application 121 causes the display portion to display a result of the layout processing and a prompt inquiring whether the automatic layout processing using the priority is performed. Then, the layout editing application 121 determines in step S3102 whether an "OK" button is pushed to perform the automatic layout processing using the priority.

If the layout editing application 121 determines in step S3102 that the "OK" button is pushed to perform the automatic layout processing using the priority, the layout editing application 121 performs the automatic layout processing using the priority in step S3103.

After the automatic layout processing using the priority is performed in step S3103, the layout editing application 121 causes the display portion to display a result of the layout processing and a prompt inquiring whether the automatic layout processing adapted to change the priority according to the "difference between the actual size of the contents and the basic size" is performed. Then, the layout editing application 121 determines in step S3104 whether the "OK" button is pushed to perform the automatic layout processing adapted to change the priority according to the "difference between the actual size of the contents and the basic size".

If the layout editing application 121 determines in step S3104 that the "OK" button is pushed to perform the automatic layout processing adapted to change the priority according to the "difference between the actual size of the contents and the basic size", the application 121 performs the automatic layout processing adapted to change the priority according to the "difference between the actual size of the contents and the basic size", in step S3105.

After the automatic layout processing adapted to change the priority according to the "difference between the actual size of the contents and the basic-size" is performed in step S3105, the layout editing application 121 causes the display portion to display a result of the layout processing and a prompt inquiring whether the automatic layout processing adapted to change the priority according to the "difference between the actual size of the contents and the container size obtained after the layout" is performed. Then, the layout editing application 121 determines in step S3106 whether the "OK" button is pushed to perform the automatic layout processing adapted to change the priority according to the "difference between the actual size of the contents and the container size obtained after the layout".

If the layout editing application 121 determines in step S3106 that the "OK" button is pushed to perform the automatic layout processing adapted to change the priority according to the "difference between the actual size of the contents and the container size obtained after the layout", the application 121 performs the automatic layout processing adapted to change the priority according to the "difference between the actual size of the contents and the container size obtained after the layout", in step S3107.

According to the process illustrated in FIG. 31, the four layout processing methods are serially performed by being applied to the apparatus. After the user recognizes the result of each of the layout processing methods, the user can determine whether the next layout process should be performed. Thus, a result more effectively reflecting a user's intention can be output.

FIGS. 32A to 32C show an exemplary priority setting dialog 3200 that is displayed in a case where the automatic layout processing utilizing the priority function 2803 is selected.

FIG. 32A shows the entire dialog. Reference numeral 3200 denotes an outline of the priority setting dialog. Reference numeral 3201 designates a button used to close the dialog. Reference numeral 3202 denotes a check box used to set whether the setting of the priority is enabled. Incidentally, default conditions for the check box 3202 are set so that the box 3202 is not checked, and that the setting of the priority is disabled. However, the setting of the priority in the dialog shown in each of FIGS. 32A to 32C may be enabled in response to the setting of the automatic layout processing using the priority is performed in the window shown in FIG. 28. A radio button 3203 is checked when the priority to be set is selected from levels preliminarily provided by the system. A list box 3204 is enabled when the radio button 3203 is checked. An arrow button 3205 (see FIG. 32B) is adapted to display a list of selectable priorities when pushed down by using a mouse. Reference numeral 3206 designates a check box that is checked when a user sets the value of the priority at an optional value. When the check box 3206 is checked, a text box 3207 is enabled and is ready to receive an input value. A user can set the priority by inputting a given value form the text box 3207.

When a test button 3208 is depressed, the priority set in this dialog may be temporarily applied to the apparatus so that a test process is performed to check a change in the layout. The priority set at that time is tentatively set in the property of an associated container. Upon completion of the test process, the value of the property is reset to the value set before the priority is set. This button is provided to enhance the usability, and is not an indispensable element for implementing the present invention and is optional. When an OK button 3209 is depressed, the priority set in this dialog is applied to the property of the associated container. Then, the dialog is closed. When the cancel button 3210 is depressed, the priority set in this dialog is not applied to the associated container. Then, the dialog 3200 is closed.

FIG. 32B illustrates an example of using the priority, which is provided in the system, in the priority setting dialog 3200. The priority is set by enabling the check box 3202. When the radio button 3203 is enabled, the list box 3204 is also enabled. As indicated by reference numerals 3213 and 3215, a list is displayed so that a desired priority can be selected. The display of this list is performed by pressing the arrow button 3205. Thus, the priorities preliminarily provided by the system are indicated. In this case, "High (75%)", "Normal (50%)", "Low (25%)" are available. The priorities indicated in this window are examples. Other priorities may be set to be available. The priority selected by a user from the list 3215 is displayed in the box 3213. When the OK button 3209 is pressed, the selected priority is set in the property of the associated container.

FIG. 32C illustrates a case where a user specifies an optional value as the priority in the priority setting dialog 3200. The priority is set by enabling the check box 3202. When the radio button 3206 is enabled, the text box 3207 is enabled. Thus, the value of the priority can be entered. A user can specify an optional value in the text box 3207 put into a state in which a value can be entered. When the OK button 3209 is pressed, the priority specified in the text box 3207 is set in the property of the associated container. Thus, various priorities can be set, thereby facilitating the creation of a layout as intended by a user.

The priority changing processing is performed by assuming that the priority is set on the container by using the priority setting dialog 3200 shown in FIGS. 32A to 32C. The priority windows are preliminarily set before the layout calculation is performed. However, when the priority changing processing according to the present embodiment is performed, the priority can be changed by reflecting information on the content data. According to the present embodiment, in a case where the difference between the content size of the content data and the size of the data area associated with the content data does not meet the predetermined conditions, the size of the container is determined according to the weighting based on the priority preliminarily set by using the dialog 3200 shown in FIGS. 32A to 32C.

According to the present invention, the priority is dynamically changed by using the content data to be actually flowed into the container. Thus, a layout dynamically reflecting a user's intention can be created.

Other Exemplary Embodiments

The features of the present invention can be achieved by providing a recording medium, on which software program code for implementing the functions of the aforementioned embodiments is recorded, to a system or an apparatus, whose computer (or a CPU or an MPU) reads and executes the program code stored in the recording medium. In this case, the program code itself read from the recording medium implements the functions of the aforementioned embodiments. Thus, the program code itself and the recording medium, which stores the program code, constitute the present invention.

The functions of the aforementioned embodiments are implemented not only by executing the read program code in the computer but by performing part or all of actual processing according to instructions, which are issued by the program code, by an operating system (OS) running on the computer.

The functions of the aforementioned embodiments are also implemented by performing part or all of the actual processing by a CPU or the like, which is provided in a function expansion board inserted into the computer or in a function expansion unit connected to the computer, according to instructions issued by the program code that is read from the storage medium after written to a memory provided on the function expansion board or on the function expansion unit.

The present invention is also achieved when software program code for implementing the functions of the aforementioned embodiment is distributed through a network and stored in a storage unit such as a hard disk or memory of a system or apparatus or a storage medium such as a CD-RW or CD-R, and the computer (or CPU or MPU) of the system or apparatus reads out and executes the program code stored in the storage unit or storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-138413 filed May 11, 2005, which is hereby incorporated by reference herein in its entirety.

What is claimed is:

1. A layout processing method for changing a layout of a template having a plurality of data areas in accordance with content data to be inserted in each of the plurality of data areas, the layout processing method comprising:

a setting process of, by setting means, setting a priority on each data area;

a selection process of, by selection means, selecting (1) a difference between a content size of the content data and a basic size of a data area associated with the content data or (2) a difference between the content size of the content data and a size of a data area which is decided based on the content data and the priority set in the setting process, as a condition to change the priority;

wherein at least one of the plurality of data areas has condition (1) selected as a condition to change the priority, and at least one of the plurality of data areas has condition (2) selected as a condition to change the priority a first specifying process of, by first specifying means, specifying the difference between the content size of the content data and the basic size of the data area associated with the content data in a case where (1) the difference between the content size of the content data and the basic size of the data area associated with the content data is selected in the selection process;

a second specifying process of, by second specifying means, specifying the difference between the content size of the content data and the size of the data area which is decided based on the content data and the priority set in the setting process in a case where (2) the difference between the content size of the content data and the size of the data area which is decided based on the content data and the priority set in the setting process is selected in the selection process;

a changing process of, by changing means, changing, in a case where the difference specified in the first specifying process or the difference specified in the second specifying process between a content size of content data and a size of a data area associated with the content data meets a predetermined condition, the priority set on the data area;

a determining process of, by determining means, determining an area size of each data area in accordance with the priority changed in the changing process; and an output process of, by output means, laying out the content data in accordance with the area sizes of the plurality of data areas determined in the determining process, and outputting laid-out content data.

2. The layout processing method according to claim 1, wherein the determining process determines an area size of each of the plurality of data areas so that a difference between the content size of the content data and a size of a data area in which the content data is inserted decreases for a data area having a higher priority.

3. The layout processing method according to claim 1, wherein the changing process changes a priority of a data area contained in a set range.

4. The layout processing method according to claim 1, wherein the determining process determines an area size of each data area in accordance with the priority set in the setting process in a case where a difference between a content size of content data and a size of a data area associated with the content data does not meet a predetermined condition.

5. The layout processing method according to claim 1, further comprising
   an inquiring process of, by inquiring means, inquiring whether the priority set in the setting process by using (1) the difference between the content size of the content data and the size of the data area associated with the content data or (2) the changing amount of the content data, is changed after a layout result determined in accordance with the priority set in the setting process is displayed.

6. A layout processing apparatus for changing a layout of a template having a plurality of data areas in accordance with content data to be inserted in each of the plurality of data areas, the layout processing method comprising:
   setting means for setting a priority on each data area;
   selection means for selecting (1) a difference between a content size of the content data and a basic size of a data area associated with the content data or (2) a difference between the content size of the content data and a size of a data area which is decided based on the content data and the priority set in the setting means, as a condition to change the priority;
   wherein at least one of the plurality of data areas has condition (1) selected as a condition to change the priority, and at least one of the plurality of data areas has condition (2) selected as a condition to change the priority
   first specifying means for specifying the difference between the content size of the content data and the basic size of the data area associated with the content data in a case where (1) the difference between the content size of the content data and the basic size of the data area associated with the content data is selected in the selection means;
   second specifying means for specifying the difference between the content size of the content data and the size of the data area which is decided based on the content data and the priority set in the setting means in a case where (2) the difference between the content size of the content data and the size of the data area which is decided based on the content data and the priority set in the setting means is selected in the selection means;
   changing means for changing, in a case where the difference specified in the first specifying means or the difference specified in the second specifying means between a content size of content data and a size of a data area associated with the content data meets a predetermined condition, the priority set on the data area;
   determining means for determining an area size of each data area in accordance with the priority changed in the changing means; and
   output means for laying out the content data in accordance with the area sizes of the plurality of data areas determined in the determining means, and outputting laid-out content data.

7. The layout processing apparatus according to claim 6, wherein the determining means determines an area size of each of the plurality of data areas so that a difference between the content size of the content data and a size of a data area in which the content data is inserted decreases for a data area having a higher priority.

8. The layout processing apparatus according to claim 6, wherein the changing means changes a priority of a data area contained in a set range.

9. The layout processing apparatus according to claim 6, wherein the determining means determines an area size of each data area in accordance with the priority set by the setting means in a case where a difference between a content size of content data and a size of a data area associated with the content data does not meet a predetermined condition.

10. The layout processing apparatus according to claim 6, further comprising
    inquiring means for inquiring whether the priority set by the setting means by using (1) the difference between the content size of the content data and the size of the data area associated with the content data or (2) the changing amount of the content data, is changed after a layout result determined in accordance with the priority set by the setting means is displayed.

11. A computer-readable storage medium storing a layout processing program for changing a layout of a template having a plurality of data areas in accordance with content data to be inserted in each of the plurality of data areas, the layout processing program comprising:
    a setting step of, by setting means, setting a priority on each data area;
    a selection step of, by selection means, selecting (1) a difference between a content size of the content data and a basic size of a data area associated with the content data or (2) a difference between the content size of the content data and a size of a data area which is decided based on the content data and the priority set in the setting step, as a condition to change the priority;
    wherein at least one of the plurality of data areas has condition (1) selected as a condition to change the priority, and at least one of the plurality of data areas has condition (2) selected as a condition to change the priority
    a first specifying step of, by first specifying means, specifying the difference between the content size of the content data and the basic size of the data area associated with the content data in a case where (1) the difference between the content size of the content data and the basic size of the data area associated with
    the content data is selected in the selection step;
    a second specifying step of, by second specifying means, specifying the difference between the content size of the content data and the size of the data area which is decided based on the content data and the priority set in the setting step in a case where (2) the difference between the content size of the content data and the size of the data area which is decided based on the content data and the priority set in the setting step is selected in the selection step;

a changing step of, by changing means, changing, in a case where the difference specified in the first specifying step or the difference specified in the second specifying step between a content size of content data and a size of a data area associated with the content data meets a predetermined condition, the
priority set on the data area;
a determining step of, by determining means, determining an area size of each data area in accordance with the priority changed in the changing step; and
an output step of, by output means, laying out the content data in accordance with the area sizes of the plurality of data areas determined in the determining step, and outputting laid-out content data.

12. The storage medium according to claim 11, wherein the determining step determines an area size of each of the plurality of data areas so that a difference between the content size of the content data and a size of a data area in which the content data is inserted decreases for a data area having a higher priority.

13. The storage medium according to claim 11, wherein the changing step changes a priority of a data area contained in a set range.

14. The storage medium according to claims 11, wherein the determining step determines an area size of each data area in accordance with the priority set in the setting step in a case where a difference between a content size of content data and a size of a data area associated with the content data does not meet a predetermined condition.

15. The storage medium according to claim 11, further comprising
an inquiring step of, by inquiring means, inquiring whether the priority set in the setting step by using (1) the difference between the content size of the content data and the size of the data area associated with the content data or (2) the changing amount of the content data, is changed after a layout result determined in accordance with the priority set in the setting step is displayed.

* * * * *